US012685613B2

(12) United States Patent
Kofron et al.

(10) Patent No.: US 12,685,613 B2
(45) Date of Patent: Jul. 21, 2026

(54) COMPONENTS FOR USE WITH A SURGICAL GUIDE FOR DENTAL IMPLANT PLACEMENT

(71) Applicant: BIOMET 3I, LLC, Palm Beach Gardens, FL (US)

(72) Inventors: Michelle Kofron, Palm Beach Gardens, FL (US); Joseph DePastino, West Palm Beach, FL (US); Esther Moran, Green Acres, FL (US); Zachary B. Suttin, Jupiter, FL (US); Miguel G Montero, Boynton Beach, FL (US); Alexander Chelminski, Jupiter, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 11 days.

(21) Appl. No.: 17/349,198

(22) Filed: Jun. 16, 2021

(65) Prior Publication Data

US 2021/0386513 A1    Dec. 16, 2021

Related U.S. Application Data

(60) Provisional application No. 63/039,620, filed on Jun. 16, 2020.

(51) Int. Cl.
*A61C 1/08* (2006.01)

(52) U.S. Cl.
CPC .............. *A61C 1/084* (2013.01); *A61C 1/085* (2013.01)

(58) Field of Classification Search
CPC ........... A61C 1/084; A61C 1/085; A61C 1/14; A61C 1/141; A61C 1/142; A61C 1/144; A61C 1/145; A61C 1/147
See application file for complete search history.

(56) References Cited

U.S. PATENT DOCUMENTS

| | | | |
|---|---|---|---|
| 3,906,634 A | 9/1975 | Aspel |
| 3,919,772 A | 11/1975 | Lenczycki |
| 3,958,471 A | 5/1976 | Muller |
| 4,011,602 A | 3/1977 | Rybicki |
| 4,056,585 A | 11/1977 | Waltke |
| 4,086,701 A | 5/1978 | Kawahara |
| 4,177,562 A | 12/1979 | Miller |
| 4,294,544 A | 10/1981 | Altschuler |

(Continued)

FOREIGN PATENT DOCUMENTS

| | | |
|---|---|---|
| BE | 1011205 A3 | 6/1999 |
| DE | 10029256 | 11/2000 |

(Continued)

OTHER PUBLICATIONS

Machine English Translation of WO/2016024681 (Year: 2025).*

(Continued)

*Primary Examiner* — Eric J Rosen
*Assistant Examiner* — Hao D Mai
(74) *Attorney, Agent, or Firm* — Sheridan Ross P.C.

(57) ABSTRACT
Dental components used for guiding the insertion of a dental implant into a desired location in a patient's mouth using a surgical guide including a master tube are described herein. Various components that can be used with the surgical guide and during a dental procedure using the surgical guide are also described herein.

20 Claims, 36 Drawing Sheets

(56) References Cited

U.S. PATENT DOCUMENTS

| | | |
|---|---|---|
| 4,306,862 A | 12/1981 | Knox |
| 4,325,373 A | 4/1982 | Slivenko |
| 4,341,312 A | 7/1982 | Scholer |
| 4,364,381 A | 12/1982 | Sher |
| 4,439,152 A | 3/1984 | Small |
| 4,543,953 A | 10/1985 | Slocum |
| 4,547,157 A | 10/1985 | Driskell |
| 4,571,180 A | 2/1986 | Kulick |
| 4,611,288 A | 9/1986 | Duret |
| 4,624,673 A | 11/1986 | Meyer |
| 4,663,720 A | 5/1987 | Duret |
| 4,713,004 A | 12/1987 | Linkow |
| 4,756,689 A | 7/1988 | Lundgren |
| 4,758,161 A | 7/1988 | Niznick |
| 4,767,331 A | 8/1988 | Hoe |
| 4,772,204 A | 9/1988 | Soderberg |
| 4,821,200 A | 4/1989 | Oberg |
| 4,842,518 A | 6/1989 | Linkow |
| 4,850,870 A | 7/1989 | Lazzara et al. |
| 4,850,873 A | 7/1989 | Lazzara et al. |
| 4,854,872 A | 8/1989 | Detsch |
| 4,856,994 A | 8/1989 | Lazzara |
| 4,872,839 A | 10/1989 | Brainovic |
| 4,906,191 A | 3/1990 | Soderberg |
| 4,906,420 A | 3/1990 | Brainovic |
| 4,931,016 A | 6/1990 | Sillard |
| 4,935,635 A | 6/1990 | O'Harra |
| 4,960,381 A | 10/1990 | Niznick |
| 4,961,674 A | 10/1990 | Wang |
| 4,964,770 A | 10/1990 | Steinbichler |
| 4,986,753 A | 1/1991 | Sellers |
| 4,988,297 A | 1/1991 | Lazzara |
| 4,988,298 A | 1/1991 | Lazzara |
| 4,998,881 A | 3/1991 | Lauks |
| 5,000,685 A | 3/1991 | Brainovic |
| 5,006,069 A | 4/1991 | Lazzara |
| 5,015,183 A | 5/1991 | Penick |
| 5,015,186 A | 5/1991 | Detsch |
| 5,030,096 A | 7/1991 | Hurson |
| 5,035,619 A | 7/1991 | Daftary |
| 5,040,982 A | 8/1991 | Stefan-Dogar |
| 5,040,983 A | 8/1991 | Binon |
| 5,064,375 A | 11/1991 | Jomeus |
| 5,071,351 A | 12/1991 | Green, Jr. |
| 5,073,111 A | 12/1991 | Daftary |
| 5,087,200 A | 2/1992 | Brajnovic |
| 5,100,323 A | 3/1992 | Friedman |
| 5,104,318 A | 4/1992 | Piche |
| 5,106,300 A | 4/1992 | Voitik |
| 5,122,059 A | 6/1992 | Durr |
| 5,125,839 A | 6/1992 | Ingber |
| 5,125,841 A | 6/1992 | Carlsson |
| 5,133,660 A | 7/1992 | Penick |
| 5,135,395 A | 8/1992 | Marlin |
| 5,145,371 A | 9/1992 | Jomeus |
| 5,145,372 A | 9/1992 | Daftary |
| 5,176,516 A | 1/1993 | Koizumi |
| 5,188,800 A | 2/1993 | Green, Jr. |
| 5,195,892 A | 3/1993 | Gersberg |
| 5,205,745 A | 4/1993 | Kamiya |
| 5,209,659 A | 5/1993 | Friedman |
| 5,209,666 A | 5/1993 | Balfour |
| 5,213,502 A | 5/1993 | Daftary |
| 5,221,204 A | 6/1993 | Kruger |
| 5,237,998 A | 8/1993 | Duret |
| 5,246,370 A | 9/1993 | Coatoam |
| 5,257,184 A | 10/1993 | Mushabac |
| 5,281,140 A | 1/1994 | Niznick |
| 5,286,195 A | 2/1994 | Clostermann |
| 5,286,196 A | 2/1994 | Brainovic |
| 5,292,252 A | 3/1994 | Nickerson |
| 5,297,963 A | 3/1994 | Dafatry |
| 5,302,125 A | 4/1994 | Kownacki |
| 5,312,254 A | 5/1994 | Rosenlicht |
| 5,312,409 A | 5/1994 | McLaughlin |
| 5,316,476 A | 5/1994 | Krauser |
| 5,320,529 A | 6/1994 | Pompa |
| 5,328,371 A | 7/1994 | Hund |
| 5,334,024 A | 8/1994 | Niznick |
| 5,336,090 A | 8/1994 | Wilson, Jr. |
| 5,338,196 A | 8/1994 | Beaty |
| 5,338,198 A | 8/1994 | Wu |
| 5,343,391 A | 8/1994 | Mushabac |
| 5,344,457 A | 9/1994 | Pilliar |
| 5,350,297 A | 9/1994 | Cohen |
| 5,359,511 A | 10/1994 | Schroeder |
| 5,362,234 A | 11/1994 | Salazar |
| 5,362,235 A | 11/1994 | Daftary |
| 5,368,483 A | 11/1994 | Sutter |
| 5,370,692 A | 12/1994 | Fink |
| 5,372,502 A | 12/1994 | Massen |
| 5,386,292 A | 1/1995 | Massen |
| 5,413,481 A | 5/1995 | Goppel |
| 5,417,569 A | 5/1995 | Perisse |
| 5,417,570 A | 5/1995 | Zuest |
| 5,419,702 A | 5/1995 | Beaty |
| 5,431,567 A | 7/1995 | Daftary |
| 5,437,551 A | 8/1995 | Chalifoux |
| 5,440,393 A | 8/1995 | Wenz |
| 5,452,219 A | 9/1995 | Dehoff |
| 5,458,488 A | 10/1995 | Chalifoux |
| 5,476,382 A | 12/1995 | Daftary |
| 5,476,383 A | 12/1995 | Beaty |
| 5,492,471 A | 2/1996 | Singer |
| 5,516,288 A | 5/1996 | Sichler |
| 5,527,182 A | 6/1996 | Willoughby |
| 5,533,898 A | 7/1996 | Mena |
| 5,538,426 A | 7/1996 | Harding |
| 5,547,377 A | 8/1996 | Daftary |
| 5,556,278 A | 9/1996 | Meitner |
| 5,564,921 A | 10/1996 | Marlin |
| 5,564,924 A | 10/1996 | Kwan |
| 5,569,578 A | 10/1996 | Mushabac |
| 5,575,656 A | 11/1996 | Nallar |
| 5,580,244 A | 12/1996 | White |
| 5,580,246 A | 12/1996 | Fried |
| 5,595,703 A | 1/1997 | Swaelens |
| 5,613,832 A | 3/1997 | Su |
| 5,613,852 A | 3/1997 | Bavitz |
| 5,630,717 A | 5/1997 | Zuest |
| 5,636,986 A | 6/1997 | Pezeshkian |
| 5,651,675 A | 7/1997 | Singer |
| 5,652,709 A | 7/1997 | Andersson |
| 5,658,147 A | 8/1997 | Phimmasone |
| 5,662,476 A | 9/1997 | Ingber |
| 5,674,069 A | 10/1997 | Osorio |
| 5,674,071 A | 10/1997 | Beaty |
| 5,674,073 A | 10/1997 | Ingber |
| 5,681,167 A | 10/1997 | Lazarof |
| 5,685,715 A | 11/1997 | Beaty |
| 5,688,283 A | 11/1997 | Knaoo |
| 5,704,936 A | 1/1998 | Mazel |
| 5,718,579 A | 2/1998 | Kennedy |
| 5,725,376 A | 3/1998 | Poirier |
| 5,733,124 A | 3/1998 | Kwan |
| 5,741,215 A | 4/1998 | D'Urso |
| 5,743,916 A | 4/1998 | Greenberg |
| 5,759,036 A | 6/1998 | Hinds |
| 5,762,125 A | 6/1998 | Mastrorio |
| 5,762,500 A | 6/1998 | Lazarof |
| 5,768,134 A | 6/1998 | Swaelens |
| 5,769,636 A | 6/1998 | Di Sario |
| 5,791,902 A | 8/1998 | Lauks |
| 5,800,168 A | 9/1998 | Cascione |
| 5,813,858 A | 9/1998 | Singer |
| 5,823,778 A | 10/1998 | Schmitt |
| 5,842,859 A | 12/1998 | Palacci |
| 5,846,079 A | 12/1998 | Knode |
| 5,851,115 A | 12/1998 | Carlsson |
| 5,857,853 A | 1/1999 | van Nifterick |
| 5,871,358 A | 2/1999 | Ingber |
| 5,873,722 A | 2/1999 | Lazzara |
| 5,876,204 A | 3/1999 | Day |
| 5,885,078 A | 3/1999 | Cagna |

(56) References Cited

U.S. PATENT DOCUMENTS

| | | | |
|---|---|---|---|
| 5,888,034 A | 3/1999 | Greenberg |
| 5,904,483 A | 5/1999 | Wade |
| 5,915,962 A | 6/1999 | Rosenlicht |
| 5,927,982 A | 7/1999 | Kruger |
| 5,938,443 A | 8/1999 | Lazzara |
| 5,954,769 A | 9/1999 | Rosenlicht |
| 5,964,591 A | 10/1999 | Beaty |
| 5,967,777 A | 10/1999 | Klein |
| 5,984,681 A | 11/1999 | Huang |
| 5,989,025 A | 11/1999 | Conley |
| 5,989,029 A | 11/1999 | Osorio |
| 5,989,258 A | 11/1999 | Hattori |
| 5,997,681 A | 12/1999 | Kinzie |
| 6,000,939 A | 12/1999 | Ray |
| 6,008,905 A | 12/1999 | Breton |
| 6,068,479 A | 5/2000 | Kwan |
| 6,099,311 A | 8/2000 | Wagner |
| 6,099,313 A | 8/2000 | Dorken |
| 6,099,314 A | 8/2000 | Kopelman |
| 6,120,293 A | 9/2000 | Lazzara |
| 6,129,548 A | 10/2000 | Lazzara |
| 6,135,773 A | 10/2000 | Lazzara |
| 6,142,782 A | 11/2000 | Lazarof |
| 6,174,168 B1 | 1/2001 | Dehoff |
| 6,175,413 B1 | 1/2001 | Lucas |
| 6,190,169 B1 | 2/2001 | Bluemli |
| 6,197,410 B1 | 3/2001 | Vallittu |
| 6,200,125 B1 | 3/2001 | Akutagawa |
| 6,206,693 B1 | 3/2001 | Hultgren |
| 6,210,162 B1 | 4/2001 | Chishti |
| 6,217,334 B1 | 4/2001 | Hultgren |
| 6,227,859 B1 | 5/2001 | Sutter |
| 6,283,753 B1 | 9/2001 | Willoughby |
| 6,287,119 B1 | 9/2001 | Van Nifterick |
| 6,296,483 B1 | 10/2001 | Champleboux |
| 6,319,000 B1 | 11/2001 | Branemark |
| 6,322,728 B1 | 11/2001 | Brodkin |
| 6,382,975 B1 | 5/2002 | Poirier |
| 6,402,707 B1 | 6/2002 | Ernst |
| 6,488,503 B1 | 12/2002 | Lichkus |
| 6,497,574 B1 | 12/2002 | Miller |
| 6,540,784 B2 | 4/2003 | Barlow |
| 6,568,936 B2 | 5/2003 | MacDougald |
| 6,575,751 B1 | 6/2003 | Lehmann |
| 6,594,539 B1 | 7/2003 | Geng |
| 6,610,079 B1 | 8/2003 | Li |
| 6,619,958 B2 | 9/2003 | Beaty |
| 6,629,840 B2 | 10/2003 | Chishti |
| 6,634,883 B2 | 10/2003 | Ranalli |
| 6,648,640 B2 | 11/2003 | Rubbert |
| 6,671,539 B2 | 12/2003 | Gateno |
| 6,672,870 B2 | 1/2004 | Knapp |
| 6,688,887 B2 | 2/2004 | Morgan |
| 6,691,764 B2 | 2/2004 | Embert |
| 6,743,491 B2 | 6/2004 | Cirincione |
| 6,755,652 B2 | 6/2004 | Nanni |
| 6,772,026 B2 | 8/2004 | Bradbury |
| 6,776,614 B2 | 8/2004 | Wiechmann |
| 6,783,359 B2 | 8/2004 | Kapit |
| 6,790,040 B2 | 9/2004 | Amber |
| 6,793,491 B2 | 9/2004 | Klein |
| 6,808,659 B2 | 10/2004 | Schulman |
| 6,814,575 B2 | 11/2004 | Poirier |
| 6,821,462 B2 | 11/2004 | Schulman |
| 6,829,498 B2 | 12/2004 | Kipke |
| D503,804 S | 4/2005 | Phleps |
| 6,882,894 B2 | 4/2005 | Durbin |
| 6,885,464 B1 | 4/2005 | Pfeiffer |
| 6,902,401 B2 | 6/2005 | Jomeus |
| 6,913,463 B2 | 7/2005 | Blacklock |
| 6,926,442 B2 | 8/2005 | Stockl |
| 6,926,525 B1 | 8/2005 | Romig |
| 6,939,489 B2 | 9/2005 | Moszner |
| 6,942,699 B2 | 9/2005 | Stone |
| 6,953,383 B2 | 10/2005 | Rothenberger |
| 6,957,118 B2 | 10/2005 | Kopelman |
| 6,966,772 B2 | 11/2005 | Malin |
| 6,970,760 B2 | 11/2005 | Wolf |
| 6,971,877 B2 | 12/2005 | Harter |
| 6,994,549 B2 | 2/2006 | Brodkin |
| 7,010,150 B1 | 3/2006 | Pfeiffer |
| 7,010,153 B2 | 3/2006 | Zimmermann |
| 7,012,988 B2 | 3/2006 | Adler |
| 7,018,207 B2 | 3/2006 | Prestipino |
| 7,021,934 B2 | 4/2006 | Aravena |
| 7,029,275 B2 | 4/2006 | Rubbert |
| 7,044,735 B2 | 5/2006 | Malin |
| 7,048,477 B2 * | 5/2006 | Abrams ............... B23B 49/005 |
| | | 408/202 |
| 7,056,115 B2 | 6/2006 | Phan |
| 7,056,472 B1 | 6/2006 | Behringer |
| 7,059,856 B2 | 6/2006 | Marotta |
| 7,066,736 B2 | 6/2006 | Kumar |
| 7,084,868 B2 | 8/2006 | Farag |
| 7,086,860 B2 | 8/2006 | Schuman |
| 7,097,451 B2 | 8/2006 | Tang |
| 7,104,795 B2 | 9/2006 | Dadi |
| 7,110,844 B2 | 9/2006 | Kopelman |
| 7,112,065 B2 | 9/2006 | Kopelman |
| 7,118,375 B2 | 10/2006 | Durbin |
| D532,991 S | 12/2006 | Gozzi |
| 7,153,132 B2 | 12/2006 | Tedesco |
| 7,153,135 B1 | 12/2006 | Thomas |
| 7,163,443 B2 | 1/2007 | Basler |
| 7,175,434 B2 | 2/2007 | Brainovic |
| 7,175,435 B2 | 2/2007 | Anderson |
| 7,178,731 B2 | 2/2007 | Basler |
| 7,214,062 B2 | 5/2007 | Morgan |
| 7,220,124 B2 | 5/2007 | Taub |
| 7,228,191 B2 | 6/2007 | Hofmeister |
| 7,236,842 B2 | 6/2007 | Kopelman |
| 7,281,927 B2 | 10/2007 | Marotta |
| 7,286,954 B2 | 10/2007 | Kopelman |
| 7,303,420 B2 | 12/2007 | Huch |
| 7,319,529 B2 | 1/2008 | Babayoff |
| 7,322,746 B2 | 1/2008 | Beckhaus |
| 7,322,824 B2 | 1/2008 | Schmitt |
| 7,324,680 B2 | 1/2008 | Zimmermann |
| 7,329,122 B1 | 2/2008 | Scott |
| 7,331,786 B2 | 2/2008 | Poirier |
| 7,333,874 B2 | 2/2008 | Taub |
| 7,335,876 B2 | 2/2008 | Eiff |
| D565,184 S | 3/2008 | Royzen |
| 7,367,801 B2 | 5/2008 | Saliger |
| 7,379,584 B2 | 5/2008 | Rubbert |
| D571,471 S | 6/2008 | Stockl |
| 7,381,191 B2 | 6/2008 | Fallah |
| 7,383,094 B2 | 6/2008 | Kopelman |
| D575,747 S | 8/2008 | Abramovich |
| 7,421,608 B2 | 9/2008 | Sebron |
| 7,429,175 B2 | 9/2008 | Gittelson |
| 7,435,088 B2 | 10/2008 | Brajnovic |
| 7,476,100 B2 | 1/2009 | Kuo |
| 7,481,647 B2 | 1/2009 | Sambu |
| 7,488,174 B2 | 2/2009 | Kopelman |
| 7,497,619 B2 | 3/2009 | Stoeckl |
| 7,497,983 B2 | 3/2009 | Khan |
| 7,520,747 B2 | 4/2009 | Stonisch |
| 7,522,764 B2 | 4/2009 | Schwotzer |
| 7,534,266 B2 | 5/2009 | Kluger |
| 7,536,234 B2 | 5/2009 | Kopelman |
| 7,545,372 B2 | 6/2009 | Kopelman |
| 7,551,760 B2 | 6/2009 | Scharlack |
| 7,555,403 B2 | 6/2009 | Kopelman |
| 7,556,496 B2 | 7/2009 | Cinader, Jr. |
| 7,559,692 B2 | 7/2009 | Beckhaus |
| 7,563,397 B2 | 7/2009 | Schulman |
| D597,769 S | 8/2009 | Richter |
| 7,572,058 B2 | 8/2009 | Pruss |
| 7,572,125 B2 | 8/2009 | Brainovic |
| 7,574,025 B2 | 8/2009 | Feldman |
| 7,578,673 B2 | 8/2009 | Wen |
| 7,580,502 B2 | 8/2009 | Dalpiaz |
| 7,581,951 B2 | 9/2009 | Lehmann |

(56)        References Cited

U.S. PATENT DOCUMENTS

| | | |
|---|---|---|
| 7,582,855 B2 | 9/2009 | Pfeiffer |
| 7,621,744 B2 | 11/2009 | Massoud |
| 7,628,537 B2 | 12/2009 | Schulze-Ganzlin |
| 7,632,097 B2 | 12/2009 | Clerck |
| 7,653,455 B2 | 1/2010 | Cinader, Jr. |
| 7,654,823 B2 | 2/2010 | Dad |
| 7,655,586 B1 | 2/2010 | Brodkin |
| 7,658,610 B2 | 2/2010 | Knopp |
| 7,661,956 B2 | 2/2010 | Powell |
| 7,665,989 B2 | 2/2010 | Brajnovic |
| 7,679,723 B2 | 3/2010 | Schwotzer |
| 7,687,754 B2 | 3/2010 | Eiff |
| 7,689,308 B2 | 3/2010 | Holzner |
| D614,210 S | 4/2010 | Basler |
| 7,698,014 B2 | 4/2010 | Dunne |
| 7,731,497 B2 | 6/2010 | De Moyer |
| 7,774,084 B2 | 8/2010 | Cinader, Jr. |
| 7,780,907 B2 | 8/2010 | Schmidt |
| 7,785,007 B2 | 8/2010 | Stoeckl |
| 7,787,132 B2 | 8/2010 | Komer |
| 7,796,811 B2 | 9/2010 | Orth |
| 7,798,708 B2 | 9/2010 | Erhardt |
| 7,801,632 B2 | 9/2010 | Orth |
| 7,815,371 B2 | 10/2010 | Schulze-Ganzlin |
| 7,824,181 B2 | 11/2010 | Sers |
| D629,908 S | 12/2010 | Jerger |
| 7,855,354 B2 | 12/2010 | Eiff |
| 7,865,261 B2 | 1/2011 | Pfeiffer |
| 7,876,877 B2 | 1/2011 | Stockl |
| 7,901,209 B2 | 3/2011 | Saliger |
| 7,982,731 B2 | 7/2011 | Orth |
| 7,985,119 B2 | 7/2011 | Basler |
| 7,986,415 B2 | 7/2011 | Thiel |
| 8,026,943 B2 | 9/2011 | Weber |
| 8,038,440 B2 | 10/2011 | Swaelens |
| 8,047,895 B2 | 11/2011 | Basler |
| 8,057,912 B2 | 11/2011 | Basler |
| 8,062,034 B2 | 11/2011 | Hanisch |
| 8,083,522 B2 | 12/2011 | Karkar |
| 8,105,081 B2 | 1/2012 | Bavar |
| 8,777,612 B2 | 7/2014 | Suttin et al. |
| 8,967,999 B2 | 3/2015 | Suttin et al. |
| 9,011,146 B2 | 4/2015 | Suttin et al. |
| 10,667,885 B2 | 6/2020 | Suttin et al. |
| 11,207,153 B2 | 12/2021 | Suttin et al. |
| 2001/0008751 A1 | 7/2001 | Chishti |
| 2001/0034010 A1 | 10/2001 | MacDougald |
| 2002/0010568 A1 | 1/2002 | Rubbert |
| 2002/0028418 A1 | 3/2002 | Farag |
| 2002/0160337 A1 | 10/2002 | Klein |
| 2002/0167100 A1 | 11/2002 | Moszner |
| 2003/0130605 A1 | 7/2003 | Besek |
| 2003/0222366 A1 | 12/2003 | Stangel |
| 2004/0029074 A1 | 2/2004 | Brainovic |
| 2004/0048227 A1 | 3/2004 | Brainovic |
| 2004/0063062 A1 | 4/2004 | Brajnovic |
| 2004/0219477 A1 | 11/2004 | Harter |
| 2004/0219479 A1 | 11/2004 | Malin |
| 2004/0219490 A1 | 11/2004 | Gartner |
| 2004/0220691 A1 | 11/2004 | Hofmeister |
| 2004/0243481 A1 | 12/2004 | Bradbury |
| 2004/0259051 A1 | 12/2004 | Brainovic |
| 2004/0265082 A1* | 12/2004 | Abrams ............. A61B 17/1617 |
| | | 408/226 |
| 2005/0023710 A1 | 2/2005 | Brodkin |
| 2005/0037320 A1 | 2/2005 | Poirier |
| 2005/0056350 A1 | 3/2005 | Dolabdjian |
| 2005/0070782 A1 | 3/2005 | Brodkin |
| 2005/0084144 A1 | 4/2005 | Feldman |
| 2005/0100861 A1 | 5/2005 | Choi |
| 2005/0142516 A1* | 6/2005 | Cohen .................... A61C 1/141 |
| | | 433/128 |
| 2005/0170311 A1 | 8/2005 | Tardieu |
| 2005/0271996 A1 | 12/2005 | Sporbert |
| 2005/0277089 A1 | 12/2005 | Brajnovic |
| 2005/0277090 A1 | 12/2005 | Anderson |
| 2005/0277091 A1 | 12/2005 | Andersson |
| 2005/0282106 A1 | 12/2005 | Sussman |
| 2005/0283065 A1 | 12/2005 | Babayoff |
| 2006/0006561 A1 | 1/2006 | Brainovic |
| 2006/0008763 A1 | 1/2006 | Brainovic |
| 2006/0008770 A1 | 1/2006 | Brajnovic |
| 2006/0093988 A1 | 5/2006 | Swaelens |
| 2006/0094951 A1 | 5/2006 | Dean |
| 2006/0127848 A1 | 6/2006 | Sogo |
| 2006/0210949 A1 | 9/2006 | Stoop |
| 2006/0234184 A1 | 10/2006 | Grimm |
| 2006/0263741 A1 | 11/2006 | Imgrund |
| 2006/0281041 A1 | 12/2006 | Rubbert |
| 2007/0015111 A1 | 1/2007 | Kopelman |
| 2007/0031790 A1 | 2/2007 | Raby |
| 2007/0065777 A1 | 3/2007 | Becker |
| 2007/0077532 A1 | 4/2007 | Harter |
| 2007/0092854 A1 | 4/2007 | Powell |
| 2007/0141525 A1 | 6/2007 | Cinader, Jr. |
| 2007/0206996 A1* | 9/2007 | Bharadwaj ......... A61B 17/1633 |
| | | 408/202 |
| 2007/0211081 A1 | 9/2007 | Quadling |
| 2007/0218426 A1 | 9/2007 | Quadling |
| 2007/0269769 A1 | 11/2007 | Marchesi |
| 2007/0281277 A1 | 12/2007 | Brajnovic |
| 2008/0038692 A1 | 2/2008 | Andersson |
| 2008/0044794 A1 | 2/2008 | Brainovic |
| 2008/0057467 A1 | 3/2008 | Gittelson |
| 2008/0070181 A1 | 3/2008 | Abolfathi |
| 2008/0085489 A1 | 4/2008 | Schmitt |
| 2008/0090210 A1 | 4/2008 | Brajnovic |
| 2008/0114371 A1 | 5/2008 | Kluger |
| 2008/0118895 A1 | 5/2008 | Brainovic |
| 2008/0124676 A1 | 5/2008 | Marotta |
| 2008/0153060 A1 | 6/2008 | De Moyer |
| 2008/0153061 A1 | 6/2008 | Marcello |
| 2008/0153065 A1 | 6/2008 | Brainovic |
| 2008/0153069 A1 | 6/2008 | Holzner |
| 2008/0167653 A1* | 7/2008 | Watlington ......... A61B 17/1688 |
| | | 606/81 |
| 2008/0176189 A1 | 7/2008 | Stonisch |
| 2008/0206714 A1 | 8/2008 | Schmitt |
| 2008/0241798 A1 | 10/2008 | Holzner |
| 2008/0261165 A1 | 10/2008 | Steingart |
| 2008/0300716 A1 | 12/2008 | Kopelman |
| 2009/0011382 A1 | 1/2009 | Bavar |
| 2009/0017418 A1 | 1/2009 | Gittelson |
| 2009/0026643 A1 | 1/2009 | Wiest |
| 2009/0042167 A1 | 2/2009 | Van Der Zel |
| 2009/0081616 A1 | 3/2009 | Pfeiffer |
| 2009/0087817 A1 | 4/2009 | Jansen |
| 2009/0092948 A1 | 4/2009 | Gantes |
| 2009/0098510 A1 | 4/2009 | Zhang |
| 2009/0098511 A1 | 4/2009 | Zhang |
| 2009/0123045 A1 | 5/2009 | Quadling |
| 2009/0123887 A1 | 5/2009 | Brainovic |
| 2009/0187393 A1 | 7/2009 | Van Lierde |
| 2009/0220134 A1 | 9/2009 | Cahill |
| 2009/0220916 A1 | 9/2009 | Fisker |
| 2009/0220917 A1 | 9/2009 | Jensen |
| 2009/0239197 A1 | 9/2009 | Brainovic |
| 2009/0239200 A1 | 9/2009 | Brainovic |
| 2009/0253097 A1 | 10/2009 | Brainovic |
| 2009/0287332 A1 | 11/2009 | Adusumilli |
| 2009/0298009 A1 | 12/2009 | Brainovic |
| 2009/0298017 A1 | 12/2009 | Boeijes |
| 2009/0317763 A1 | 12/2009 | Brainovic |
| 2009/0325122 A1 | 12/2009 | Brainovic |
| 2010/0009314 A1 | 1/2010 | Tardieu |
| 2010/0028827 A1 | 2/2010 | Andersson |
| 2010/0038807 A1 | 2/2010 | Brodkin |
| 2010/0075275 A1 | 3/2010 | Brainovic |
| 2010/0092904 A1 | 4/2010 | Esposti |
| 2010/0173260 A1 | 7/2010 | Sogo |
| 2010/0280798 A1 | 11/2010 | Pattijn |
| 2011/0008751 A1 | 1/2011 | Pettersson |
| 2011/0060558 A1 | 3/2011 | Pettersson et al. |
| 2011/0191081 A1 | 8/2011 | Malfliet |

(56) References Cited

U.S. PATENT DOCUMENTS

| | | | | |
|---|---|---|---|---|
| 2011/0196380 A1* | 8/2011 | Cremer | B23B 31/2073 | 606/104 |
| 2011/0238071 A1* | 9/2011 | Fernandez-Scoma | A61C 1/084 | 606/80 |
| 2011/0275032 A1 | 11/2011 | Tardieu | | |
| 2012/0010740 A1 | 1/2012 | Swaelens | | |
| 2012/0164593 A1 | 6/2012 | Bavar | | |
| 2012/0164893 A1 | 6/2012 | Mitsuzuka | | |
| 2014/0057224 A1* | 2/2014 | Huang | A61C 1/084 | 433/75 |
| 2014/0093838 A1 | 4/2014 | Carmichael et al. | | |
| 2014/0120495 A1* | 5/2014 | Zeigler, Jr. | A61C 3/02 | 433/173 |
| 2014/0193771 A1* | 7/2014 | Dolfi | A61C 3/02 | 433/76 |
| 2016/0022388 A1 | 1/2016 | Fassberg et al. | | |
| 2016/0081765 A1 | 3/2016 | Sanders et al. | | |

FOREIGN PATENT DOCUMENTS

| | | |
|---|---|---|
| DE | 102005005656 A1 | 1/2006 |
| EP | 1894539 | 3/2008 |
| EP | 2060240 | 5/2009 |
| GB | 2578426 | 5/2020 |
| WO | WO 94/26200 | 11/1994 |
| WO | WO 99/32045 | 7/1999 |
| WO | WO 00/08415 | 2/2000 |
| WO | WO 01/58379 | 8/2001 |
| WO | WO 02/053055 | 7/2002 |
| WO | WO 03/024352 | 3/2003 |
| WO | WO 2004/030565 | 4/2004 |
| WO | WO 2004/075771 | 9/2004 |
| WO | WO 2004/087000 | 10/2004 |
| WO | WO 2004/098435 | 11/2004 |
| WO | WO 2006/014130 | 2/2006 |
| WO | WO 2006/062459 | 6/2006 |
| WO | WO 2006/082198 | 8/2006 |
| WO | WO 2007/033157 | 3/2007 |
| WO | WO 2007/104842 | 9/2007 |
| WO | WO 2007/129955 | 11/2007 |
| WO | WO 2008/057955 | 5/2008 |
| WO | WO 2008/083857 | 7/2008 |
| WO | WO 2016/024681 | 2/2016 |
| WO | WO 2018/071863 | 4/2018 |

OTHER PUBLICATIONS

Notice of Allowance for European Patent Application No. 21179893.9, dated Feb. 20, 2023 8 pages.

Extended European Search Report for European Patent Application No. 21179893.9, dated Feb. 23, 2022 10 pages.

"European Application Serial No. 21179893.9, Partial European Search Report mailed Oct. 15, 2021", 9 pages.

"Navigator™ System for CT Guided Surgery Manual", BIOMET3i Navigator™; pp. 1-26, Oct. 2007.

"Surgical Guide Cookbook, Brill Guides for Every Scenario"; Imaterialise Medical; pp. 1-87, Date unknown.

Machine Translation of Specification for BE 1011205 A3, Jun. 11, 1997, Vorstlaan, Jan Vander, 24 pgs.

Extended European Search Report for European Patent Application No. 23188173.1, dated Feb. 14, 2024 8 pgs.

European Application Serial No. 08019960.7, dated Apr. 24, 2009 Partial European Search Report, 4 pgs.

"European Application Serial No. 08019960.7, Communication Pursuant to Article 94(3) EPC mailed Feb. 15, 2010", 3 pgs.

"European Application Serial No. 08019960.7, Communication Pursuant to Article 94(3) EPC mailed Apr. 6, 2010", 4 pgs.

"European Application Serial No. 08019960.7, Communication Pursuant to Article 94(3) EPC mailed Sep. 1, 2010", 8 pgs.

"European Application Serial No. 08019960.7, Communication Pursuant to Article 94(3) EPC mailed Nov. 17, 2011", 3 pgs.

"European Application Serial No. 08019960.7, Extended European Search Report mailed Jul. 9, 2009", 12 pgs.

* cited by examiner

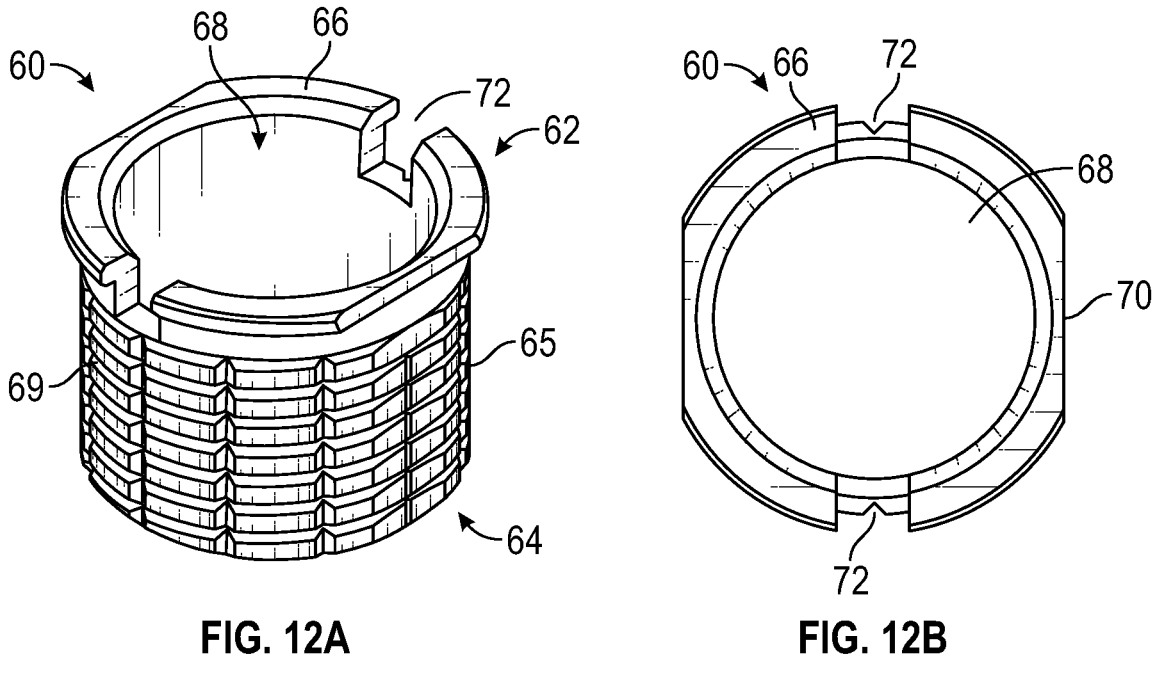
FIG. 12A  FIG. 12B
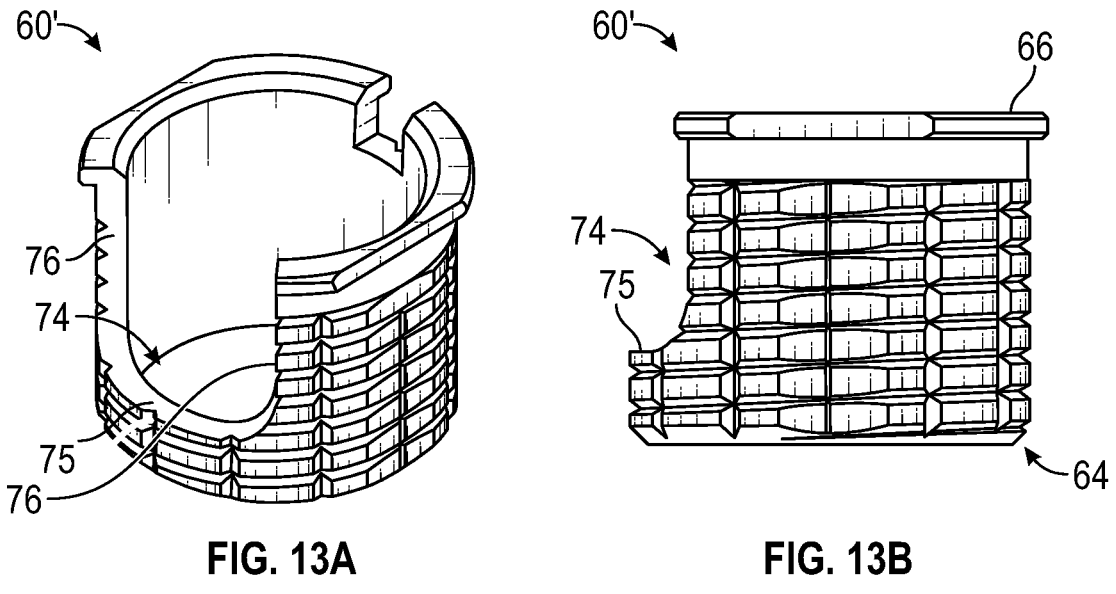
FIG. 13A  FIG. 13B

61'

80

61'                                    66

62

80

64

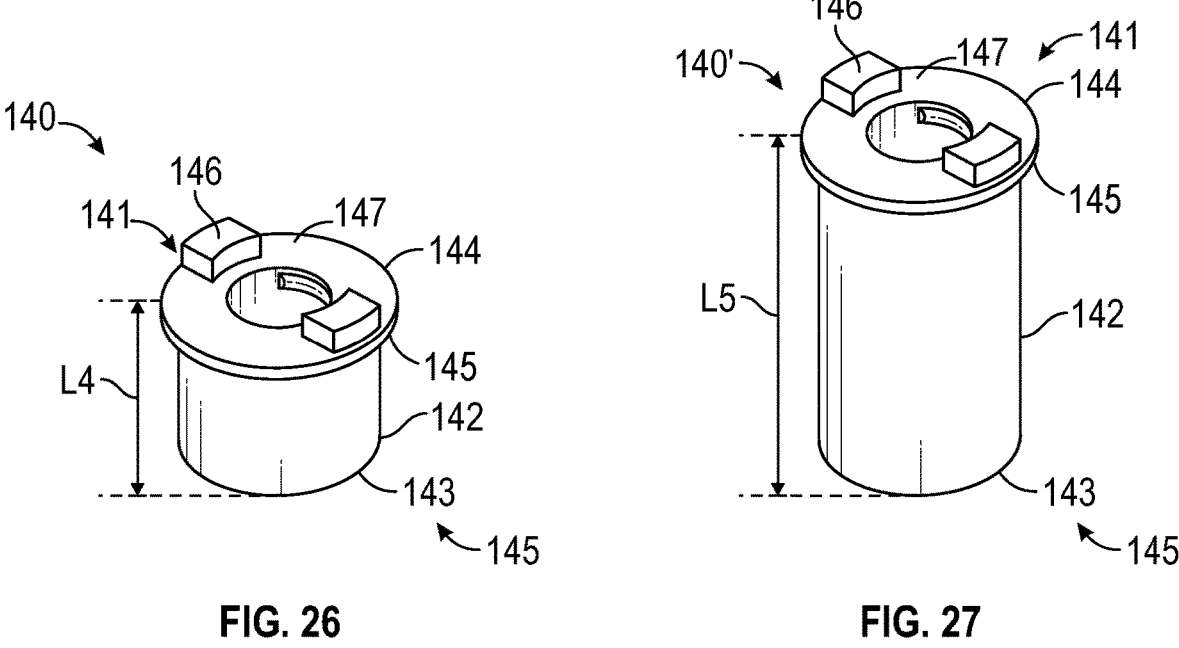
FIG. 26
FIG. 27
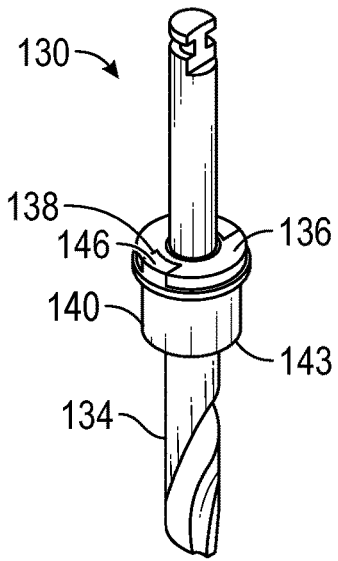
FIG. 28

150'

152

158
159
174
175

154

155

156

158

174

152

169

162'

168

172

166

167

158

168

154

156

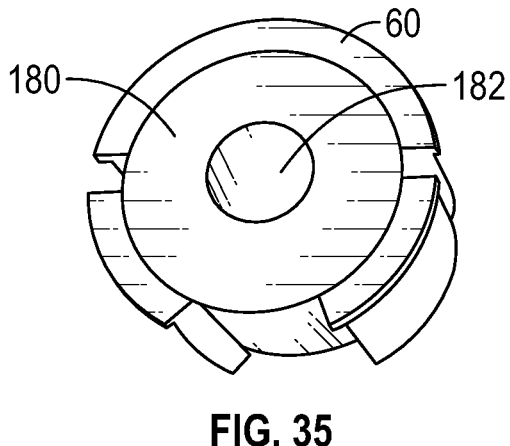
FIG. 35
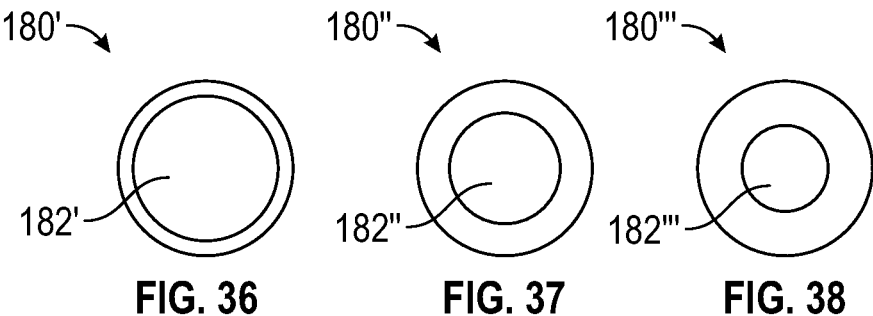
FIG. 36      FIG. 37      FIG. 38
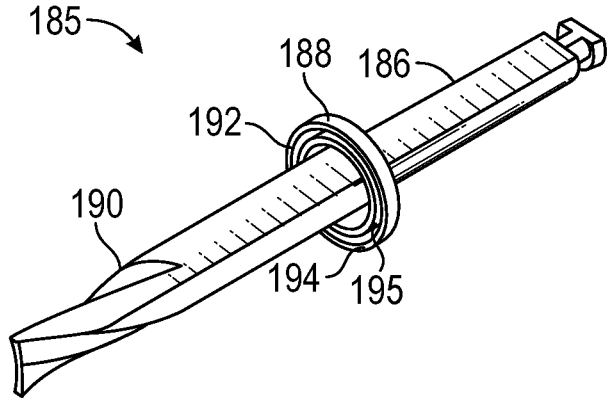
FIG. 39

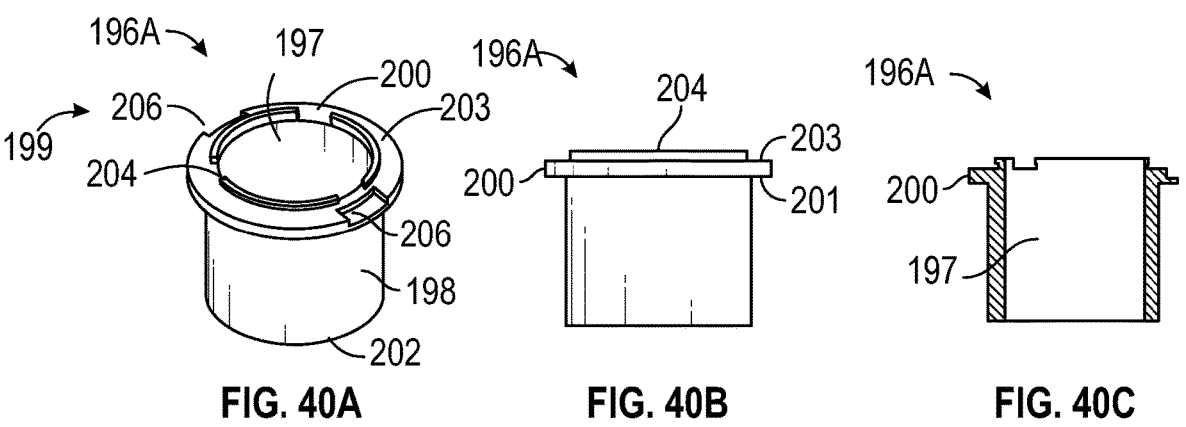
FIG. 40A          FIG. 40B          FIG. 40C
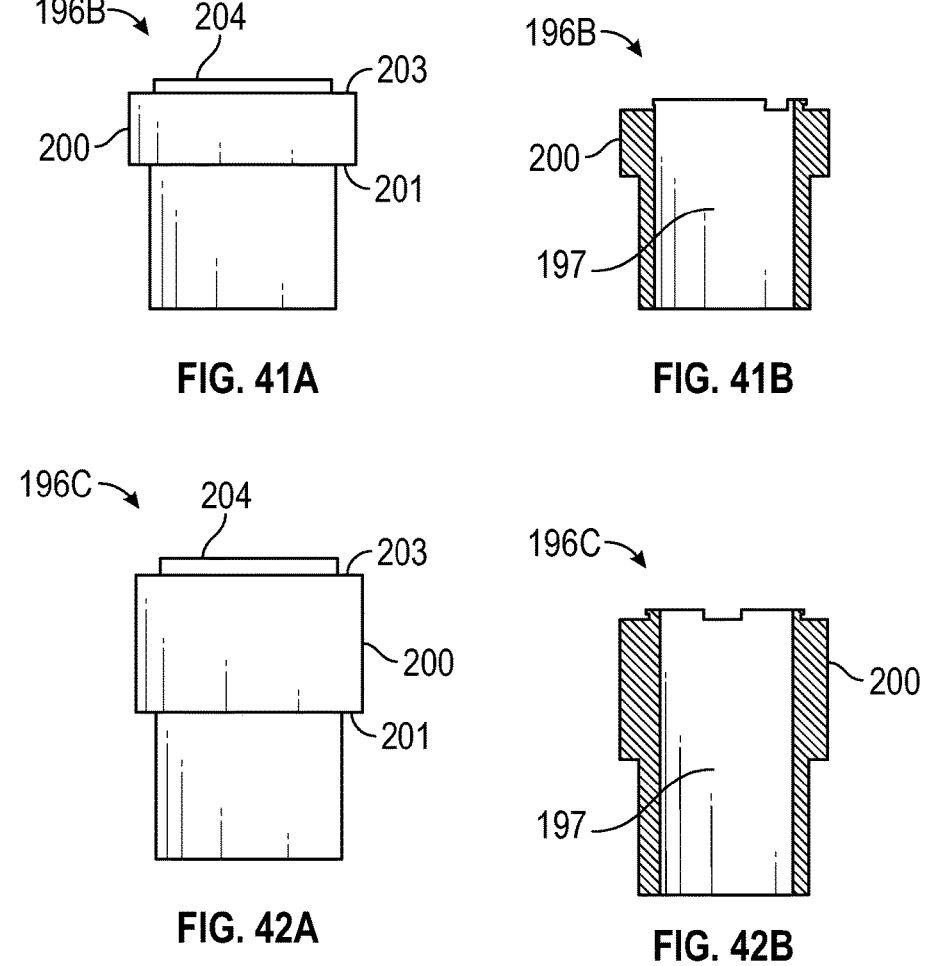
FIG. 41A          FIG. 41B
FIG. 42A          FIG. 42B

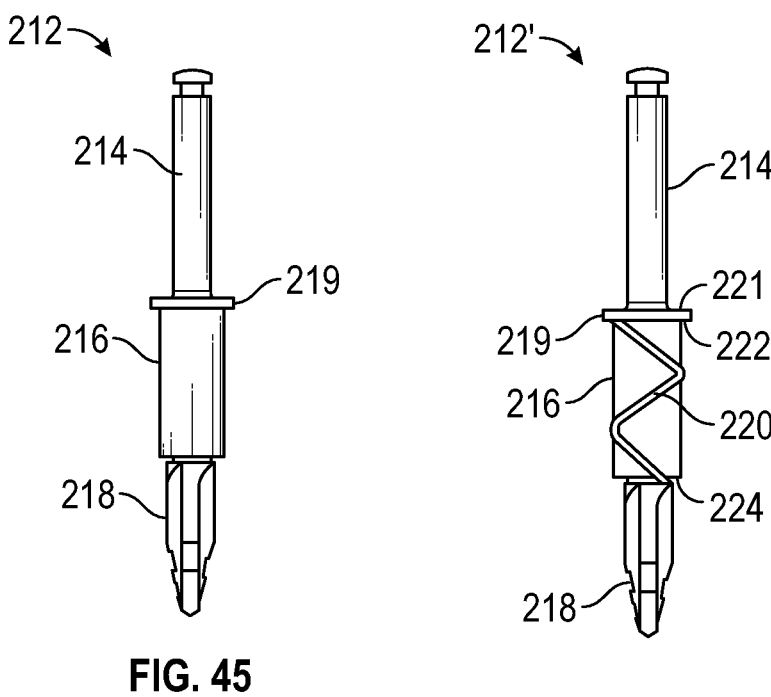
FIG. 45
FIG. 46
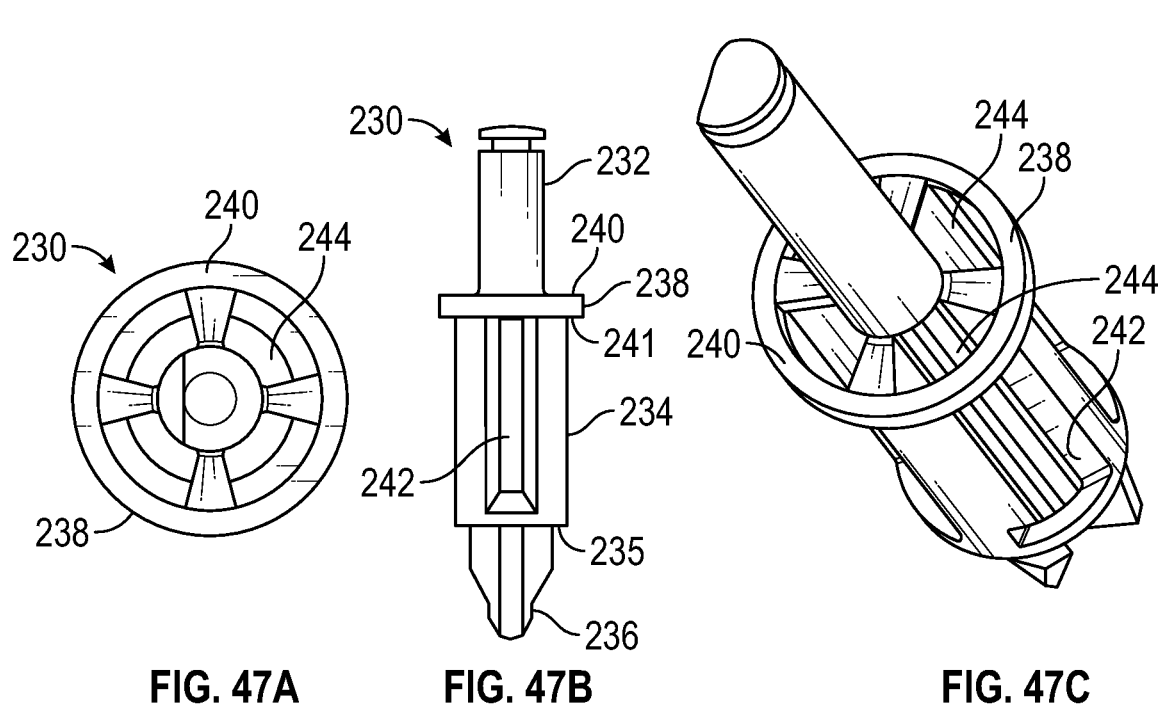
FIG. 47A        FIG. 47B        FIG. 47C

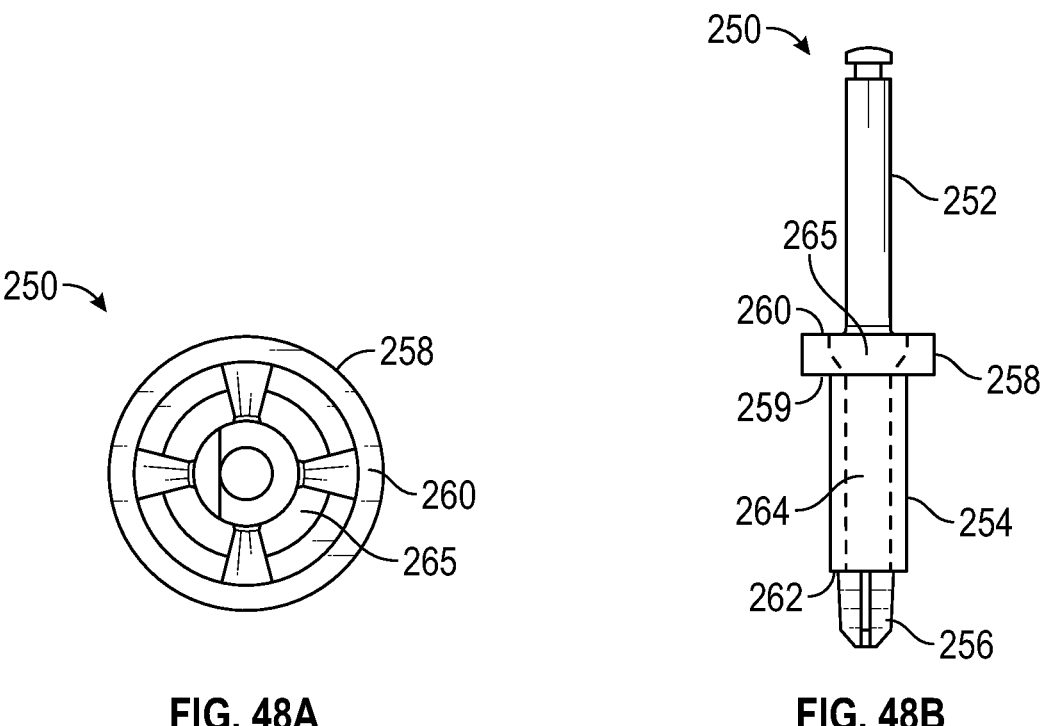
FIG. 48A                FIG. 48B
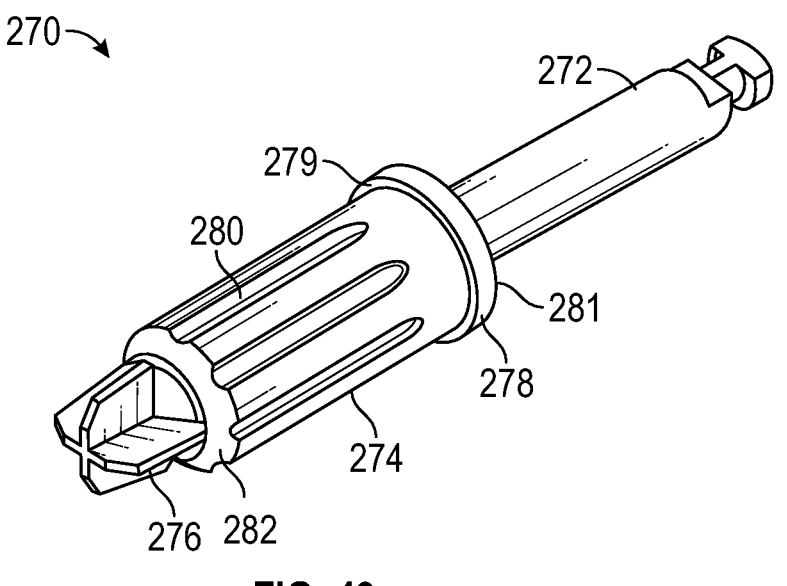
FIG. 49

150'

174

158

161

150'

152

161    158

159

174

175    154

155

156

350

352

356
354

358

360

350

354   355

355

358

360

500

508

505

504

502

506

510

512

516

517

514

520          518

512

516

514

518

504

506

500

508

524
526
528
527
522
520
502
505
504
506

524
528
530
522
531
502
504

COMPONENTS FOR USE WITH A SURGICAL GUIDE FOR DENTAL IMPLANT PLACEMENT

CLAIM OF PRIORITY

This application claims the benefit of U.S. Provisional Patent Application Ser. No. 63/039,620, filed on Jun. 16, 2020, the benefit of priority of which is claimed hereby, and which is incorporated by reference herein in its entirety.

TECHNICAL FIELD

The present subject matter is related to devices and methods for use with dental implant systems. More particularly, the present disclosure relates to components used with a surgical guide that allows for placement of dental implants.

BACKGROUND

The dental restoration of a partially or wholly edentulous patient with artificial dentition is typically done in two stages. In the first stage, an incision is made through the gingiva to expose the underlying bone. After a series of drill bits creates an osteotomy in the bone, a dental implant is placed in the jawbone for integration. The dental implant generally includes a threaded bore to receive a retaining screw holding mating components therein. During the first stage, the gum tissue overlying the implant is sutured and heals as the osseointegration process continues.

Once the osseointegration process is complete, the second stage is initiated. Here, the gum tissue is re-opened to expose the end of the dental implant. A healing component or healing abutment is fastened to the exposed end of the dental implant to allow the gum tissue to heal therearound. Preferably, the gum tissue heals such that the aperture that remains generally approximates the size and contour of the aperture that existed around the natural tooth that is being replaced. To accomplish this, the healing abutment attached to the exposed end of the dental implant has the same general contour as the gingival portion of the natural tooth being replaced.

During the typical second stage of dental restoration, the healing abutment is removed, and an impression coping is fitted onto the exposed end of the implant. This allows an impression of the specific region of the patient's mouth to be taken so that an artificial tooth is accurately constructed. After these processes, a dental laboratory creates a prosthesis to be permanently secured to the dental implant from the impression that was made.

In addition to the more traditional system for placing dental implants described above, some systems use guided placement of the dental implants. To do so, a surgical guide is placed in the patient's mouth at the known location. The surgical guide includes openings for providing the exact placement of the drill bits used to create the osteotomy. Once the osteotomy is completed, the surgical guide may permit the dental implant to be placed through the same opening and enter the osteotomy that was guided by the surgical guide.

Surgical guides can be created by the use of a computerized tomography (CT) scan of the patient's mouth. The CT-scan provides enough detail to develop the surgical guide by use of various methods. For example, a CT-scan can provide the details of the patient's gum tissue and/or remaining teeth so that the surgical guide can be developed based on computer-aided design (CAD) and computer-aided manufacturing (CAM).

However, a need exists to develop an improved kit of components that can be incorporated into the surgical guide and that can be used in conjunction with the surgical guide. The improved set of components can be used to install the implant such that its non-rotation feature (e.g., hexagonal boss or socket) is at a correct orientation when finally installed in the patient's bone via the surgical guide. Furthermore, corresponding laboratory components that are used with the kit would be required as well to develop a temporary or final prosthesis.

OVERVIEW

The present inventors have recognized, among other things, that various components of surgical guides can be improved to solve problems associated with traditional surgical guide kits. For example, master tubes are located within the surgical guide at locations according to a dental plan where dental implants will be located. The present inventors have recognized that providing an irrigation channel within the master tube that corresponds to an irrigation channel (or aperture)) fabricated in the surgical guide can be beneficial during drilling to clear debris. In another embodiment, irrigation can further be improved by fabricating the surgical guide with a liner (or manifold) such that overall irrigation can be easily and effectively provided to the surgical guide during use.

The present inventors have also recognized that irrigation can be provided during drilling by providing grooved guide bodies to provide a pathway for irrigation. For example, the various grooves on the guide body can extend from a drilling portion, along the guide body to a stop surface (e.g., a flange). The stop surface also can have an opening in communication with the grooved body to facilitate the irrigation from outside the patient to the drilling portion during drilling.

The present inventors have further recognized a need for increasing the stabilization of the surgical guide. As discussed herein, based on the created dental plan, the location of the dental implants is determined, and the surgical guide is fabricated based on the patient and location of the desired implants. Because of nearby teeth, the location and angle at which the implants are inserted are important. While the fabricated guide includes the desired location and angle, any movement during use can increase error and result in damaging nearby teeth and not providing the dental implant in the desired location at the desired angle. Thus, securely fastening the surgical guide to the patient is important. The present inventors have found that including a threaded tube within the surgical guide that is configured to threadably engage with threads on threaded fixation pins can increase the stability of the surgical guide within the patients mouth and minimize lateral and horizontal movements during user.

Depending on various circumstances (e.g., of the thickness of the surgical guide along a portion of the surgical guide) during drilling, a user may need a drill that is compatible with a short prolongation master tube or a long prolongation master tube. The present inventors have recognized that having a custom drill that can be used with either prolongation would be beneficial. Thus, the present inventors have provided a custom drill that can be used with a prolongation attachment that couples to the drill in a first orientation that can be used for short prolongation and when coupled to the drill in a second orientation can be used for long prolongation. Additionally, the present inventors have provided hybrid bone taps that can be used for short and long prolongations.

Further, the present inventors have found a need for an interchangeable guide body. The guide body of the drill provides sufficient prolongation as well as matching the master tube diameters. The present inventors have provided an interchangeable guide body that can couple with a drill body. This allows for an individual drill body to be for various cases containing varied prolongations and/or varied master tube diameters as the guide body/isolatch is selected based on the particular guide body to be passed through the surgical guide or the implant to be placed.

This Overview is intended to provide non-limiting examples of the present subject matter—it is not intended to provide an exclusive or exhaustive explanation. The Detailed Description below is included to provide further information about the present apparatuses, systems and methods.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

FIG. 12A illustrates a perspective view of a master tube in accordance with an example of the present disclosure.

FIG. 12B illustrates a top-down view of the master tube in FIG. 12A.

FIG. 13A illustrates a perspective view of the master tube including a lateral access channel in accordance with an example of the present disclosure.

FIG. 13B illustrates a side view of the master tube in FIG. 13A.

FIG. 26 illustrates a perspective view a first guide body in accordance with an example of the present disclosure.

FIG. 27 illustrates a perspective view a second guide body in accordance with an example of the present disclosure.

FIG. 28 illustrates a perspective view of the first guide body coupled to the drill in FIGS. 25A and B.

FIG. 35 illustrates a perspective view of a magnetized drill flange positioned within a master tube in accordance with an example of the present disclosure.

FIG. 36-38 illustrate top-down views of examples of magnetized drill flanges in accordance with examples of the present disclosure.

FIG. 39 illustrates a side-view of a drill in accordance with an example of the present disclosure.

FIG. 40A-C illustrate a perspective, side-view and cross-sectional view of a prolongation stopper in accordance with an example of the present disclosure.

FIGS. 41A-B illustrate a side view and cross-sectional view of another prolongation stopper in accordance with an example of the present disclosure.

FIGS. 42A-B illustrate a side view and cross-sectional view of another prolongation stopper in accordance with an example of the present disclosure.

FIGS. 45-52B illustrate irrigation drills in accordance with examples of the present disclosure.

DETAILED DESCRIPTION

Figure 1:
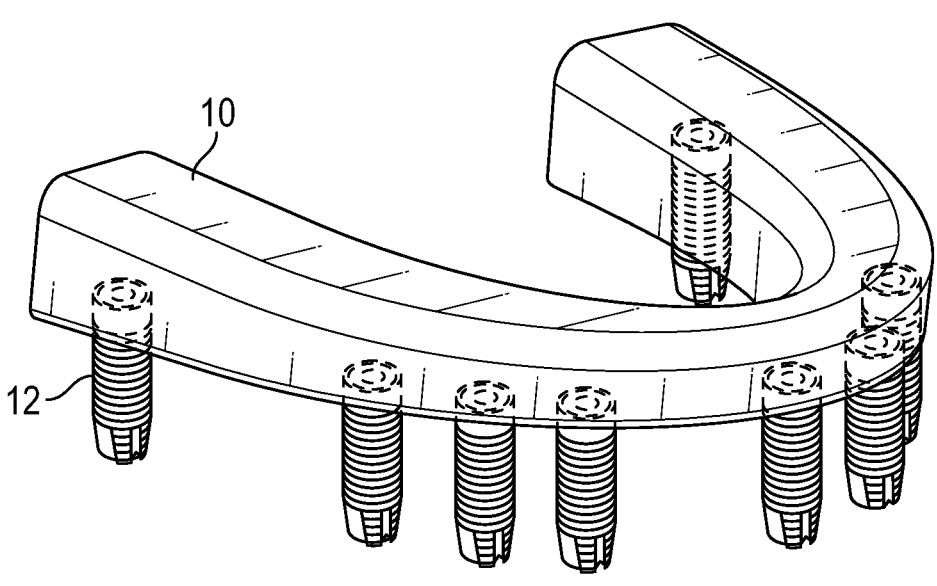
FIG. 1 illustrates a virtual installation of dental implants under the gingival surface overlaying the mandible in the patient's mouth in accordance with an example of the present application.

The present application relates to tools, systems, and method. In particular, the present invention related to various components used for making and using a surgical guide that allows for placement of dental implants according to a dental plan.

It is known to replace either missing teeth or carious teeth where the progress of caries is such that the teeth cannot be fixed in another, less invasive way. Missing teeth are usually replaced by an endosseous implant (referred to herein as "dental implant" or "implant") with an artificial suprastructure. The implant can be inserted into the patient after an osteotomy is formed by drilling.

Drilling the osteotomy and implanting the dental implant were previously dependent on the skills of the individual surgeon. However, nowadays surgical guides (also referred to as "drill templates"), which are adapted to the anatomy of the individual patient serve to achieve a precise drilling of the holes and implantation of the dental implant according to a dental plan.

The dental plan for the patient may be developed by scanning the patient's mouth (or stone model of a patient's mouth) with a CT scanner (or other scanning technologies or devices) to obtain the details of the bone structure, teeth and overlying gingival tissue. When considering the dental plan for a specific patient, the location of the implant(s) relative to the surface of the gingival tissue, underlying bone, and neighboring implants and/or teeth is important. Additionally, the maximum depth of the distal end of the implant within the bone is also important, so as to avoid the sinus cavity and mandibular canal. To ensure the proper location for each implant (and the osteotomy for each implant), the scanning of the patient's mouth can be used to develop a surgical guide (e.g., by rapid prototyping and other techniques) that fits snugly onto the surface of the tissue by having a negative impression that incorporates the details of the tissue surface in the patient's mouth. By the term "tissue" in the present specification, it is understood that tissue can be hard tissue (such as bone tissue or teeth) and soft tissue (such as the gingival tissue). The remainder of the detailed description will assume that the patient is edentulous and that the surgical guide is resting on the soft tissue.

The surgical guide can be attached to the patient and is used by the surgeon to provide an optimal guiding of the drill and the dental implant thereby achieving the desired axis and dimensions of the hole as well as accurate placement of the dental implant. The drilling of the holes is important for successful implantation, since it is difficult to correct wrongly positioned bore holes. Even slight corrections, e.g. of the drill axis, further diminish jaw bone mass and are thus difficult to correct.

According to one aspect of this application, the present inventors have recognized, among other things, that an improvement to coupling surgical guides to a patient is needed. In particular, in order to provide the most accurate drilling and implantation of the dental implant, the surgical guide needs to be securely coupled to the patient's jaw or the gum of the patient throughout the overall procedure. As discussed herein, any movement of the surgical guide between drilling and/or implanting implant(s) can cause various issues if the osteotomy and implant location are misaligned from the dental plan.

FIG. 1 schematically illustrates a computerized dental plan that is created by scanning the patient's mouth (or stone model of the patient's mouth), The scan reveals a virtual gingival surface 10 that would overlay the bone structure in the patient's mouth. To provide structural support for a bar-type denture for a prosthesis, the dental plan in FIG. 1 includes eight dental implants 12 (virtual implants in FIG. 1) placed at specific locations and angles in the patient's bone. The sizes of the dental implants 12, as well as their locations and angles, are chosen based on the various bone densities, underlying tissue (e.g., sinus cavity or mandibular canal), and neighboring implants and/or teeth provided by the scan or other means. These adjustments are preferably made through inputs to a computer to define the best possible dental plan for the particular patient. In the illustrated embodiment, the gingival surface 10 represents the gingiva overlaying the maxilla, such that the dental implants 12 extend upwardly toward the sinus cavity. As described herein, the end result of the dental plan is that eight dental implants 12 are installed in the patient's maxilla at the depths and angles defined by the dental plan. In one example, the dental implants 12 are then attached to a bar structure that is part of the denture-type dental prosthesis that is developed for that particular patient. One example of forming and using a surgical guide with various components is disclosed in U.S. Pat. No. 8,777,612, which is herein incorporated by reference in its entirety.

Figure 2:
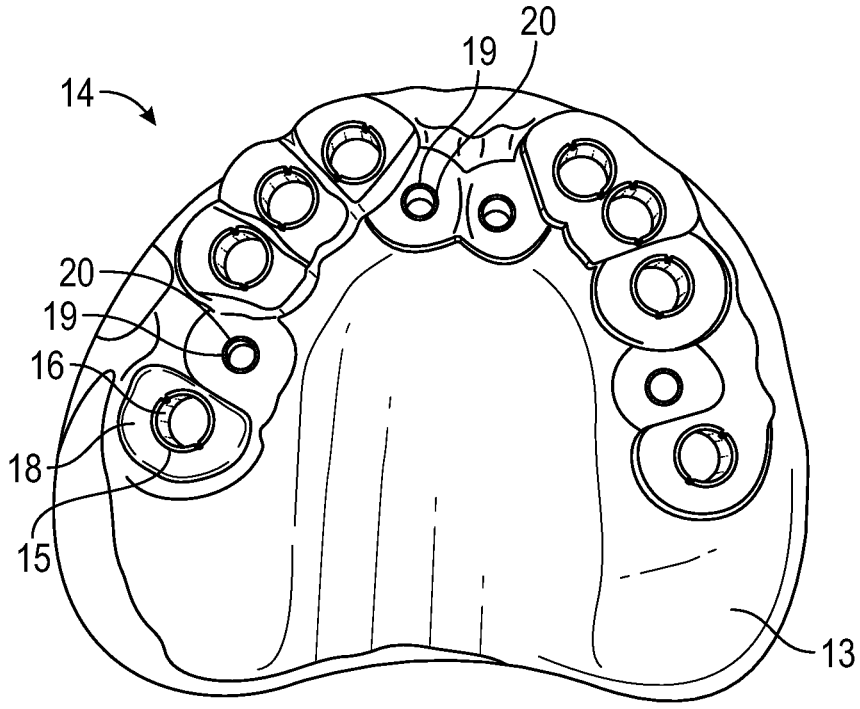
FIG. 2 illustrates a top view of a surgical guide that is used in the patient's mouth to guide the placement of the dental implants in accordance to the planned installation of FIG. 4 in accordance with an example of the present application.

Based on the dental plan, a surgical guide 14 is developed, as shown in FIG. 2, The surgical guide 14 can be produced from various materials and techniques. One preferred method is using a rapid-prototyping technique based on the scanned images within the patient's mouth. However, other known techniques can be used. The surgical guide 14 includes a top surface 13 and an under surface 19 (see FIGS. 6 and 7). The under surface 19 is the surface that will contact the patient's tissue and the top surface 13 opposes the under surface 19.

As seen in FIG. 2, because there is a need for eight implants 12 according to the dental plan, the surgical guide 14 includes eight openings 15, each of which is defined by a master tube 16 that is integrated into the material of the surgical guide 14 with the assistance of, e.g., an outer roughened surface and adhesive. In an example, the master tubes 16 are located on flat surfaces 18 that are substantially flush with the top surface of the master tubes 16. The under surface 19 of the surgical guide 14 (see FIGS. 6 and 7) has a contour that follows the scanned gingival surface 10 (FIG.

1) in the patient's mouth. In other words, the under surface 19 of the surgical guide 14 is a negative impression of the gingival surface 10 (which can include hard or soft tissue, as described herein). The surgical guide 14 also includes a plurality of openings 19 through which fixation tubes 20 can be affixed. In an example, the fixation tubes 20 can be integrated into the material of the surgical guide 14 with the assistance of an outer roughened surface and adhesive.

As discussed herein, the fixation tubes 20 can engage with temporary fixation pins 22. The temporary fixation pins 22 engage the bone and hold the surgical guide 14 in the proper location on the gingival surface 10 (FIG. 1) so that the dental plan can be executed using the surgical guide 14. As mentioned previously, the surgical guide 14 can also be a negative impression of the surface of adjacent teeth and bone tissue in some situations and rest against the adjacent teeth and bone tissue.

Figure 3:
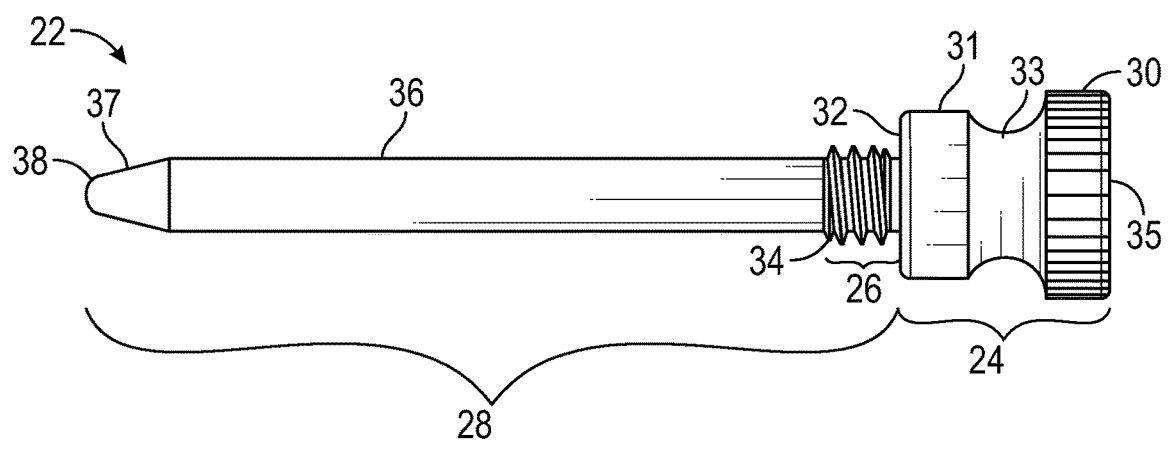
FIG. 3 illustrates a side view of a fixation pin in accordance with an example of the present disclosure.

FIG. 3 illustrates a side-view of the fixation pin 22. Fixation pin 22 includes a head 24 and an elongated shaft 28 extending from the head 24. The head 24 and the elongated shaft 289 are coaxially arranged and have a common axis. The head 24 includes a proximal surface 35 and a bearing surface 32. The bearing surface 32 is configured to at least partially contact the surgical guide 14 and/or the fixing tube 20. In an example, the head 24 can include two flanges 30, 31 connected by a surface 33 (e.g., a curved surface). In an example, a first flange 30, defining the proximal surface 35, can have a diameter that is greater than a diameter of a second flange 31 that defines the bearing surface 32. In an example, the surface 33 can be a circumventing indentation having a concave shape that connects the two flanges 30, 31. In other examples, the surface 33 does not include a curve and can have, e.g., a tapered cross-section. In one example, the head 24 can include a single flange having a constant or non-constant diameter.

The elongated shaft 28 includes a threaded portion 26 configured to engage the threads of the fixation tube 20. In one example, the threaded portion 26 is adjacent to the head 24, e.g., adjacent the bearing surface 32. The elongated shaft 28 can further include a tapered portion 27 extending to an apical tip 38. A portion of the elongated shaft 28 extending between the threaded portion 26 and the tapered portion 27 can have a shape of a circular cylinder and have a diameter that is substantially constant.

Figure 4:
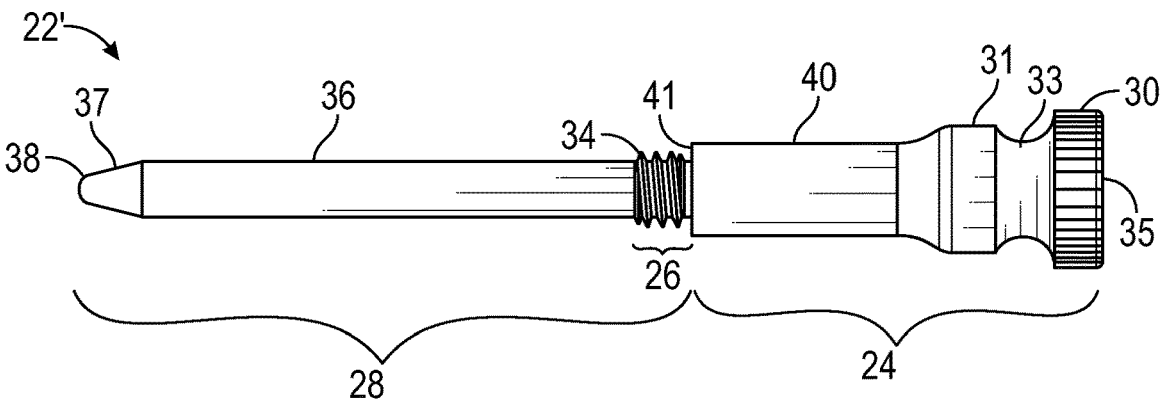
FIG. 4 illustrates a side view of a fixation pin in accordance with an example of the present disclosure.

FIG. 4 illustrates a side-view of fixation pin 22'. Fixation pin 22' in FIG. 4 is the same as the fixation pin 22 in FIG. 3, except that fixation pin 22' includes an extension 40. In an example, the extension 40 can extend from the second flange 31 to a bearing surface 41. The fixation pin 22' including the extension 40 can be used in areas that lip retraction is needed. That is, the extension 40 can increase the distance between the bearing surface 41 and the proximal surface 35 to retract the lip of the patient while the surgical guide 14 (FIG. 2) is being used. The fixation pins 22 shown in FIG. 3 can be used in areas that lip retraction is not needed or would impair, e.g., patient function (e.g., fully opening their mouth) or a path used for executing the dental plan (e.g., getting in the way of equipment used during the procedure).

Figure 5:
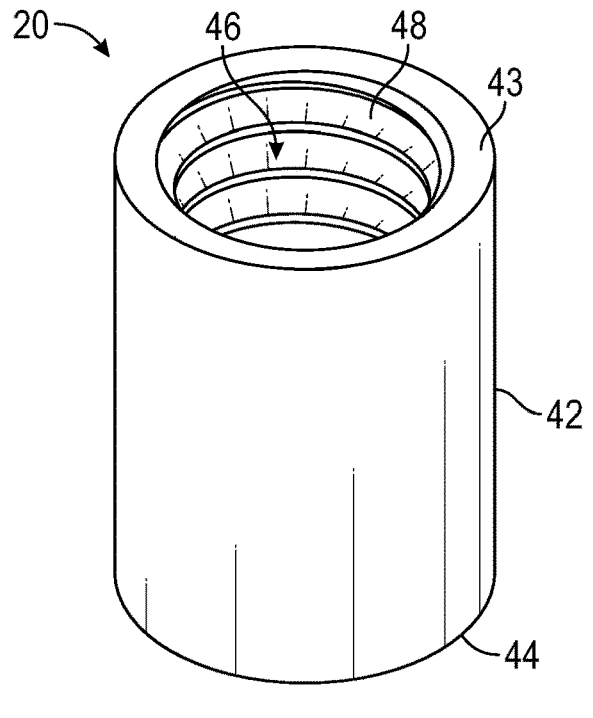
FIG. 5 illustrates a perspective view of a fixation tube in accordance with an example of the present disclosure.

FIG. 5 illustrates a perspective view of the fixation tube 20. The fixation tube 20 has a body 42 that extends from a first end 43 to a second end 44. The fixation tube 20 defines a bore 46 that includes threads 48. As discussed herein, the threads 48 of the fixation tube 20 engage the threads 34 of the fixation tube to temporarily fixing surgical guide 14 in the mouth of the patient and, more precisely to the jaw of the patient.

Figures 6, 7:
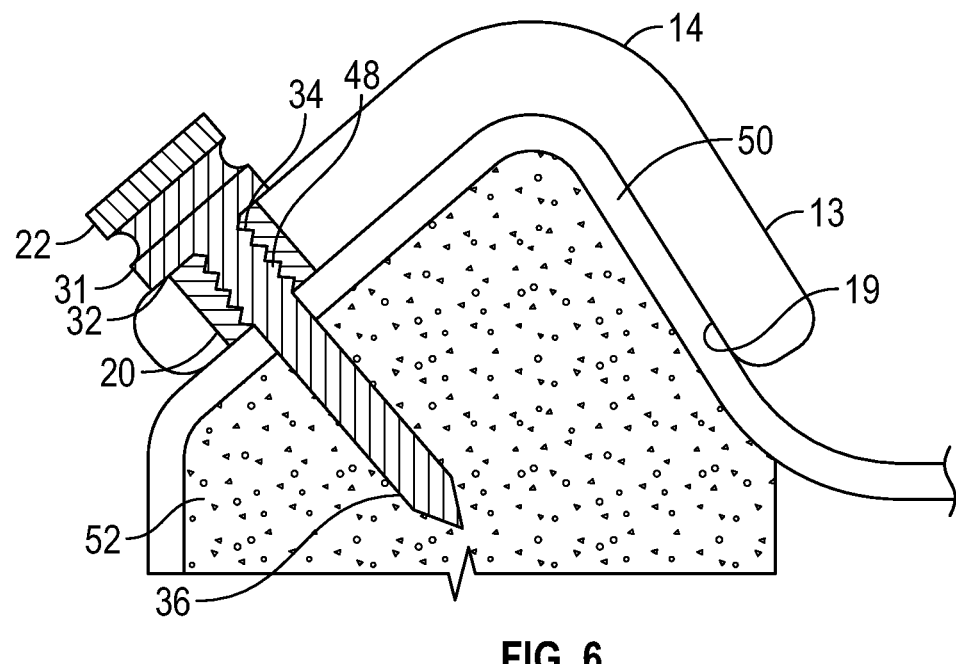
FIG. 6 illustrates a cross-sectional view of fixation pin of FIG. 3 coupling the surgical guide to the patient in accordance with an example of the present application.
FIG. 7 illustrates a cross-sectional view of fixation pin of FIG. 4 coupling the surgical guide to the in accordance with an example of the present application.
Figure 8:
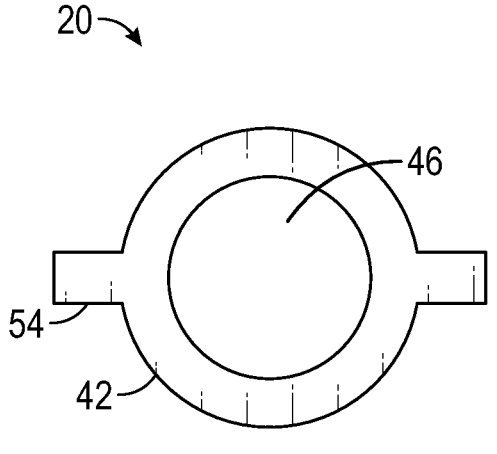
FIG. 8 illustrates a cross-sectional view of a fixation tube in accordance with an example of the present disclosure.

FIGS. 6 and 7 illustrate the fixation pins 22, 22' engaging the bone 52 and hold the surgical guide 14 in the proper location on the gingival surface 50 so that the dental plan can be executed using the surgical guide 14. The fixation pins 22, 22' extend through the bore 46 of the fixation tube 20 through the gingival surface 50 and into the bone 52 of the patient. The fixation tube 20 is configured to be integrated or able to be integrated in the surgical guide 14, for instance by adhesive bonding, among other methods. As discussed herein, the fixation pin 22, 22' can be inserted through the fixation tube 20 until the threads 26 of the fixation pin 22, 22' engage the threads 48 of the fixation tube 20. Once engaged, a surgeon can rotate the fixation pin 22, 22' to further advance the fixation pin 22, 22' into the bone 52 and securely couple the surgical guide 14 to the patient's jaw.

While shown as a cylinder in FIGS. 5-7, the fixation tube 20 can have other profile shapes. In one example, the profile of the fixation tube 20 along a longitudinal axis can have a tapered shape. For example, a diameter of the first end 43 can be greater than a diameter of the second end 44 of the fixation tube 20. Thus, when the rotational and longitudinal force is applied to the fixation tube 20, when the threads 26 of the fixation pin 22, 22' engage the threads 48 of the fixation tube 20, the tapered shape can assist in maintaining the position of the fixation tube 20 within the surgical guide 14.

Figure 54A:
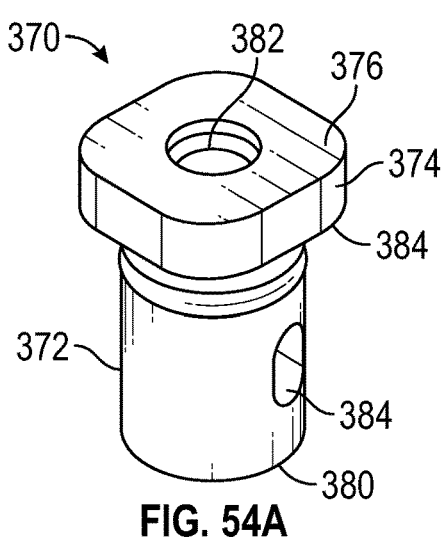
FIGS. 54A-B illustrate an insert to be used with the implant mounting block shown in FIGS. 53A-B.
Figure 54B:
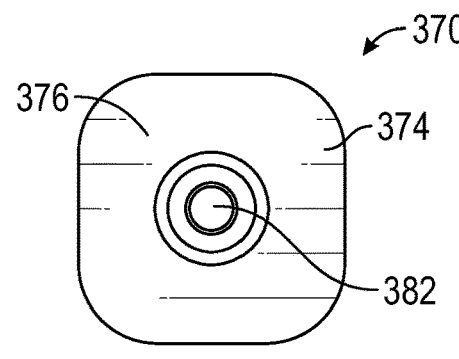

FIGS. 8-11 illustrate additional features that can be incorporated into the fixation tube 20, The fixation tube 20 can be incorporated into the surgical guide 14 similar to how the master tubes 16 are integrated to the surgical guide 14, e.g., using adhesive bonding. To further prevent the fixation tube 20 from rotating within the guide, the fixation tube 20 can include non-rotational features, such as projections 54, as seen in FIG. 54. The projections 54 can extend along a portion of the body 42 of the fixation tube 20. For example, the projections 54 can extends less than half of a total length of the fixation tube 20, more than half, or the entire length of the fixation tube 20.

Figure 9:
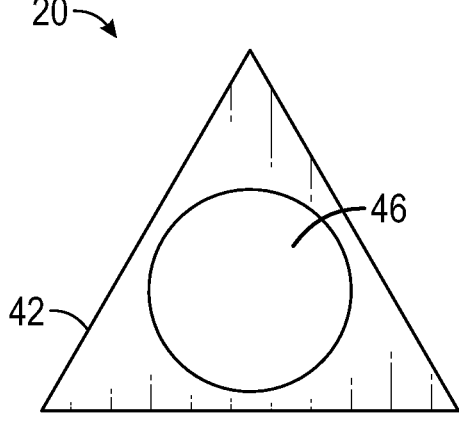
FIG. 9 illustrates a cross-sectional view of a fixation tube in accordance with an example of the present disclosure.
Figure 10:
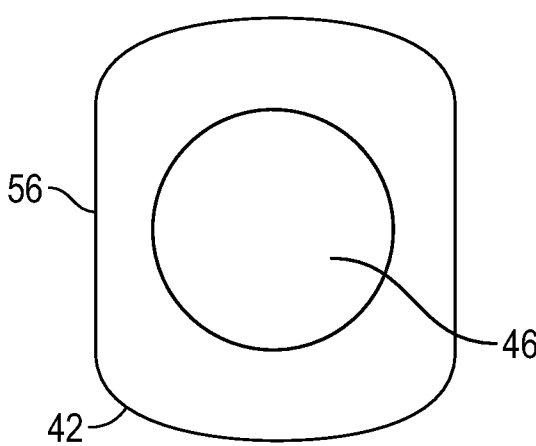
FIG. 10 illustrates a cross-sectional view of a fixation tube in accordance with an example of the present disclosure.

FIGS. 9 and 10 illustrate a cross-sectional view perpendicular to the longitudinal axis of the fixation tube 20 having a non-circular shape. In an example, the fixation tube 20 can have a polygon shape, such as a triangle as seen in FIG. 9. FIG. 10 illustrates the fixation tube 20 having two flats 56. However, one flat 56 or more than two flats 56 can be used to provide the non-circular shape of the fixation tube 20.

Figure 11:
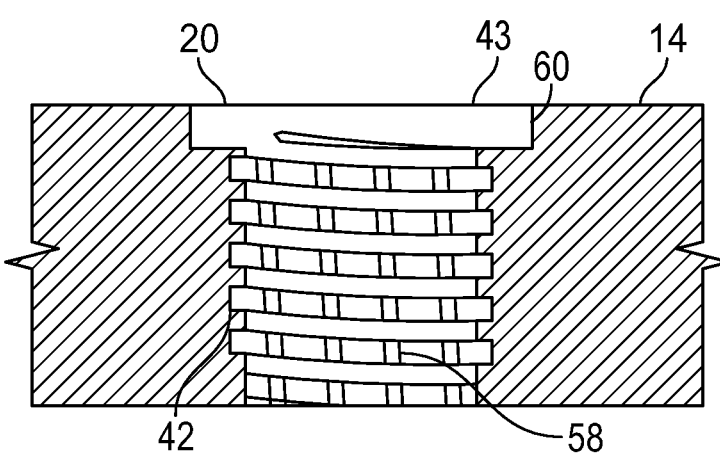
FIG. 11 illustrates a partial cross-sectional view of a fixation tube in accordance with an example of the present disclosure.

FIG. 11 illustrates the fixation tube 20 including a roughened side surface 58 that allows the fixation tube 20 to be better attached to the material of the surgical guide 14. As shown, the roughened surface 58 includes a spiral groove around the circumference of the main body 42 and axial grooves along the central axis of the main body 42 that intersect the spiral grooves. In other examples, the main body 42 can be a knurled surface, or have any other surface structure allowing it to be fixed within the material of the surgical guide 14. As seen in FIG. 11 the fixation tube 20 also include a flange 60 located along the first end 43. Any of the features discussed herein for the fixation tube 20 can be combined together to better attach the fixation tube 20 to the surgical guide 14.

FIGS. 12A-15B illustrate exemplary components used for installing a dental implant during dental surgery in the patient's mouth in accordance with the predetermined dental plan. One component includes a master tube 60 that will be located within the surgical guide 14, which is discussed in more detail below. The master tubes 60 discussed herein can be used in the surgical guide 14 shown in FIG. 2 and replace one or more master tubes 16.

The surgical guide 14 placed over tissue in the patient's mouth. As discussed herein, the surgical guide 14 includes, e.g., at least one opening 15 through which the dental implant is placed. The master tube 60 can be located at the opening 15. The master tube 60 can optionally include indicia 72 for alignment with a non-rotational structure on the implant such that the non-rotational structure of the implant is at a known angular orientation with respect to the master tube 60. The surgical guide 14 can be made from one of many materials, such as polymeric materials used to create the structure via rapid prototyping. The tissue on which the surgical guide is fitted can be the bone, adjacent teeth, and/or soft tissue.

To properly locate the dental implant in the axial direction in accordance with the dental plan, a length dimension of the implant must be known. Further, a dimension of the distance from the seating surface of the implant to the bottom of the master tube 60, which has a known length. Additionally, a length of an implant mount (and/or an analog mount) that will be attached to the implant and used to drive the implant into the bone in accordance to the dental plan needs to be known. The surgical guide, discussed herein, will have an axial dimension directly over each implant that is greater than the length of the master tube 60 but less than the length of the implant mount. This axial dimension of the surgical guide over the dental implant will be chosen to ensure that the length of the implant mount is equal to one of several known and standard lengths for the implant mount (e.g., 7.5 mm, 9 mm, 10.5 mm, 12 mm). In short, once the scan of the patient's mouth is known, the dimensions discussed herein are also considered to develop the surgical guide that will place each dental implant in accordance to the dental plan.

In some situations, the surgical guide 14 can be used to develop a stone model of the patient's gingival surface 10 since its underlying surface is a negative impression of the patient's gingival surface 10. When this occurs, the surgical guide 14 performs two different functions—development of the stone model representing the prevailing conditions in the patient's mouth and surgical placement of the implants in the patient's mouth.

The master tubes 60, 60', and 60" (referred to collectively as "master tubes 60") shown in FIGS. 12A-15B have an essentially hollow cylindrical shape. The master tubes 60 can have a body 65 that extends from a first end 62 to a second end 64. The master tubes 60 define a bore 68 that is configured for guiding a drill. The first end 62 can include a circumferential flange 66 ("flange 66"). In one example, the flange 66 can define the indicia 72, as discussed herein. In one example, the flange 66 can include at least one flat 70. As shown in the examples, the flange 66 includes two diametrically opposed flats 70. The flats 70 extend along the length of the flange 66; however, the body 65 of the master tubes 60 extending from the flange 66 to the second end 64 have the cylindrical shape.

Figure 14:
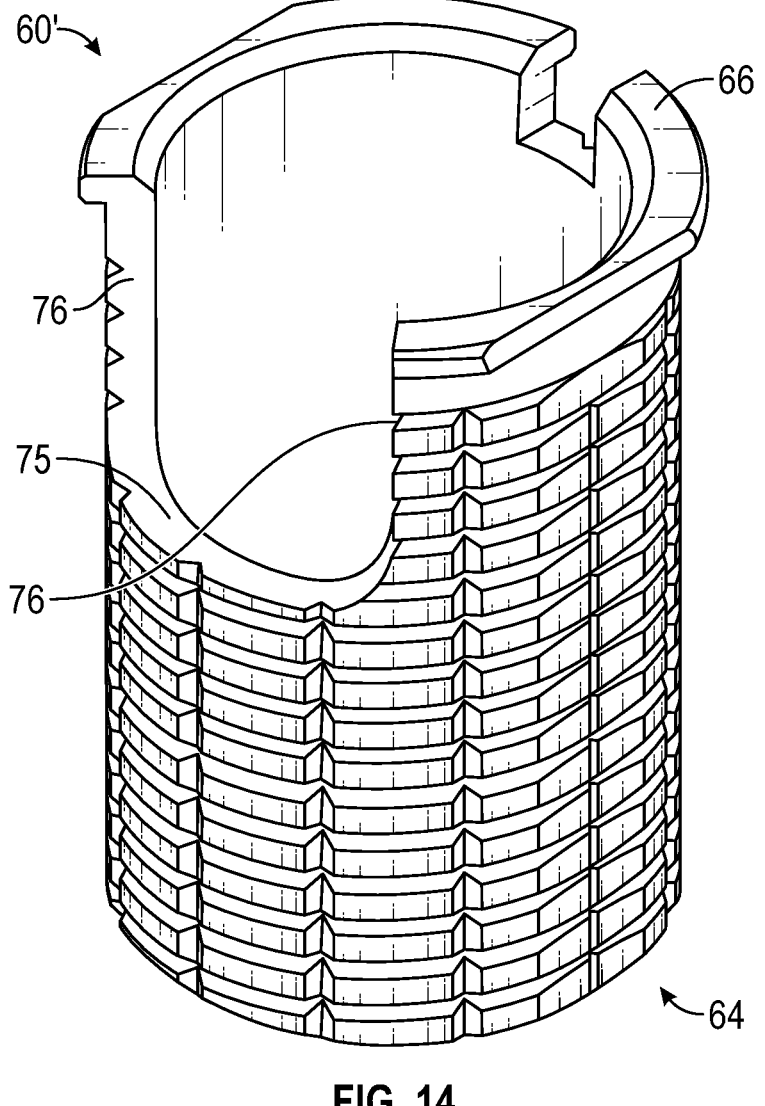
FIG. 14 illustrates a perspective view of the master tube including the lateral access channel in accordance with an example of the present disclosure.

FIGS. 13A, 13B, and 14 illustrate another example of a master tube 60'. Master tube 60' is the same as the master tube 60 in FIGS. 12A and 12B except that master tube 60' includes a lateral access channel 74. The lateral access channel 74 extends through the flange 66 and to a termination point within the body 65 of the master tube 60'. In one example, the laterally access channel 74 is defined by two side wall surfaces 76 and a bottom surface 75. The lateral access channel 74 allows a drill to access the bore 68 laterally versus coronally. Thus, the lateral access channel 74 provides additional convenience by reducing the insertion height (equal to the length of the lateral access channel 74) of the drill. The insertion height reduction is generally equal to the length of the lateral access channel 74. That is, the length from the top surface of the flange 66 to the termination point within the body 65 of the master tube 60'. Reducing the insertion height can facilitate guided surgery in cases with limited space.

Figure 15A:
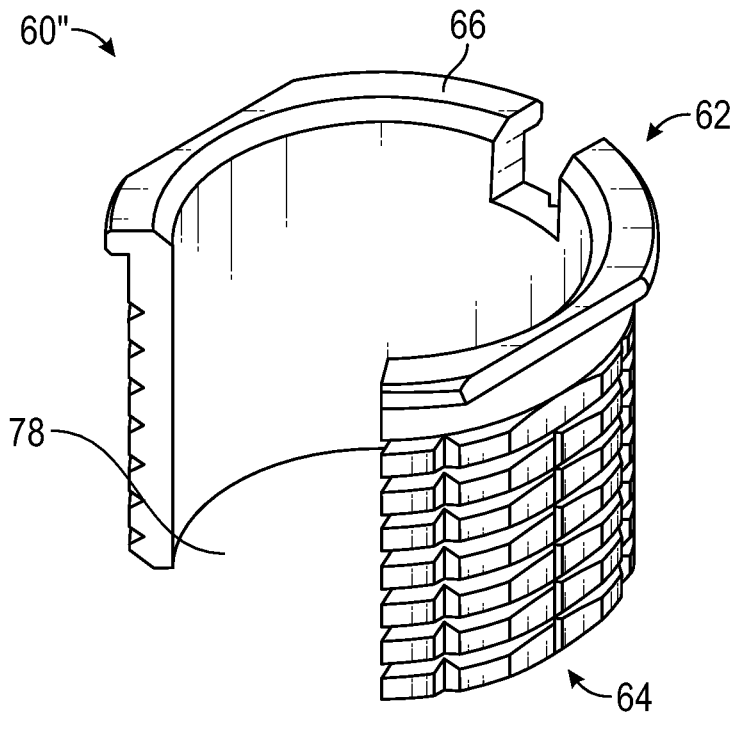
FIG. 15A illustrates a perspective view of the master tube including a lateral access channel in accordance with an example of the present disclosure.
Figure 15B:
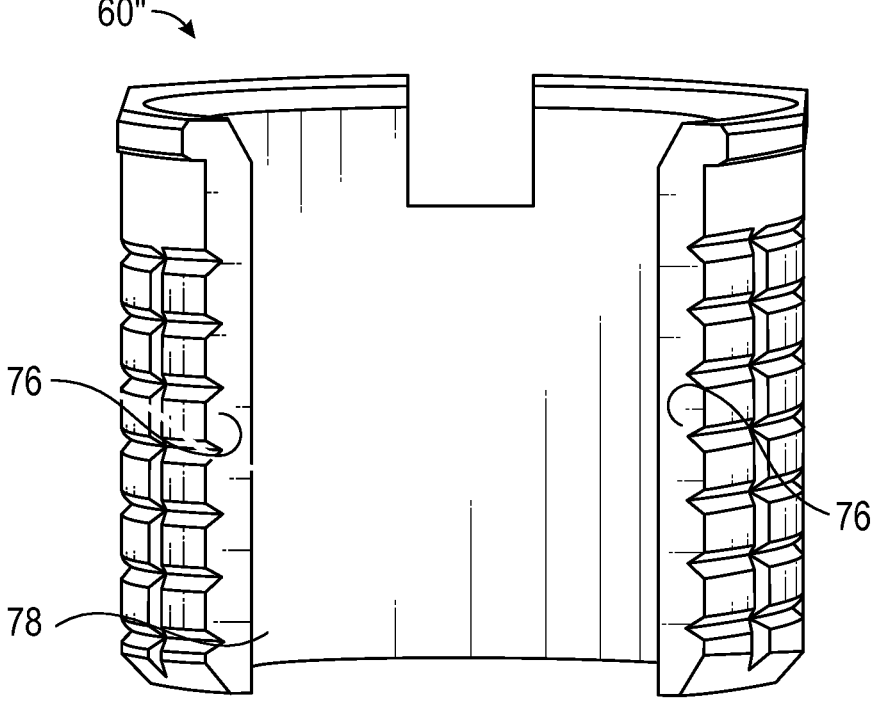
FIG. 15B illustrates a side view of the master tube in FIG. 15A.
Figure 16:
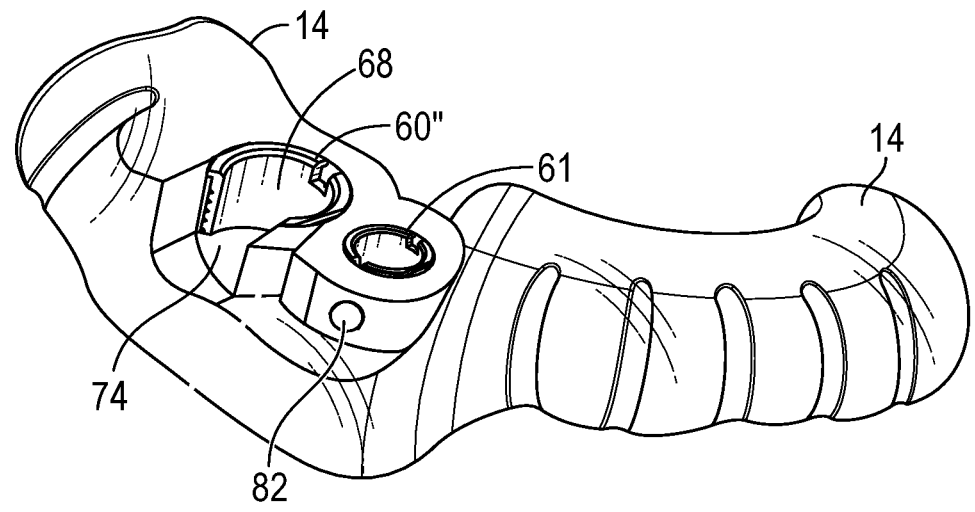
FIG. 16 illustrates a perspective view of a surgical guide including a master tube including a lateral access channel and a master tube including an irrigation channel in accordance with an example of the present disclosure.
Figure 17A:
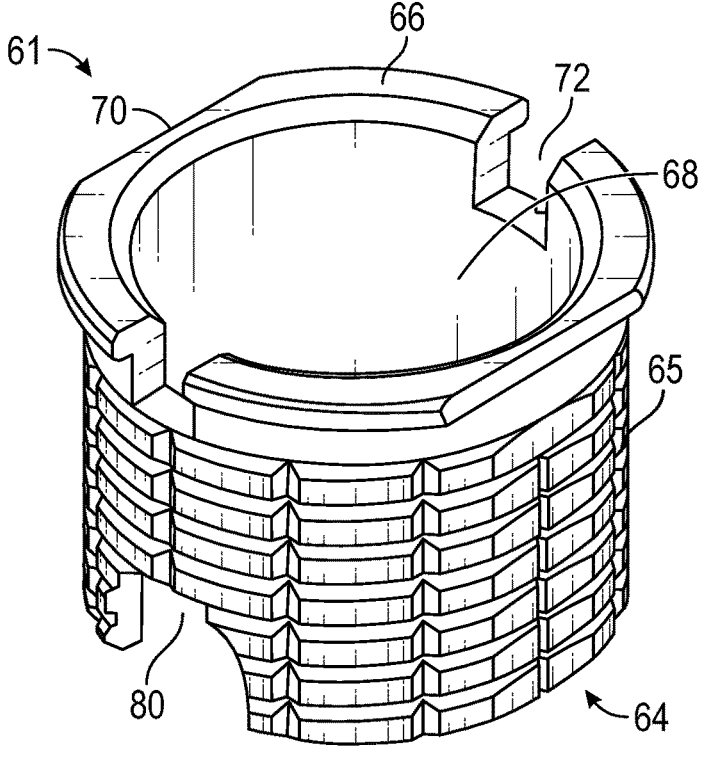
FIG. 17A illustrates a perspective view of a master tube with an irrigation channel in accordance with an example of the present disclosure.
Figure 17B:
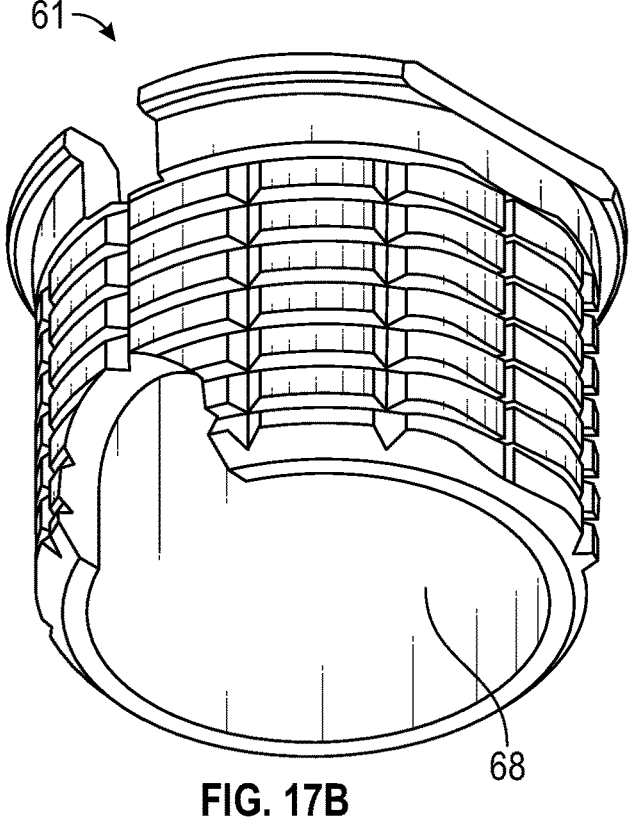
FIG. 17B illustrates another perspective view of the master tube in FIG. 117A.
Figure 17C:
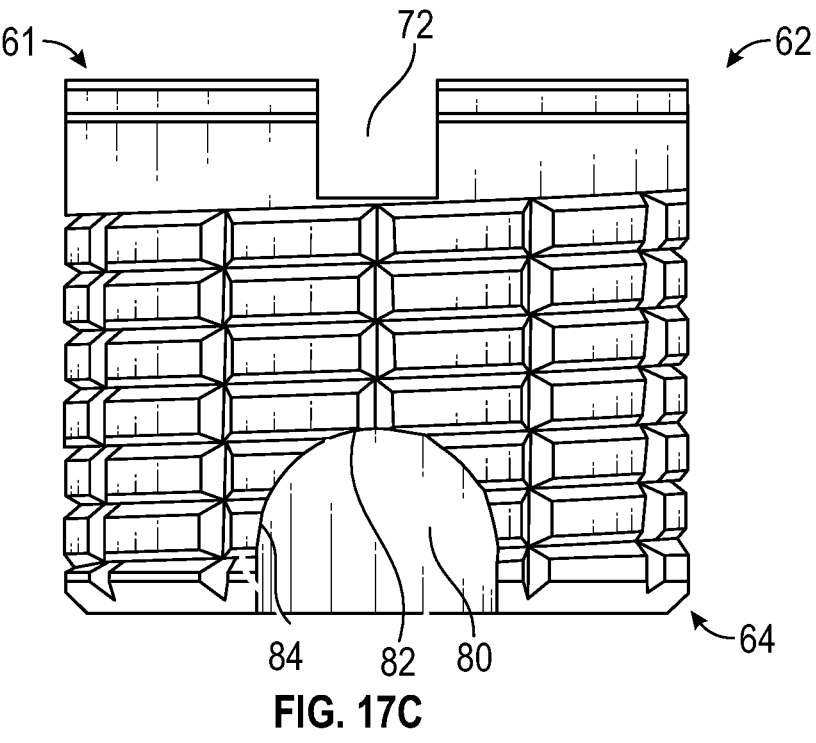
FIG. 17C illustrates a side-view of the master tube in FIGS. 17A and 17B.
Figure 18A:
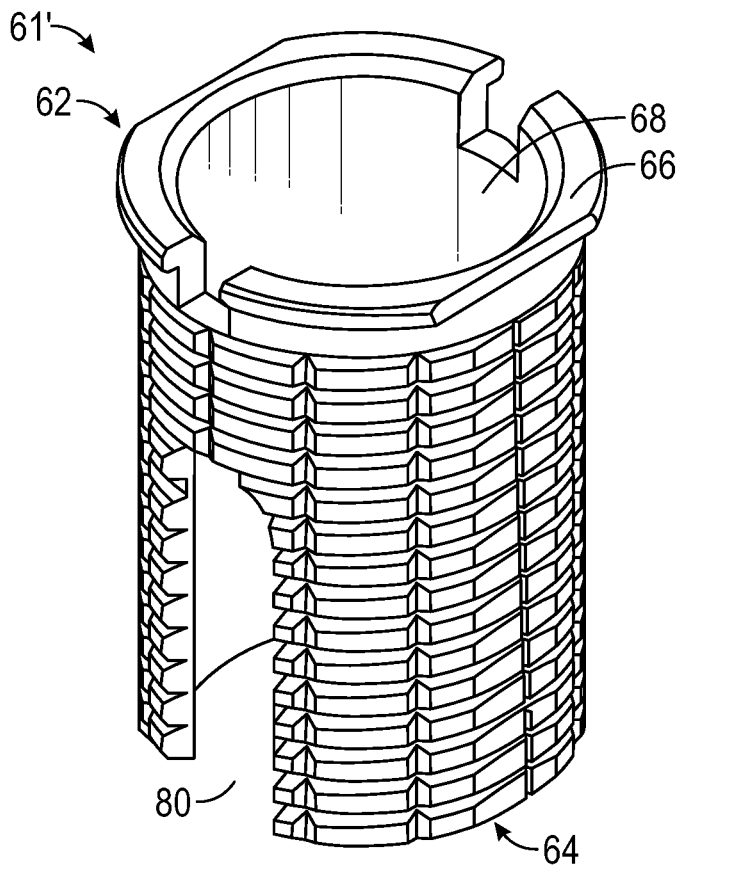
FIG. 18A illustrates a perspective view of a master tube with an irrigation channel in accordance with an example of the present disclosure.
Figures 18B, 18C:
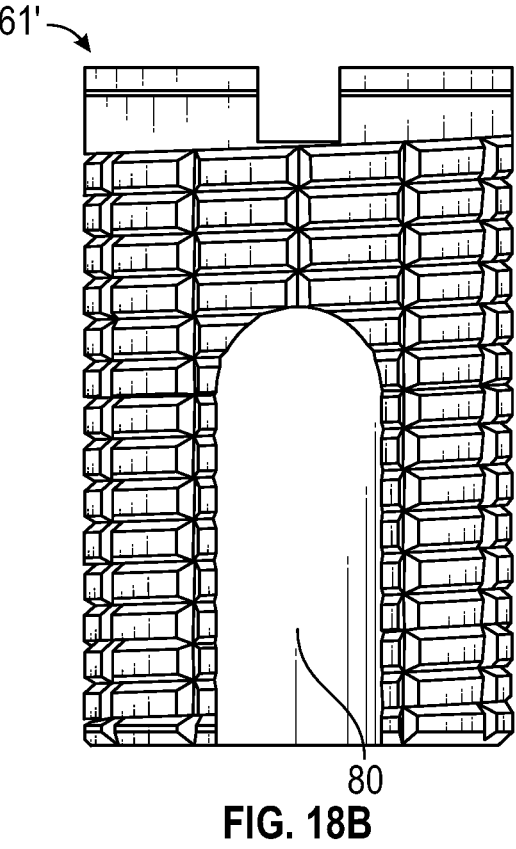
FIG. 18B illustrates a side view of the master tube in FIG. 18A.
FIG. 18C illustrates master tube in FIG. 17B rotated 90 degrees.

Depending on the insertion height reduction needed, the lateral access channel can extend through the entire length of the master tube. FIGS. 15A and 15B illustrate another example of a master tube 60", where the lateral access channel 78 extends through the entire length of the master tube 60". In an example, the lateral access channel 78 can be defined by two side wall surfaces 76 that are generally parallel to each other. FIG. 16 illustrates the surgical guide 14 including master tube 60", where the lateral access channel 78 extends through the entire length of the master tube 60". Thus, a user can access the bore 68 laterally through the lateral access channel 78.

FIGS. 17A-18C illustrate another example of a master tube 61, 61' (collectively referred to as "master tubes 61" or "master tube 61"), The only difference between master tube 61 and master tube 61' are the dimensions between the two. Additionally, master tubes 61 can include all the features of the master tubes 60, 60', and 60" in FIGS. 12A-15B, except that instead of having a lateral access channel 74, the master tubes 61 have an irrigation channel 80 instead. In one example, the irrigation channel 80 and the lateral access channel can be combined into a single mater tube.

As seen in FIGS. 17A-18C the irrigation channel 80 extends from the second end 64 toward a termination point within the body 65 of the master tube 61. The irrigation channel 80 can have any shape. As illustrates in FIGS. 17A-18C, the irrigation channel 80 has two flat side surfaces 84 connected by a curved surface 82. However, other configurations are possible. In one example, the irrigation channel 80 can be an aperture formed through a wall of the master tube 61. The irrigation channel 80 allows a user to introduce a material (e.g., water) to provide irrigation while drilling. Referring to FIG. 16, the master tube 61 is positioned within the surgical guide. The irrigation channel 80 is in fluid communication with an irrigation channel 82 contained within the surgical guide 82, As discussed herein, the surgical guide 14 can be formed via rapid prototyping and can be formed including one or more irrigation channels 82.

Figure 19:
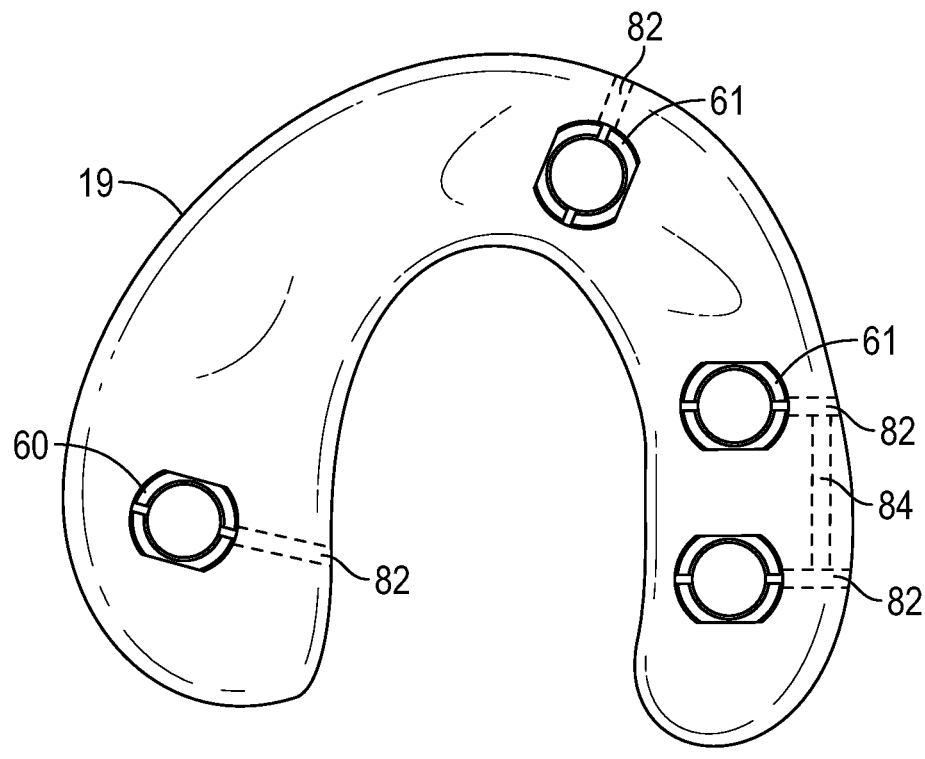
FIG. 19 illustrates a top-down view of a surgical guide 14 in accordance with an example of the present disclosure.

FIG. 19 illustrates a top-down view of a surgical guide 14 including one master tube 60 and three master tubes 61 having the irrigation channel 80. As seen in FIG. 19, the surgical guide 14 includes irrigations channels 82 that are in fluid communication with the irrigation channel 80 of the master tubes 61. Irrigation channels 82 extend from the irrigation channel 80 to an outer surface of the surgical guide 14. The surgical guide 14 can also include a manifold, such that the surgical guide 14 includes channels 84 that connect irrigation channels 82. In that instance, an irrigation channel 82 of one master tube 61 can be in fluid communication with an irrigation channel 82 of another master tube 61 via channel 84.

FIGS. 20A-34 are directed toward components to be used with various drills while executing the dental plan, Creating the osteotomy pursuant to the dental plan calls for a sequence of several drill bits, which have different diameters. In order to prevent drilling at the wrong angle, the drill bits need to fit with the master tube in a relatively tight fashion. In addition to having different diameters, the master tubes may be located along the surgical guide in locations having either a short prolongation or a long prolongation, as discussed herein. Thus, the present inventors have determined that there is a need to increase the simplicity and reduce the time associated with having to switch between various drills and components to account for the various depths (prolongations) and diameters to provide accurate drilling according to the dental plan.

Figure 20A:
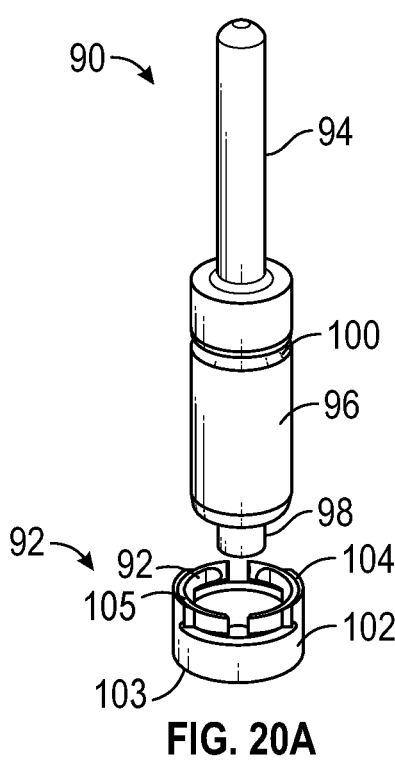
FIG. 20A illustrates a dental drill system including a dental drill and a short and long (S/L) prolongation stopper in accordance with an example of the present disclosure.
Figure 20B:
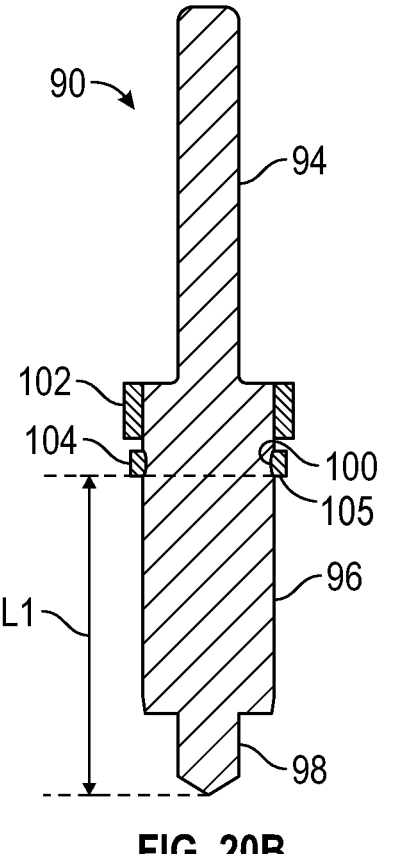
FIG. 20B illustrates the dental drill in FIG. 20A including the S/L prolongation stopper in a first configuration.
Figure 20C:
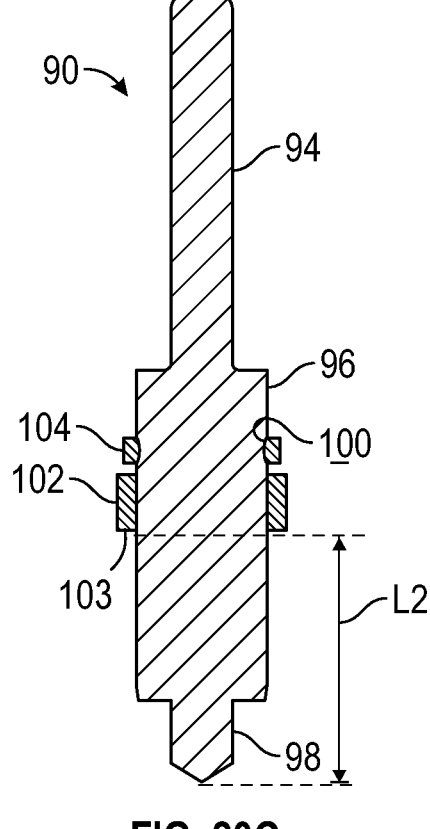
FIG. 20C illustrates the dental drill in FIG. 20A including the S/L prolongation stopper in a second configuration.

FIG. 20A-20C illustrates a dental drill system including a dental drill 90 and a short and long (SI) prolongation stopper 92 (referred to herein as "prolongation stopper 92"). The dental drill 90 can be combined with the prolongation stopper 92 in a first orientation, as shown in FIG. 2013, to provide for a location requiring a long prolongation and in a second orientation, as shown in FIG. 20C, to provide for allocation requiring a short prolongation. The dental drill 90 includes a shaft 94, a guide body 96, and a drill portion 98. The shaft 94 is configured to couple to a tool, e.g., a drill. In an example, the guide body 94 extends between the shaft 94 and the drill portion 98. The guide body 94 has a diameter that is substantially similar to a diameter of the bore of the master tube positioned within the surgical guide. As discussed herein, to accurately drill according to the dental plan, the angle at which the osteotomy is drilled is important. Thus, having the guide body 94 having a similar diameter to the master tube prevents the surgeon from drilling and an angle not consistent with the dental plan. In an example, the dental drill 90 includes a circumventing groove 100 (referred to herein as "groove 100") that is configured to engage with the prolongation stopper 92.

The prolongation stopper 92 includes a base 102 with flexible projections 104 extending from the base. As seen in FIG. 20A, the prolongation stopper 92 includes two flexible arms 104. However, a single arm 104 or more than two flexible arms 104 can be used as long as the prolongation stopper can couple to the dental drill 92. Each flexible arm 104 can include a projection 92 that is configured to engage with the groove 100 of the dental drill 90. For example, as the prolongation stopper 92 is advanced onto the guide body 96, the flexible arms 104 expand slightly. Once the projection 92 is adjacent to the groove 100, the flexible arms 104 move toward a longitudinal axis of the dental drill 90 such that the projections 92 can be positioned within the groove 100. Each flexible arm 104 defines a first stop surface 105 and the base 102 defines a second stop surface 103. The prolongation stopper 92 is configured to be coupled to the dental drill 92 in one of two configurations. In the first configuration, as shown in FIG. 20B, the base 102 is coronal to the flexible arms 104. That is, the base 102 is positioned closer to the shaft 94 of the dental drill 90. In that configuration, a length "L1" between the first stop surface 105 and the tip of the drill portion 98, is in a long prolongation. In the second configuration, as shown in FIG. 20C, the flexible aims 104 are coronal to the base 102. That is, the flexible arms 104 are positioned closer to the shaft 94 of the dental drill 90. In that configuration, a length "L2" between the second stop surface 103 and the tip of the drill portion 98, is in a short prolongation. That is, the length "L2" is less than the length "L1".

During use, a surgeon can use the prolongation stopper 92 on various drills and can easily switch between a short prolongation to a long prolongation by simply rotating the prolongation stopper 92. As the surgeon drills, the stop surface103, 105 that positioned closest to the drill portion 96 can engage a portion of the surgical guide and/or a portion of the master tube. Various prolongation stoppers 92 can be provided having different diameters that correspond to different guide body 96 diameters. Thus, only a single prolongation stopper 92 is needed for all dental drills having a guide body 96 with the same diameter.

FIGS. 21A-24 illustrates another dental drill system including a dental drill 106 and at least two prolongation stoppers 120, 120', While in FIGS. 20A-20C, a single prolongation stopper 92 is used to switch between a short and long prolongation, the example in FIGS. 21A-24 illustrates at least two separate stoppers 120, 120' that can be used with a dental drill 106 to switch between a short and long prolongation. While only two stoppers 120, 120' are shown, multiple prolongations are possible.

FIGS. 21A-24 illustrates a dental drill system including a dental drill 106, a short prolongation stopper 120 (referred to herein as "stopper 120"), and a long prolongation stopper 120' (referred to herein as "stopper 120'"). The dental drill 106 can be combined with either of the stopper 120, 120' to drill with a short prolongation of a long prolongation. The dental drill 106 includes a shaft 108, a guide body 110, and a drill portion 112. The shaft 106 is configured to couple to a tool, e.g., a drill. In an example, the dental drill 106 can further include a flange 114 between the shaft 108 and the guide body 110. The flange 114 includes an engagement surface 116 that is configured to engage a portion of the stoppers 120, 120'. In an example, the guide body 110 extends between the flange 114 and the drill portion 112. As discussed herein, the guide body 110 of the dental drill 106 has a diameter that is substantially similar to a diameter of the bore of the master tube positioned within the surgical guide.

Figure 21A:
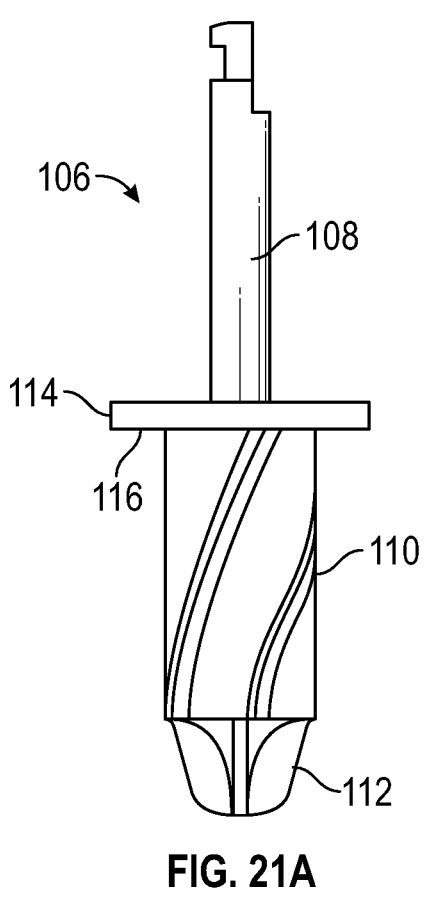
FIG. 21A illustrates side view of a drill in accordance with an example of the present disclosure.
Figure 21B:
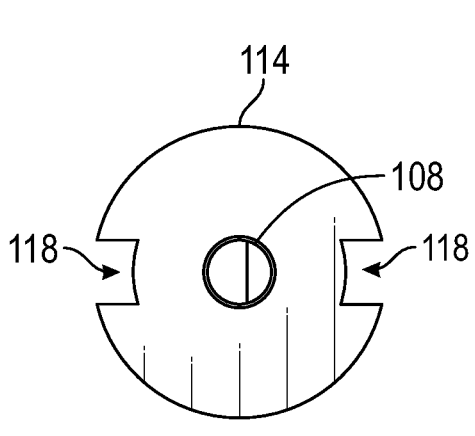
FIG. 21B illustrates a top-down view of the drill in FIG. 21A.

FIG. 21B illustrates a top-down view of the dental drill 106. As seen in FIG. 21B, the flange 114 includes two recesses 118. While two recesses 118 are shown, one recess 18 or more than two recesses 118 can be used.

Figure 22:
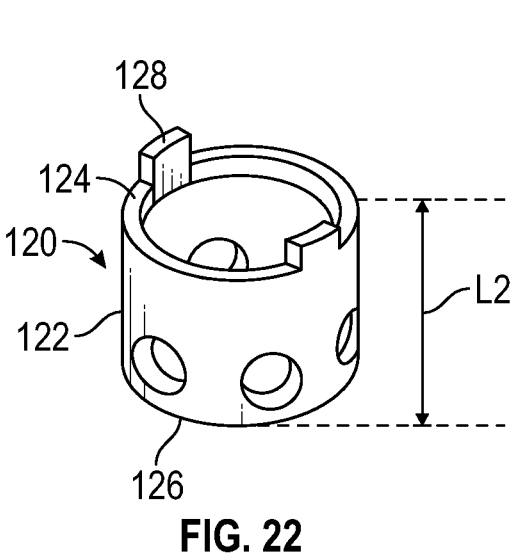
FIG. 22 illustrates a perspective view a first prolongation stopper in accordance with an example of the present disclosure.
Figure 23:
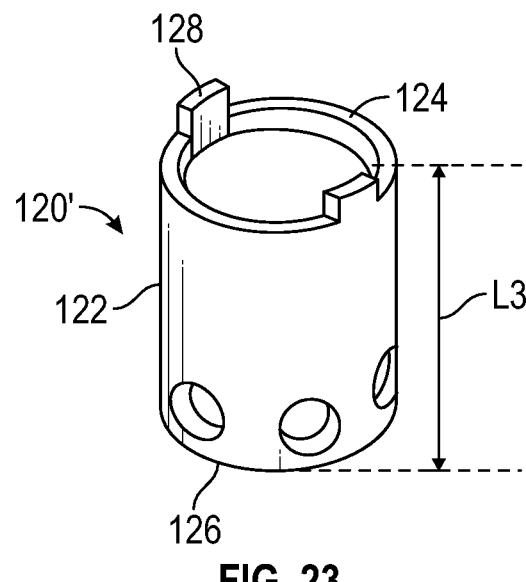
FIG. 23 illustrates a perspective view a second prolongation stopper in accordance with an example of the present disclosure.
Figure 24:
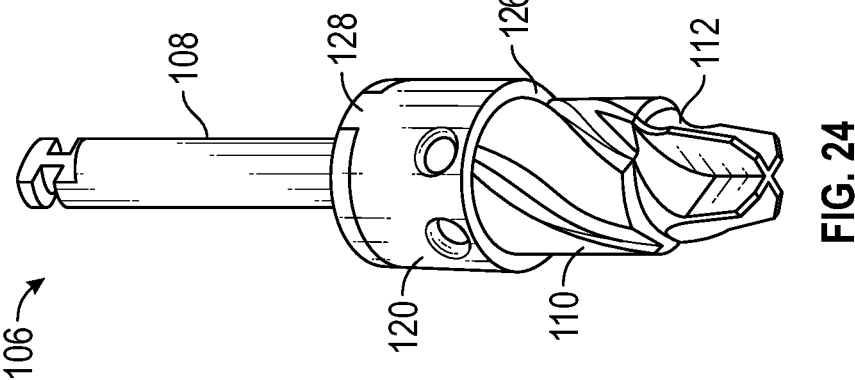
FIG. 24 illustrates a perspective view of the first prolongation stopper coupled to the drill in FIGS. 21A and B.

FIG. 22 illustrates the short prolongation stopper 120. FIG. 23 illustrates the long prolongation stopper 120'. The stoppers 120, 120' include a body 122 extending from a first end 124 to a second end 126. One or more projections 128 extend from the first end 124. The number of projections 128 matches the number of recesses 118 in the flange 114 of the dental drill 106. A length "L2" of the stopper 120 from the first end 124 to the second end 126 is less than a length "L3" of the stopper 120' from the first end 124 to the second end 126, FIG. 24 illustrates the stopper 120 coupled to the dental drill 106. As seen in FIG. 24, the projections 128 are configured to be positioned within corresponding recesses 118 of the dental drill 106. The first end 120 of the stoppers 120, 120' is configured to engage the stop surface 116 of the flange 114. The second end 126 of the stoppers 120, 120' act as a stop surface for a drilling depth. That is, when used with the dental drill 106, the second end 126 will contact a portion of the surgical guide and/or a portion of the master tube to limit the drilling depth. As discussed herein, while two stoppers 120, 120' are shown, any number or stoppers can be provided having varied lengths. The stoppers 120, 120' do not enter the master tube and serve to provide a drill stop. As shown, the diameter of the guide body 110 substantially matches the diameter of the master tube such that drilling can occur according to the dental plan.

While the examples shown in FIGS. 21A-24 illustrate a drill 106 that has a guide body 110 that substantially matches the diameter of the master tube, not all drills have a corresponding guide body. In such instances, detachable guide bodies that are sized for the necessary prolongation can be provided. FIGS. 25A-28A illustrate stoppers 120, 120' that engage the master tube, the examples shown in FIGS. 25A-FIG. 28 illustrate a dental drill system including a dental drill 120, a short prolongation guide body 140, and a long prolongation guide body 140'.

Figure 25B:
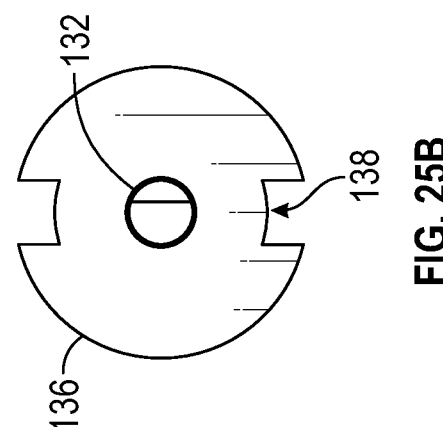
FIG. 25B illustrates a top-down view of the drill in FIG. 25A.
Figure 25A:
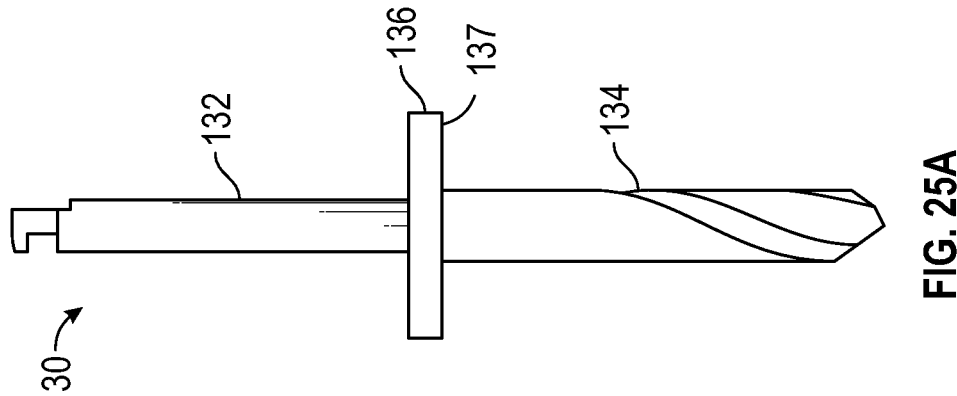
FIG. 25A illustrates side view of a drill in accordance with an example of the present disclosure.

FIG. 25A illustrates a dental drill 130 that can be combined with either of the guide bodies 140, 140'. The dental drill 130 includes a shaft 132, an elongated drill portion 134, and a flange positioned between the shaft 132 and the elongated drill portion 134. The shaft 132 is configured to couple to a tool, e.g., a drill. As seen in FIG. 25A, the flange 136 includes an engagement surface 137 that is configured to engage a portion of the guide bodies 140, 140'. As discussed herein, during drilling, it is important that the drill extends through the master tube according to the dental plan. Since the dental drill 130 doesn't include a guide body having a diameter that matches the diameter of the master tube, the guide bodies 140, 140' can be attached to the drill 130 such that the guide bodies 140, 140' have a diameter that substantially matches diameter of the master tube.

FIG. 25B illustrates a top-down view of the dental drill 136. As seen in FIG. 25B, the flange 136 includes two recesses 138. While two recesses 138 are shown, one recess 138 or more than two recesses 138 can be used.

FIG. 26 illustrates the short prolongation guide body 140. FIG. 27 illustrates the long prolongation guide body 140'. The only difference between the guide body 140 and the guide body 140' is the length of the body portion 142. The guide bodies 140, 140' include a body 142 extending from a first end 141 to a second end 145. The first end 141 includes a flange 144 having a top surface 147 and a bottom surface 145. One or more projections 146 extend from the top surface 147 of the flange 144. The number of projections 146 matches the number of recesses 138 in the flange 136 of the dental drill 130. In an example, the thickness of the flange 144 of both guide bodies 140, 140' are equal. A length "L4" of the short prolongation guide body 140 from the bottom surface 145 to an apical surface 143 is less than a length "L5" of the guide body 140' from the bottom surfaced 145 to the second end 143.

FIG. 28 illustrates the guide body 140 coupled to the dental drill 130. As seen in FIG. 28, the projections 146 are configured to be positioned within corresponding recesses 138 of the dental drill 130.

The top surface 147 of the guide bodies 140, 140' are configured to engage the engagement surface 137 of the flange 136. The second end 143 of the guide bodies 140, 140' is configured to extend through the master tube. That is, when used with the dental drill 130, the second end 143 will extend through a portion of the master tube. The bottom surface 145 of the flange 144 acts as a stop surface. That is, the bottom surface 145 will contact at least one of a portion of the surgical guide and a portion of a master tube to limited the drilling depth. As discussed herein, while two guide bodies 140, 140' are shown, any number or guide bodies can be provided having varied lengths. The guide bodies 140, 140' enter the master tubes. The diameter of the body portion 142 of the guide bodies 140, 140' substantially matches the diameter of the master tube such that drilling can occur according to the dental plant.

FIGS. 29A-34 illustrate prolongation stoppers 162, 162' positioned over guide bodies 154. FIGS. 29A-34 illustrate a dental drill system including a dental drill 150, 150' and a prolongation stopper 162, 162'. The dental drill 150, 150' can be combined with either of the stoppers 162, 162' to drill with a short prolongation or a long prolongation. For example, the prolongation stoppers 162, 162' can come in multiple lengths and can be coupled to the dental drill 150, 152' via flexible fingers.

Figure 30:
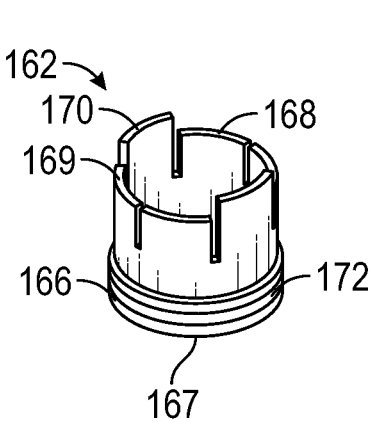
FIG. 30 illustrates a perspective view a prolongation stopper in accordance with an example of the present disclosure.

The example shown in FIG. 30 illustrates a prolongation stopper 162 that provides attachment via the flexible fingers 169, 170, as well as providing anti-rotation properties.

The dental drill 150 includes a shaft 152, a guide body 154, and a drill portion 156. The shaft 132 is configured to couple to a tool, e.g., a drill. In an example, the dental drill 150 can further include a flange 158 between the shaft 152 and the guide body 154.

The flange 158 includes an engagement surface 159 that is configured to engage a portion of the stoppers 162. As discussed herein, the guide body 154 of the dental drill 150 has a diameter that is substantially similar to a diameter of the bore of the master tube positioned within the surgical guide.

Figure 29A:
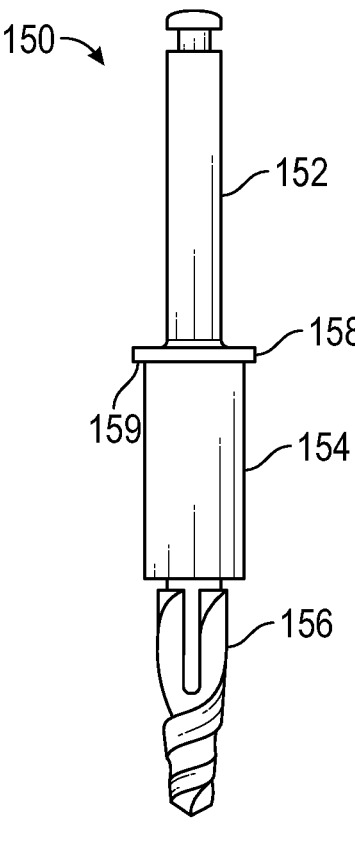
FIG. 29A illustrates side view of a drill in accordance with an example of the present disclosure.
Figure 29B:
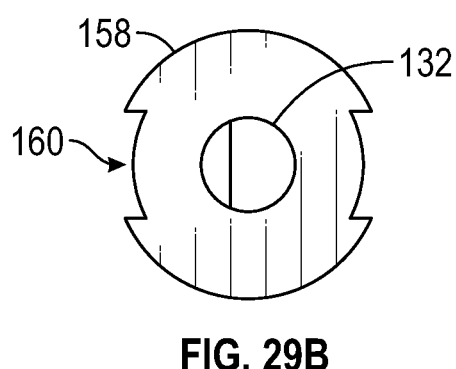
FIG. 29B illustrates a top-down view of the drill in FIG. 29A.

FIG. 29B illustrates a top-down view of the dental drill 150. As seen in FIG. 29B, the flange 158 includes two recesses 160. While two recesses 160 are shown, one recess 160 or more than two recesses 160 can be used.

Figure 31:
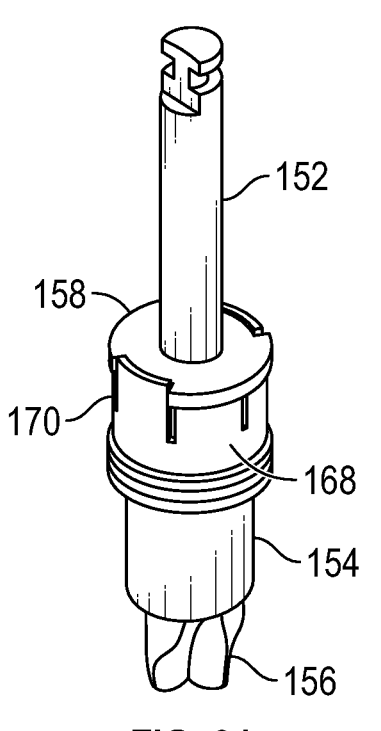
FIG. 31 illustrates a perspective view of the prolongation stopper coupled to the drill in FIGS. 29A and B.

FIG. 30 illustrates the prolongation stopper 162 and FIG. 31 illustrates the stopper 162, coupled to the dental drill 150. The stopper 162 includes a base 166 defining a stop surface 167, at least one flexible arm 168 extending from the base 166, and at least one elongated flexible arm 170 extending form the base 166.

The stopper 162 includes at least one flexible arm 168 that defines a contact surface 169 that is configured to contact the engagement surface 159 of the dental drill 150 when the prolongation stopper 162 is attached to the dental drill 150. The at least one elongated flexible arm 170 has a length that is greater than a length of the elongated flexible arm 168. The elongated flexible arm 170 is configured to extend within the recess 160 and provide anti-rotation properties between the dental drill 150 and the stopper 162. The stopper 162 can further include a colored band 172 that can indicate to a user the prolongation (e.g., whether short or long). As the surgeon attaches the stopper 162 to the dental drill 150, the diameter of an opening of the stopper 162 along the flexible arms 168, 170 is less than the diameter of the guide body 154. Thus, as a user attaches the stopper 162 to the guide body 154, the flexible arms 168 can provide a force to the guide body 154 to secure the stopper 162' to the guide body 154.

During use, as the surgeon is drilling into a patient, the stop surface 167 can contact at least one of a portion of the surgical guide and a portion of the master tube. While shown including four (4) flexible arms 168 and two (2) elongated flexible arms 170, any number can be used such that the stopper 162 can engage the guide body 154 while also providing anti-rotation with the at least one elongated flexible arm 170.

Figures 32A, 32B, 33, 34:
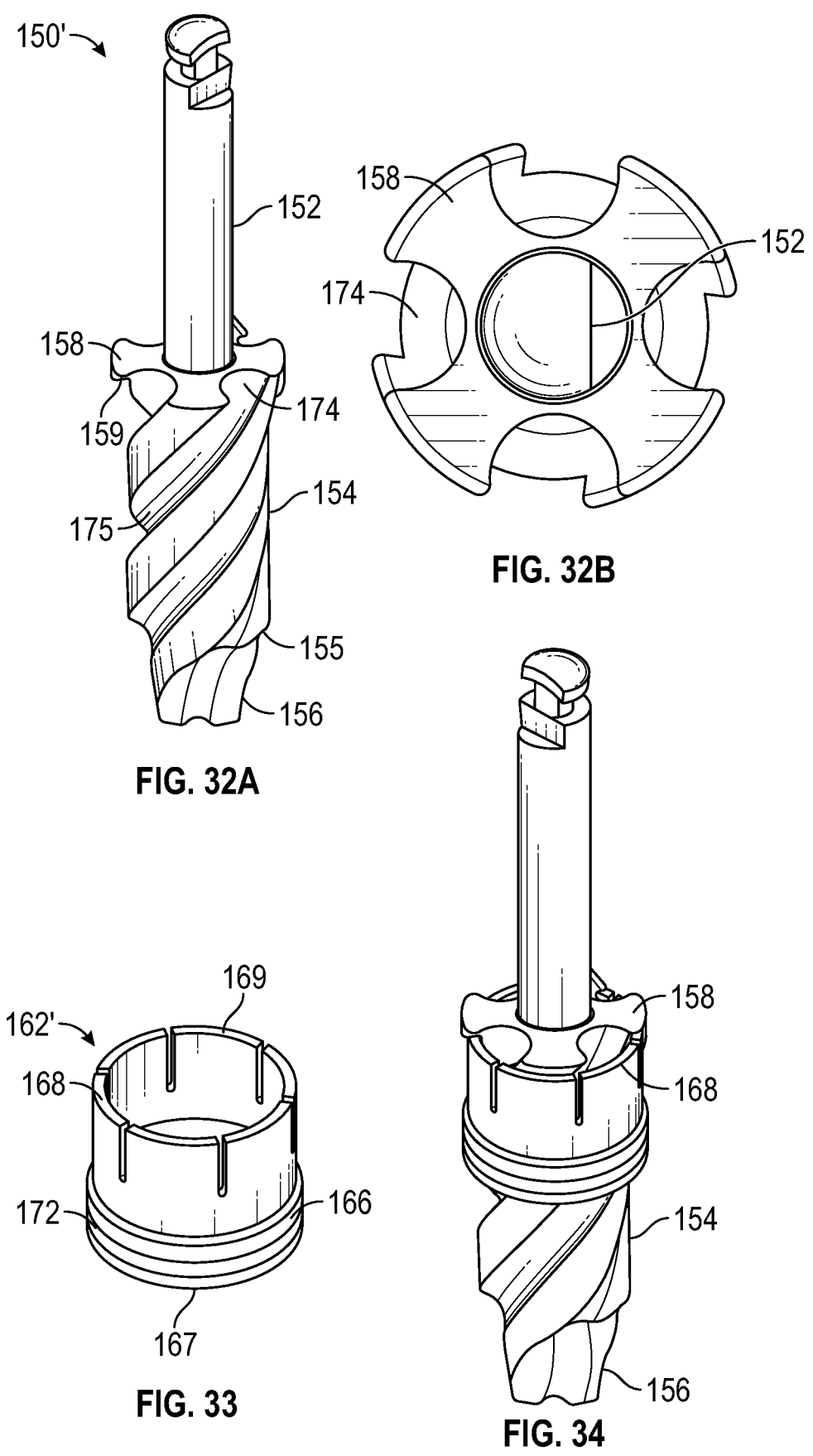
FIG. 32A illustrates side view of a drill in accordance with an example of the present disclosure.
FIG. 32B illustrates a top-down view of the drill in FIG. 32A.
FIG. 33 illustrates a perspective view a prolongation stopper in accordance with an example of the present disclosure.
FIG. 34 illustrates a perspective view of the prolongation stopper coupled to the drill in FIGS. 32A and B.

The example shown in FIG. 33 illustrates a prolongation stopper 162' that provides attachment via the flexible fingers 168. As shown in FIG. 33, six (6) flexible arms 168 are provided; however, two (2) flexible arms 168 to more than six (6) flexible arms 168 can be used.

The dental drill 150' includes a shaft 152, a guide body 154, and a drill portion 156. The shaft 152 is configured to couple to a tool, e.g., a drill. In an example, the dental drill 150' can further include a flange 158 between the shaft 152 and the guide body 154. As compared to the dental drill 150 in FIG. 29A, the drill 150' includes an irrigation channel 175 extending from the flange 158 to a bottom surface 155 of the guide body 154. The flange 158 includes an engagement surface 159 that is configured to engage a portion of the stopper 162'. As discussed herein, the guide body 154 of the dental drill 150 has a diameter that is substantially similar to a diameter of the bore of the master tube positioned within the surgical guide.

FIG. 32B illustrates a top-down view of the dental drill 150'. As seen in FIG. 29B, the flange 158 includes four recesses 174. Each recess 174 is configured to be in fluid communication with a irrigation channel 175. While four (4) recesses 174 are shown, one recess 174 in communication with one irrigation channel 175 can be used to more than four (4) recesses 174 in communication with more than four irrigation channels 175.

FIG. 33 illustrates the prolongation stopper 162' and FIG. 34 illustrates the stopper 162' coupled to the dental drill 150'. The stopper 162' includes a base 166 defining a stop surface 167 and the flexible arms 168 extending from the base 166.

The flexible arms 168 define a contact surface 169 that is configured to contact the engagement surface 159 of the dental drill 150 when the prolongation stopper 162 is attached to the dental drill 150. The stopper 162' can further include a colored band 172 that can indicate to a user the prolongation (e.g., whether short or long). As the surgeon attaches the stopper 162' to the dental drill 150', the diameter of an opening of the stopper 162' along the flexible arms 168 is less than the diameter of the guide body 154. Thus, as a user attaches the stopper 162' to the guide body 154 the flexible arms 168 can provide a force to the guide body 154 to secure the stopper 162' to the guide body 154. During use, as the surgeon is drilling into a patient, the stop surface 167 can contact at least one of a portion of the surgical guide and a portion of the master tube.

As discussed herein, the protocol for following the dental plan can require the use of many different drills having different diameters. Having a relatively tight fight between the drill and the master tube is necessary such that the drilling can be done according to the dental plan. The present application provides spoonless drilling systems such that a user can easily provide the proper diameter within a master tube for each drill having varying diameters.

FIG. 35 illustrates a master tubes 60 that include a magnetized drill flange 180 for centering a drill. The magnetized drill flange 180 can easily be replaced such that the center hole 182 of the magnetized drill flange 180 corresponds to the current drill being used. During a procedure, multiple drills having different diameters may be used and the magnetized drill flange 182 can easily be removed and replaced, as needed, during a procedure. As seen in FIGS. 36-38, additional magnetized drill flanges 180', 180", and 180''' having different center hole 182', 182", and 182''' diameters can be provided. The magnetized drill flanges 180', 180", and 180''' can be magnetically coupled to the master tube 60 positioned within a surgical guide.

FIGS. 39-44 illustrate another spoonless drilling system including prolongation stoppers 196A-C that can be coupled to a dental drill 185. The drill 185 can include a shaft 86, a drill portion 190 and a flange 188 positioned between the shaft 186 and the drill portion 190. The flange 188 can include features configured to couple with the prolongation stoppers 196A-C. In one example, the flange 188 can include a lip 195 and a recess 195 and one or more projections 192.

As seen in FIGS. 40A-44, the prolongation stoppers 196A-C (collectively referred to herein as stoppers 196) can include a body 198 extending from a flange 200 at a first end 199 to a second end 202. The stoppers 196 can define an opening 197. The flange 200 can include at least one recess 206 and a projection 204 extending from a top surface 203 of the flange 200. The difference between stoppers 196A-C is the thickness of the flange 200. Flange 200 of stopper 196A has a length that is less than the length of the flange 200 of stopper 196B and the length of the flange 200 of stopper 1960. Additionally, the length of the flange 200 of stopper 196C is greater than the length of the flange 200 of the stopper 196A and the length of the flange 200 of stopper 196B. Thus, the prolongation stoppers 196A-C includes a flange 200 that has a longitudinal length that can increase or decrease depending on which stopper 196A-C is used.

Figure 44:
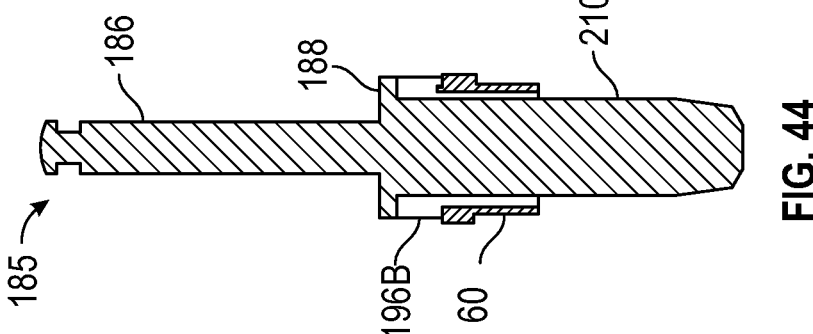
FIG. 44 illustrates the drill and prolongation stopper in FIG. 43 inserted through a master tube.
Figure 43:
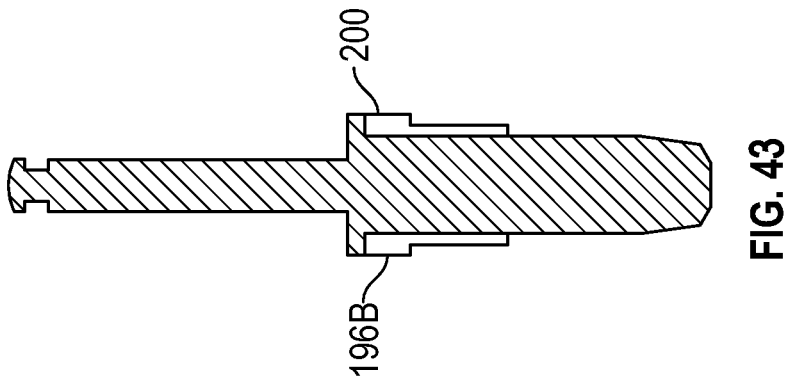
FIG. 43 illustrates a cross-sectional view of the prolongation stopper in FIGS. 41A-B attached to the drill in FIG. 39.

FIG. 43 illustrates stopper 196E coupled to the dental drill 185 and FIG. 44 illustrates the dental drill 185 and stopper 196B in FIG. 43 extending through a master tube 60. When the drill 185 and the stopper 196B are coupled, the recess 206 of the flange 200 can receive the projection 204 and the projections 192 of the flange can be positioned within the recesses 206. Further, a top surface 203 of the flange 200 can contact an undersurface of the flange 188. When inserted through the master tube 60, a user can drill into a patient until a stop surface 201 of the flange 200 contacts at least one of a portion of the surgical guide and at least a portion of the master tube 60. A diameter of the body 198 substantially matches the diameter of the master tube 60 such that the angle of drilling matches the dental plant. The stoppers 196A-C vary the distance between the flange 188 of the drill 185 and a top surface of the master tube 60; thereby controlling the drilling depth.

In another aspect of the present invention, the inventors have realized that improved irrigation during drilling can be beneficiation. The present disclosure provides various examples of grooved guide bodies that provide a pathway for irrigation during use. Thus, during use, a user can introduce irrigation through the flange or the guide body and the irrigation medium can travel along a pathway and to the drill portion. The irrigation can be applied directly into the pathway to irrigate the surgical site during use.

FIG. 45 illustrates a standard drill 212 (without the irrigation pathway) including a shaft 214, a guide body 216, a drill portion 218, and a flange 219. FIG. 46 illustrates the drill 212', which is the same as drill 212 in FIG. 45, but drill 212' includes an irrigation channel 220 extending through the flange 219 to a bottom surface 224 of the guide body 216. The top surface 221 of the flange 219 is in fluid communication with the bottom surface 224 of the guide body 216 and thus the drill portion 218. As shown in FIG. 45, the irrigation channel 220 can be a single thread. However, other configurations are possible. For example, a single thread having a narrow pitch, a single thread having a wide pitch, a double thread having a narrow pitch, a double thread having a wide pitch, a straight helix (no groove), a shall thread (with full groove), and a deep thread (full groove) are just some examples.

Figure 52A:
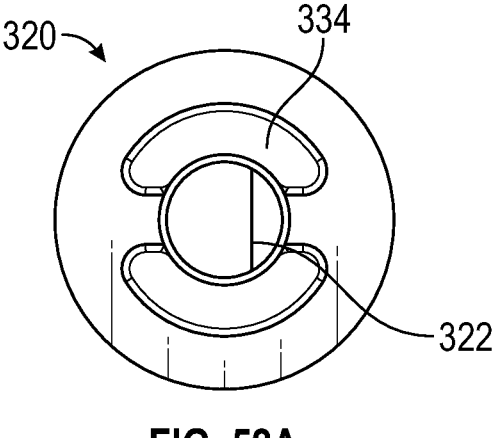
Figure 52B:
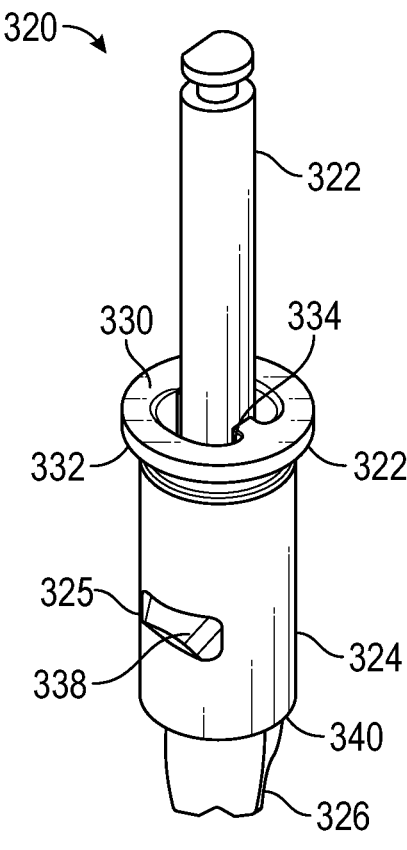
Figure 53A:
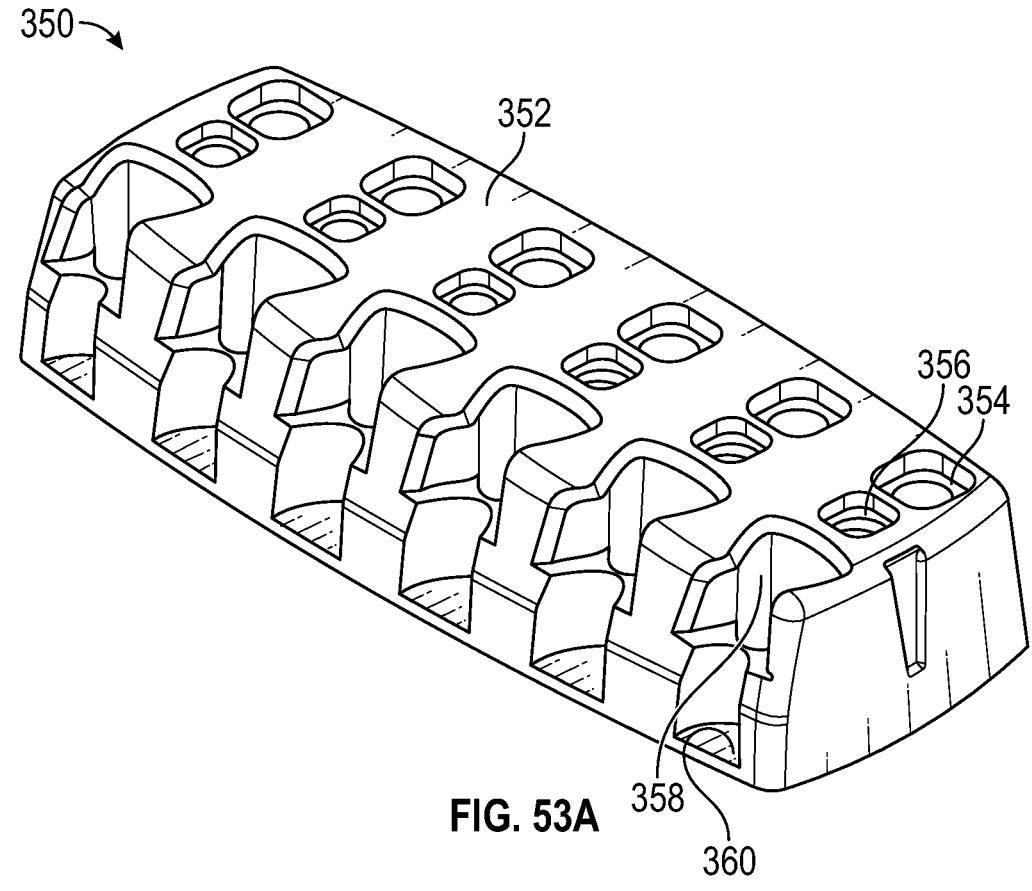
FIGS. 53A-B illustrate an implant mounting block in accordance with an example of the present disclosure.
Figure 53B:
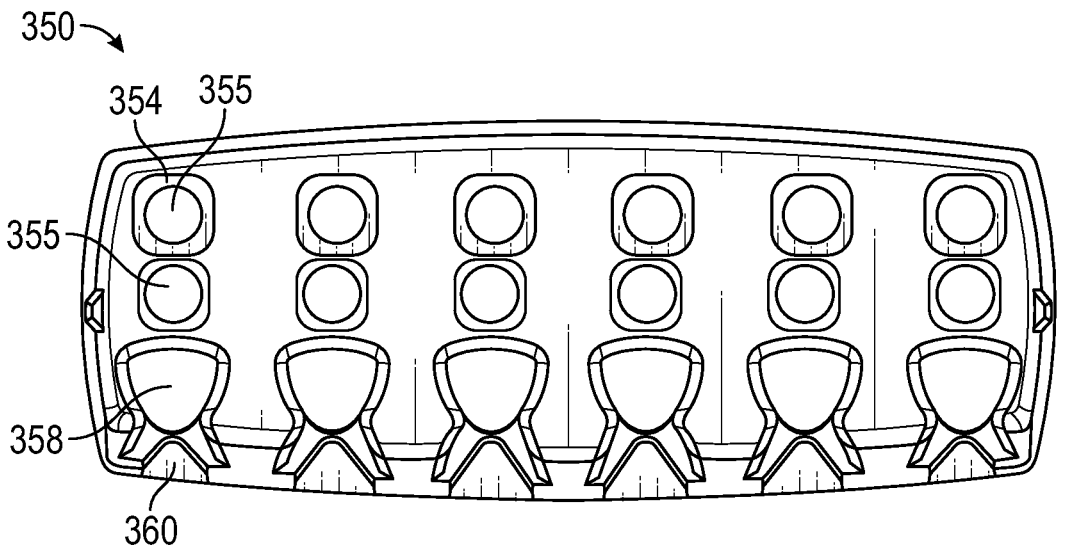

FIGS. 47A 52B illustrate various irrigations drills in accordance with various examples of the present disclosure, FIGS. 47A-C illustrate drill 230 that includes a shaft 232, a guide body 243, a drill portion 236, and a flange 238 having a top surface 240 and a bottom surface 241. The flange 240 includes at least one opening 244 extending through the flange 240. As seen in the figures, the opening 244 extends through the length of the flange 240 but does not extend to an external side surface of the flange 240. In other examples, the opening 244 can extend through the length as well as to the external side surface of the flange. The opening 244 is in fluid communication with an irrigation channel 242 extending along a portion of the guide body 234. In the example shown, the irrigation channel 242 terminates along the guide body 234. In one example, the guide body 234 could extend through the guide body 243. In an example, the number of openings 244 matches the number of irrigation channels 242 such that each opening 244 is in fluid communication with a corresponding irrigation channel 242.

FIGS. 48A-B illustrate drill 250 that includes a shaft 232, a guide body 254, a drill portion 256, and a flange 258 having a top surface 260 and a bottom surface 259. The flange 258 includes at least one opening 265 extending through the length of the flange 240. The opening 244 is in fluid communication with an irrigation channel 264 extending along a portion of the guide body 254. The irrigation channel 264 is an internal channel formed within the guide body 254. In the example shown, the irrigation channel 242 extends the entire length of the guide body 254 to the bottom surface 262 of the guide body 254.

FIG. 49 illustrates drill 270 that includes a shaft 272, a guide body 274, a drill portion 276, and a flange 278 having a top surface 281 and a bottom surface 279. Drill 270 includes an irrigation channels 280 that extend from a portion along the guide body 274 to the bottom surface 282 of the guide body 274. As shown the irrigation channels 280 are longitudinal grooves located along the guide body 274. The number, location, and shape of the grooves can vary.

Figure 50A:
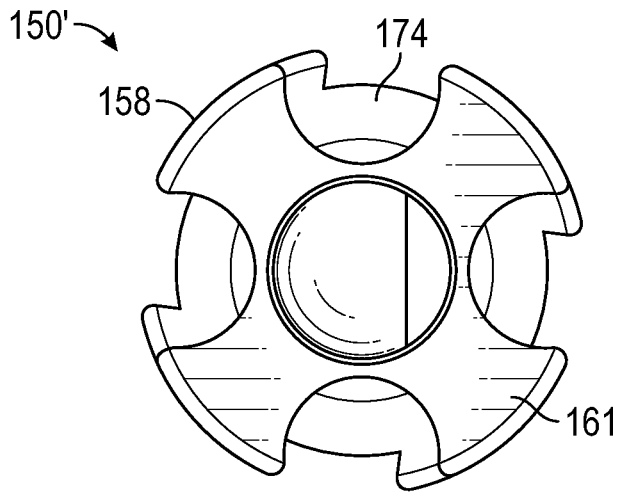
Figure 50B:
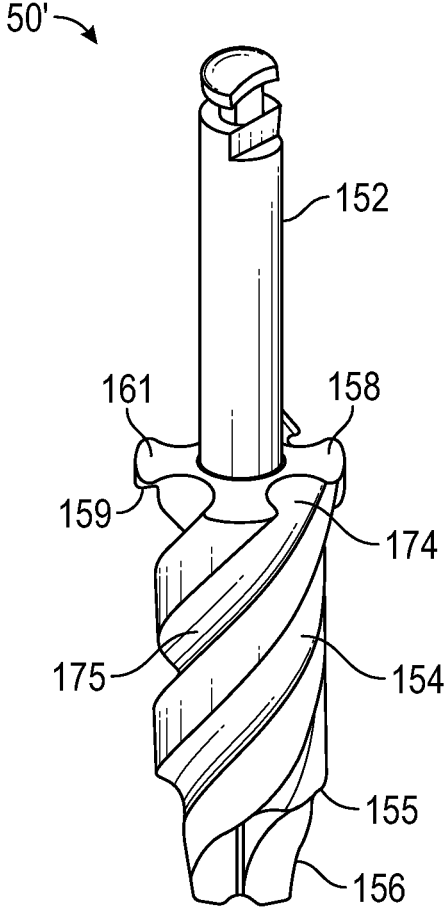
Figure 51C:
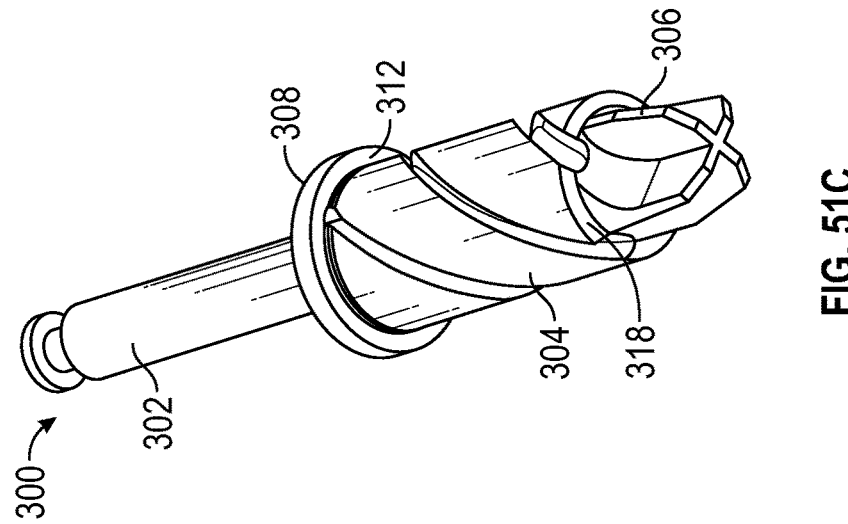
Figure 51B:
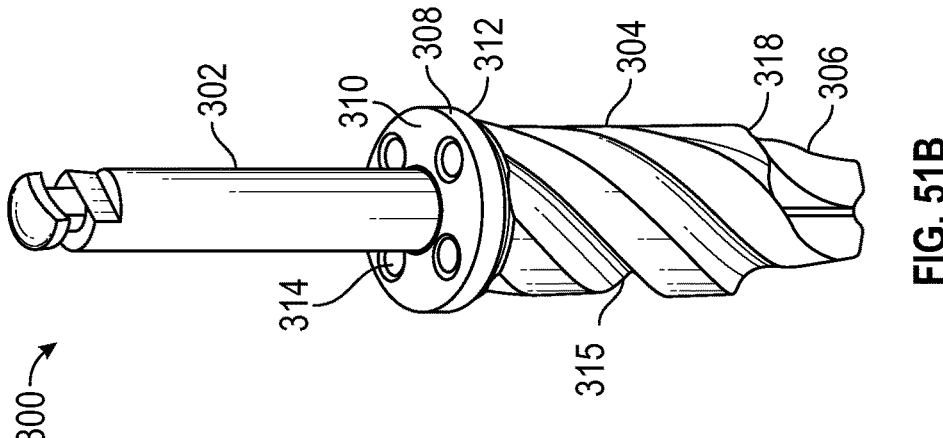
Figure 51A:
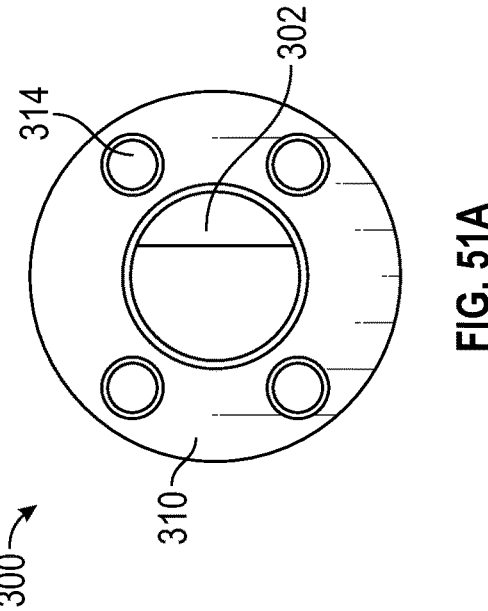

FIGS. 50A-B illustrate drill 150' that is also shown in FIGS. 32A, 32B, and 34. The drill 150' that includes a shaft 152, a guide body 154, a drill portion 156, and a flange 158 having a top surface 161 and a bottom surface 159. The flange 158 includes openings 174 that extend through the length of the flange 158 and to an external side surface, Each opening 174 is in fluid communication with a corresponding irrigation channel 175. The irrigation channel 175 extends from the flange 158 to the bottom surface 155 of the guide body 154, FIGS. 51A-C illustrate drill 300. The drill 300 is similar to drill 150' in FIGS. 50A-B except that the openings 314 within the flange 308 extend through the length of the flange 308 but do not extend to the external side surface of the flange 308. As seen in FIGS. 51A-C, the drill 300 includes a shaft 302, a guide body 304, a drill portion 306, and the flange 308 having a top surface 210 and a bottom surface 312. The flange 308 includes openings 314 that extend through the length of the flange 308 but not the external side surface. Each opening 314 is in fluid communication with a corresponding irrigation channel 315. The irrigation channel 315 extends from the flange 308 to the bottom surface 318 of the guide body 304.

FIGS. 52A-B illustrate drill 320. As seen in FIGS. 52A-B, the drill 320 includes a shaft 322, a guide body 324, a drill portion 326, and a flange 322 having a top surface 330 and a bottom surface 332. The flange 322 includes openings 334 that extend through the length of the flange 322 but not the external side surface. Additionally, the openings 334 are in fluid communication with an internal irrigation channel 338 that extends from the openings 334 in the flange to an opening 325 defined by the guide body 324. The opening 325 is positioned between the flange 322 and the bottom surface 340 of the guide body 324. Each opening 314 is in fluid communication with a corresponding irrigation channel 315. The irrigation channel 315 extends from the flange 308 to the bottom surface 318 of the guide body 304.

FIG. 53A-54B illustrate an implant mounting block 350 and insert 370. When dental implants are opened during a surgical procedure, it is beneficial to minimize handling for contamination purposes. Thus, the present inventors have determined that a mounting block 250 and insert 370 that can accommodate various dental implant sizes can be beneficial. The mounting block includes a body 351 defining counter bore 354, 356, and implant packaging holding slots 358, 360. The insert 370 can include an elongated portion 372 and a flange 374. The insert 370 can include an opening 382 extending through the insert 370 as well as a side wall bore 384 that is in fluid communication with the opening 382. The elongated portion 372 can extend through openings

355 in the counterbores 354, 356 until the flange 374 is positioned within the counter bores 354, 356. The shapes of the counter bores 354, 356 and the flange 374 is such that they are rotationally locked.

A user can open the dental implant package and insert the package within the slots 358, 360. The user can then engage the dental implant along a non-rotational portion and insert the implant into the opening 382 of the insert that is positioned within the mounting block 350. In an example, the opening 382 includes features to prevent the dental implant form rotating within the opening 382. For example, the opening 283 can include a non-rotational feature that can cooperate with a portion of the dental implant. Various inserts 370 can be provided as a kit such that the various inserts 370 have various lengths of the elongated portion 372 and diameters of the opening 382 such that the inserts 370 can be used with various dental implants. The dental implant can be held within the insert until it is time to insert the dental implant, at which time the surgeon can couple an implant mount to the dental implant.

Figure 55:
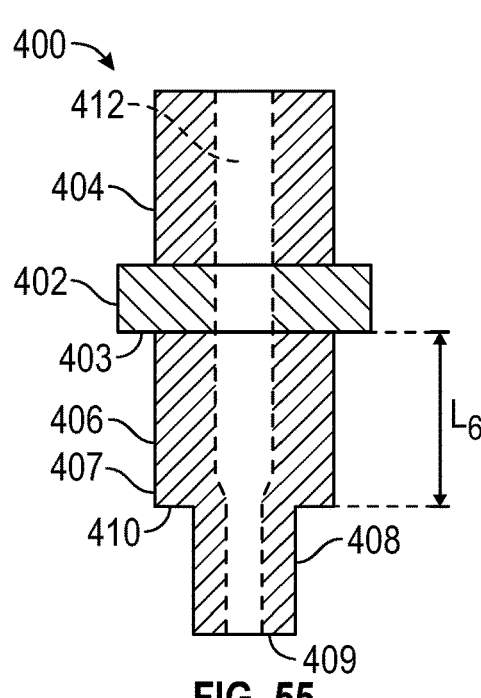
FIG. 55 illustrates a cross-sectional view of a portion of a hybrid bone tap having a first prolongation in accordance with an example of the present disclosure.
Figure 56:
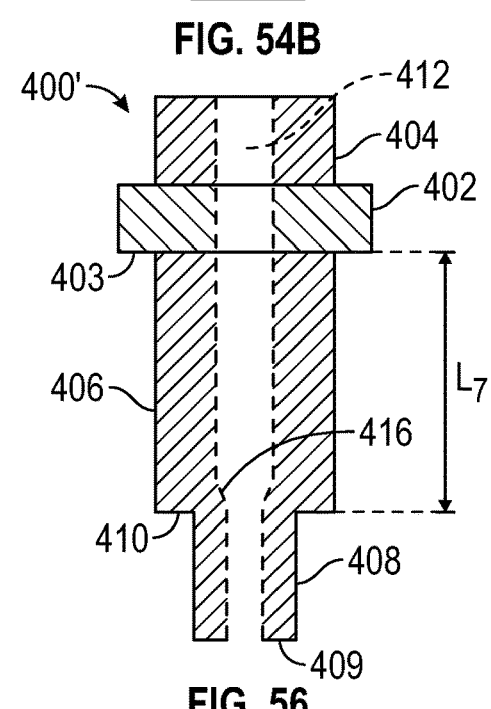
FIG. 56 illustrates a cross-sectional view of a portion of a hybrid bone tap having a second prolongation in accordance with an example of the present disclosure.
Figure 57:
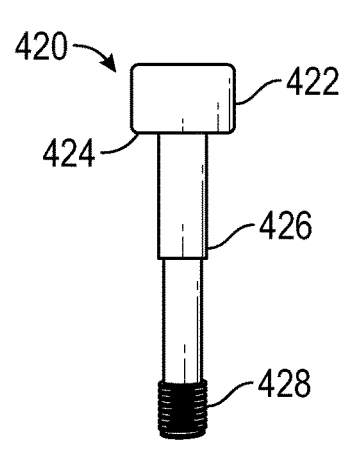
FIG. 57 illustrates a side-view of a screw in accordance with an example of the present disclosure.

FIGS. 55-59B illustrate a hybrid bone tap configured for short and long prolongations. The hybrid bone tap includes a bottom portion 430 (the bone tap), a short prolongation portion 400, and a long prolongation portion 400'. The prolongation portions 400, 400' are reversibly coupled to the bottom portion 430 and can come in a variety of lengths. Thus, a user can interchange the prolongation portions 400, 400' with one that has a desired prolongation for the particular application. As seen in FIGS. 55 and 56, the prolongation portions 400, 400' includes a flange 402 including a stop surface 403 that is configured to engage with a portion of the surgical guide and/or a portion of the master tube to limit the depth of the bone tap. A non-rotational feature 404 extends from as first side of the flange 402 and a engagement section 406 extends from a second side of the flange 402. The engagement section 406 includes a body section 407 and a projection 408 extending from a bottom surface 410 of the body section 407. The length L6 of the body section 407 of portion 400 is less than the length "L7" of the body section 407 of portion 400'. The prolongation portions 400, 400' include a bore 412 extending through the entire prolongation portions 400, 400'. The bore 412 can define a shoulder 416 and is configured to engage with a surface 424 of a head 422 of a screw 420. The screw 420 is configured to extend through the prolongation portion 400, 400' and couple with the bottom portion 430. The screw 420 can include the head 422, a shaft 426, and a threaded section 428. The threaded section 428 is configured to engage threads 438 of the bottom portion 430 (see FIG. 58).

Figure 58:
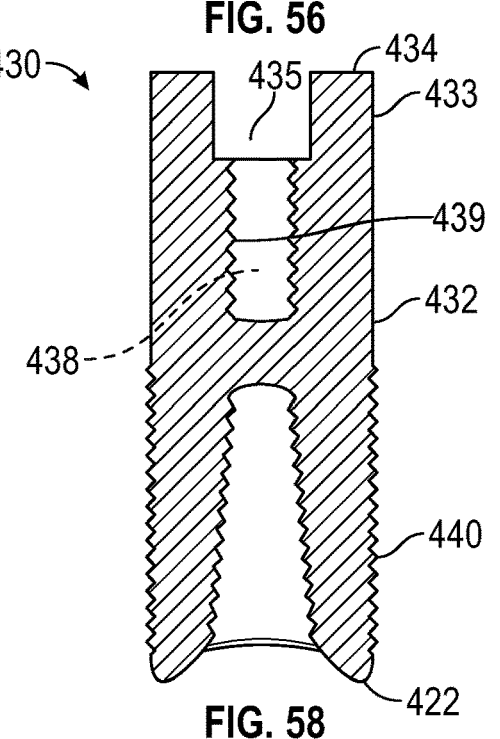
FIG. 58 illustrates a bottom portion of the hybrid bone tap in accordance with an example of the present disclosure.
Figures 59A, 59B:
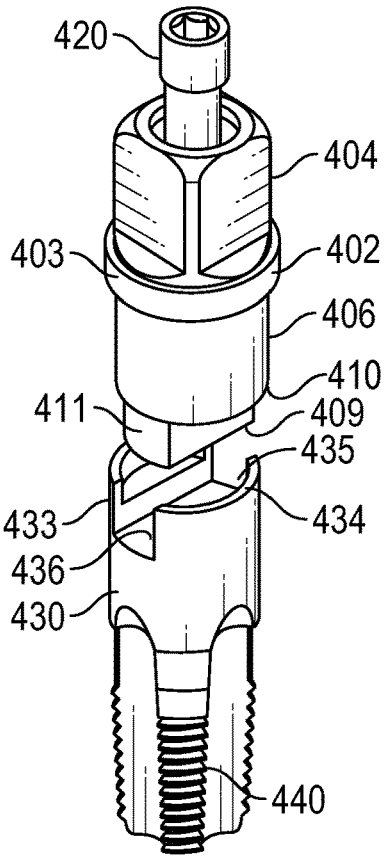
FIG. 59A illustrates and expanded view of the hybrid bone tap in accordance with an example of the present disclosure.
FIG. 59B illustrates a perspective view of the hybrid bone tap shown in FIG. 59A.
Figure 60:
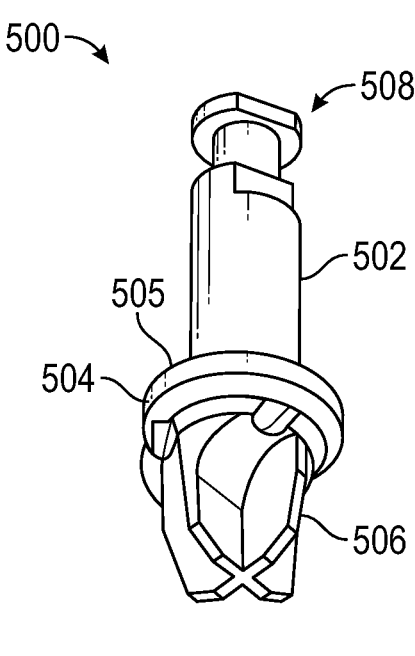
FIG. 60 illustrates a perspective view of a drill body component in accordance with an example of the present disclosure.
Figure 61:
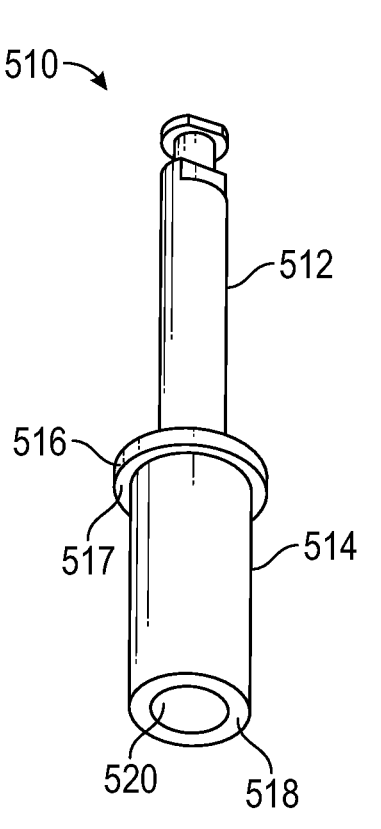
FIG. 61 illustrates a perspective view of a guide body component to be coupled with the drill body component in accordance with an example of the present disclosure.
Figure 62:
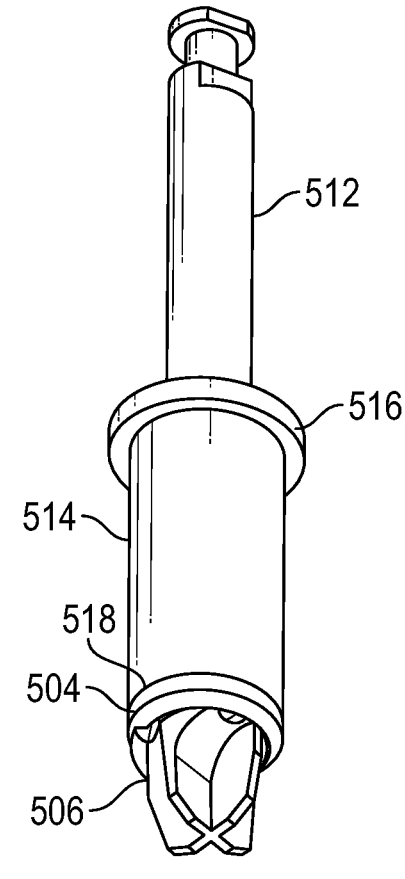
FIG. 62 illustrates the drill body component in FIG. 60 coupled to the guide body component in FIG. 61.

FIG. 58 illustrates the bottom portion 430. The bottom portion 430 extends from a first end 434 to a second end 422, The bottom portion 430 includes a bone tap portion 440 and an engagement section 432. The engagement section 432 includes a surface 436 and two projections 433 extending from the surface 436. The surface 436 and the two projections 433 define an opening 435 that is configured to receive the projection 408. The bottom portion 430 includes a threaded bore 438 that is configured to receive and engage with the threads 428 of the screw 420. FIGS. 59A-B illustrate the prolongation portion 400 coupled to the bottom portion 430. During coupling, the portion 400 is engaged with the bottom portion 430 as the projection 408 is inserted into the opening 435. A surface 411 of the projection 408 forms part of an external surface of the hybrid bone tap when coupled to the bottom portion 430. Further, the engagement of the opening 435 and the projection 408 rotationally lock the prolongation portion 400 to the bottom portion 430.

When coupled, surface 410 of the engagement section 406 contacts the first end 434 of the bottom portion 430.

Figure 63:
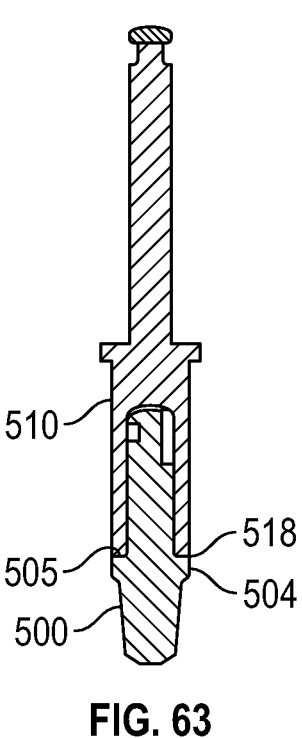
FIG. 63 illustrates a cross-sectional view of the drill guide component coupled to a guide body component in accordance with an example of the present disclosure.
Figure 64:
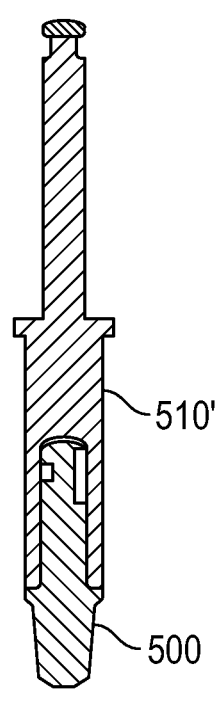
FIG. 64 illustrates a cross-sectional view of the drill guide component coupled to a guide body component in accordance with an example of the present disclosure.
Figure 65:
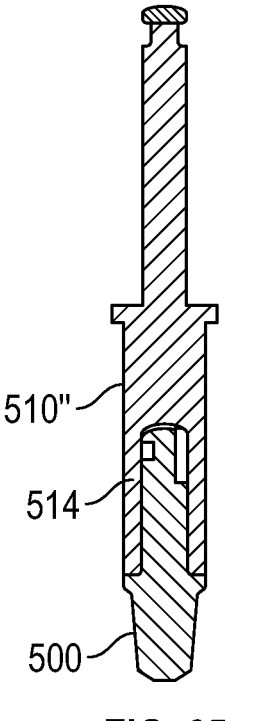
FIG. 65 illustrates a cross-sectional view of the drill guide component coupled to a guide body component in accordance with an example of the present disclosure.
Figure 66:
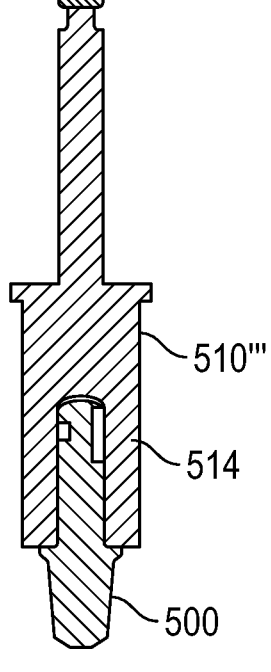
FIG. 66 illustrates a cross-sectional view of the drill guide component coupled to a guide body component in accordance with an example of the present disclosure.

FIGS. 60-74 illustrate a drill such as a drill bit. The drill bit is a two-piece drilling system that includes a drill body component 500 configured to be coupled with various guide body components such as guide body components 510, 510', 510", and 510' (collectively referred to as "guide body components 510). The guide body components 510 are configured to be coupled to the drill body component 500. The examples shown illustrate an isolatch connection, however, other methods for securely coupling the drill body component 500 to the guide body components 510 are contemplated. This system allows for an individual drill (drill body component 500) to be used in cases containing varied prolongations or varied master tube diameters as the guide body is selected based on the particular guide body to be passed through the master tubes positioned within a surgical guide or on the implant to be placed. FIGS. 63 and 64 illustrate the drill body component 500 being coupled to two different guide body components 510, 510' having different prolongations. Guide body component 510' has a longer prolongation as compared to guide body 510. FIGS. 65 and 66 illustrate the drill body component 500 being coupled to two different guide body components 510", 510''' having different diameters to be used with different sized master tubes.

Figure 67A:
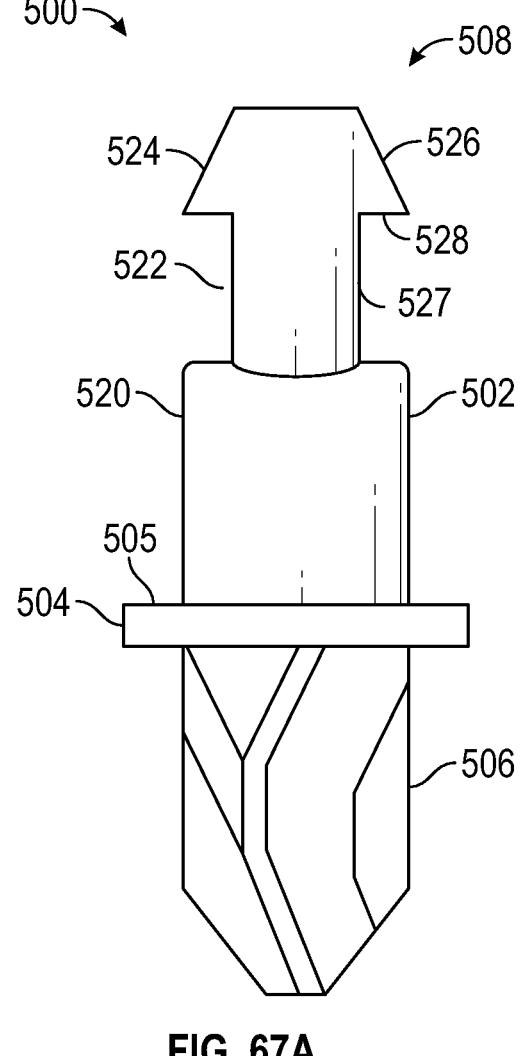
FIG. 67A illustrates a side-view of a drill guide component in accordance with an example of the present disclosure.
Figure 67B:
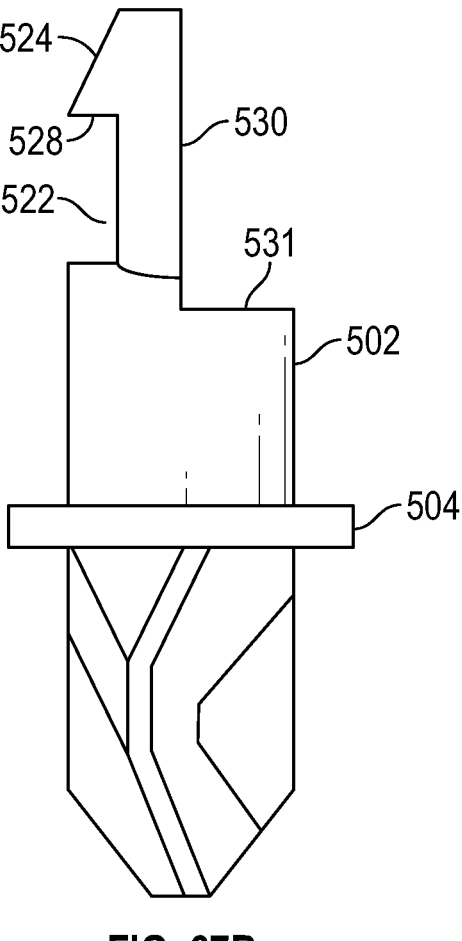
FIG. 67B illustrates a side-view of the drill guide component in FIG. 67A rotated ninety degrees.
Figure 68A:
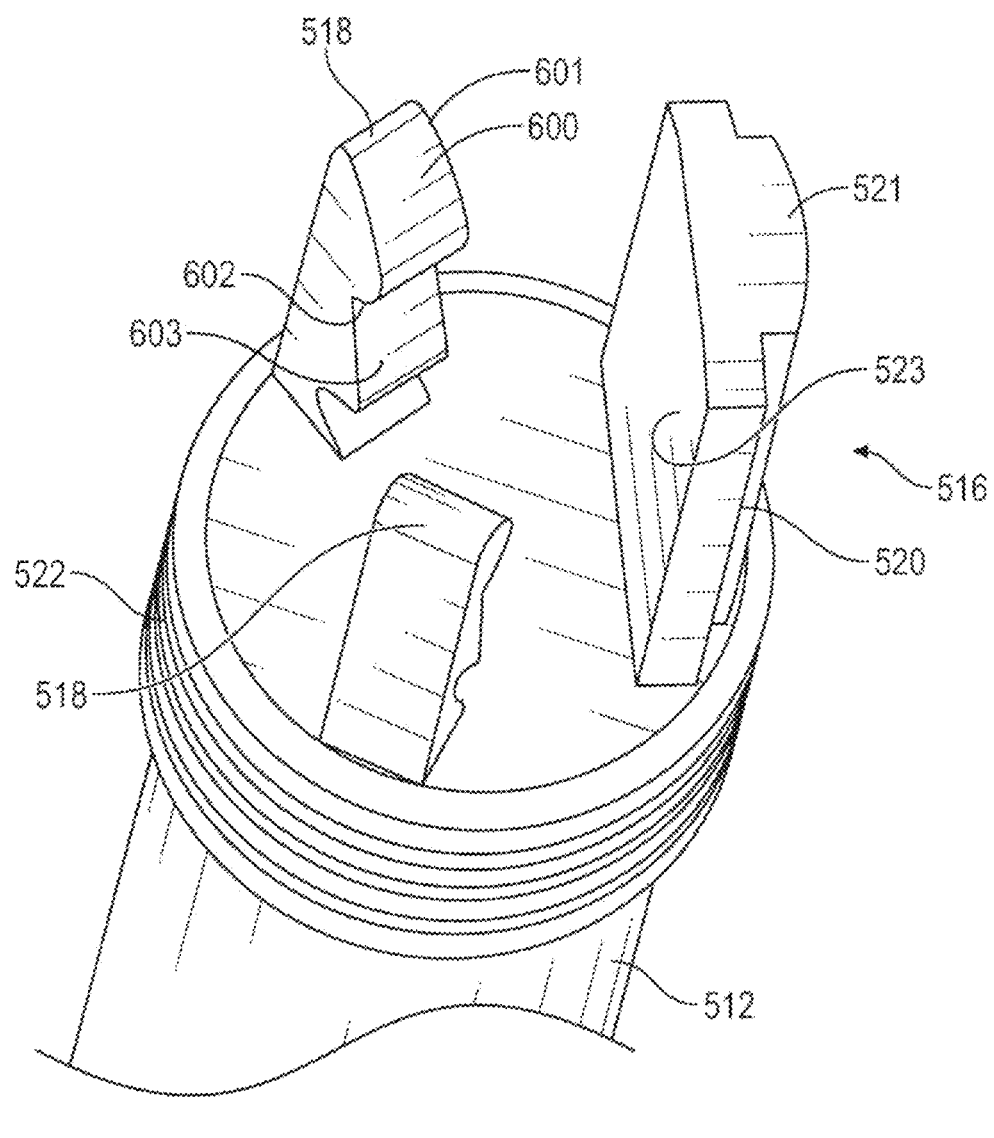
FIG. 68A illustrates a perspective view of an engagement portion of the guide body component in accordance with an example of the present disclosure.
Figure 68B:
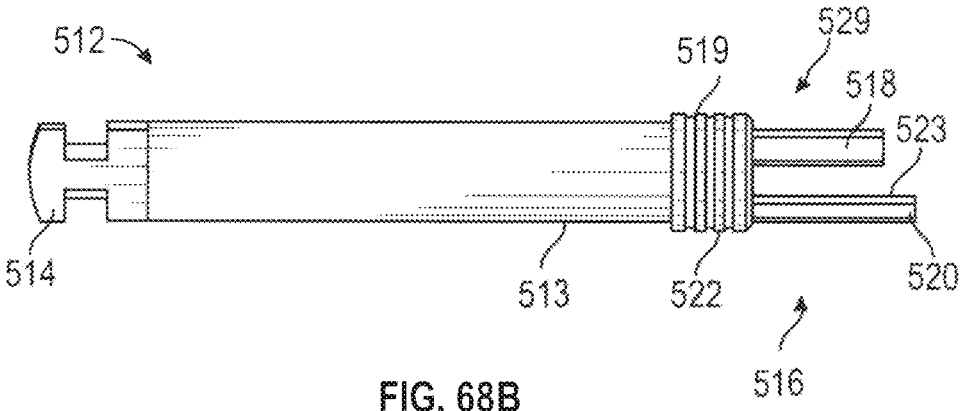
FIG. 68B illustrates a side-view of an engagement portion of the guide body component in accordance with an example of the present disclosure.

FIGS. 67A-B illustrate the drill body component 500. The drill body component 500 can include a shaft 502 having an engagement end 508, a flange 504, and a drill portion 506. The flange 504 includes a top surface 505. As discussed herein, the engagement end 508 is configured to couple with the guide body component 510. The engagement end 508 can be configured as a latch and can include a projection 527 extending from the shaft 502. The projection 527 can include a head 524 and define a groove 522 between the shaft 502 and a head 524. In an example, the head 524 can have a tapered surface 526 and define a shoulder 528. The head 524 further includes a flat 530 extending along the head 524 and along a portion of the shaft 502. A stop surface 531 along the shaft 502 can be defined by the flat 530 and the shaft 502.

Figure 69:
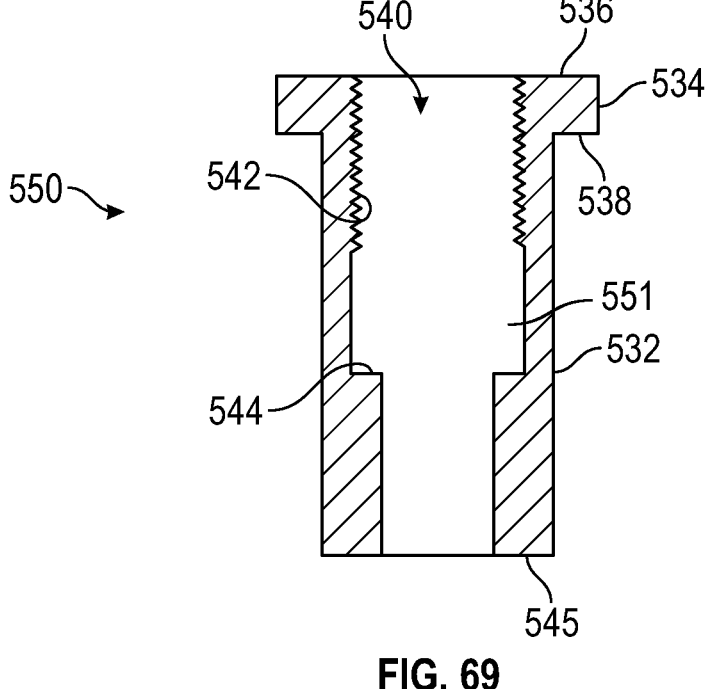
FIG. 69 illustrates a perspective view of a guide body portion of the guide body component in accordance with an example of the present disclosure.

The guide body component 510 is formed by coupling an engagement portion 512 (see FIGS. 68A-B) with a guide body portion 550 (see FIG. 69). The engagement portion 512 includes a shaft 513 extending between a tool end 514 and connection end 516. The tool end 514 can include a connection that can couple with a tool (e.g., a drill). The connection end 516 includes a guide body connection 522 and a drill connection 529. In one example, the guide body connection 522 includes threads 519 that are configured to engage with a threaded portion 542 on the guide body portion 550 (see FIG. 69). The drill connection 529 includes two flexible fingers 518 and a projection 520 including a flat 523. The projection 520 (and flat 523) extends from the shaft 513 to a stop surface 521. As discussed herein, the projection 520 can engage with the engagement end 508 of the drill body component 500 to rotationally lock the guide body component 510 to the drill body component 500.

In one example, the projection 520 can have a longer length than the flexible fingers 518. The flexible fingers 518 include a tip 601 having a tapered surface 600 that defines a shoulder 602. The flexible fingers 518 can also include a seating surface 603 that can have a corresponding surface to mate with the tapered surface 526 of the head 524.

The guide body connection 522 is configured to couple with the guide body portion 550. Referring to FIG. 69, the guide body portion 550 extends from a first end 536 to a second end 545. The guide body portion 550 includes a guide body 532 that extends from a flange 534 to the second end 545. As discussed herein, the guide body 532 is configured to be inserted through a master tube such that the dental implant can be implanted at a correct angle according to the dental plan. The flange 534 defines a stop surface 538 that acts as a stop when the user is drilling and the stop surface 538 contacts the surgical guide and/or the master tube. When coupled together, the second end 545 of the guide body portion 550 can contact the the stop surface 505 of the drill body component 500.

Figure 70:
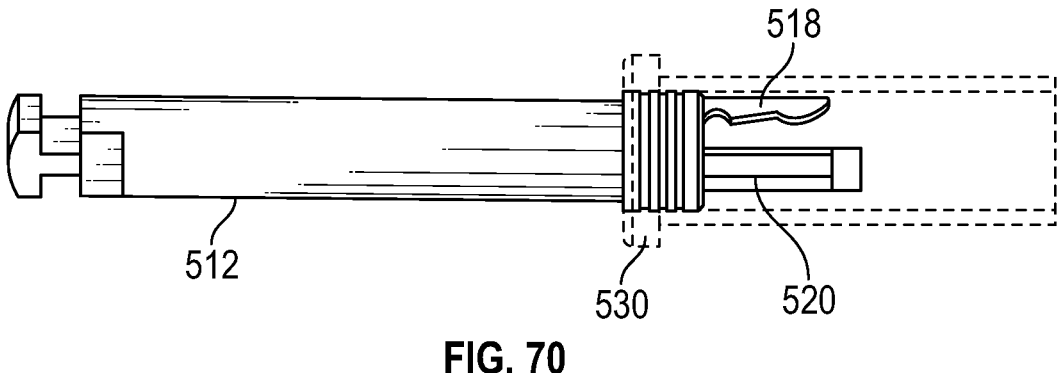
FIGS. 70-74 illustrate the drill body component coupled to the guide body component in accordance with an example of the present disclosure.
Figure 71:
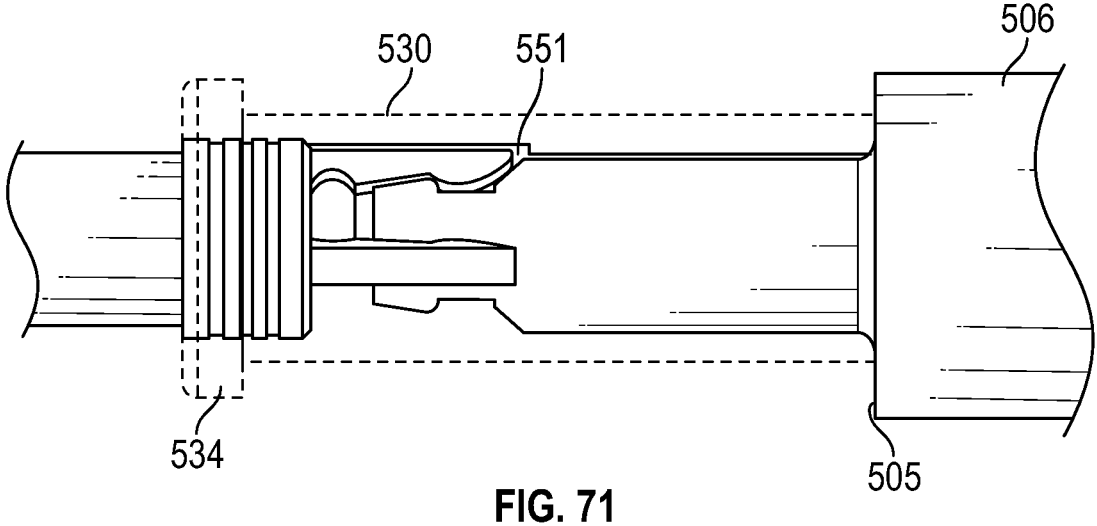
Figure 72:
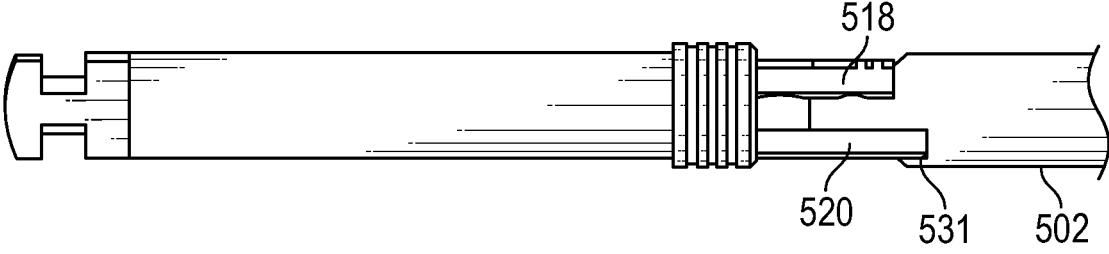
Figure 73:
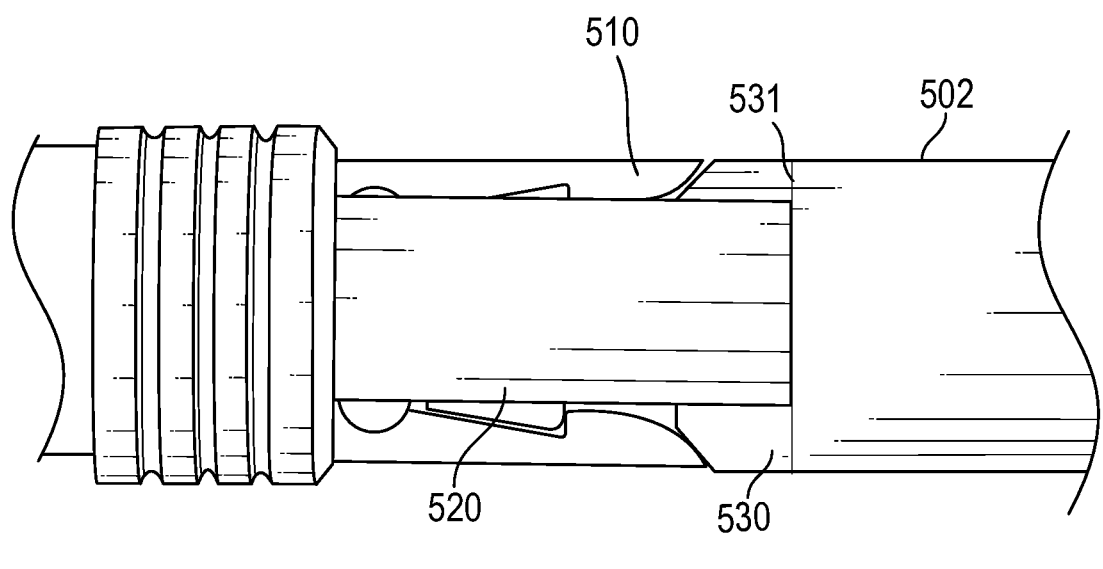
Figure 74:
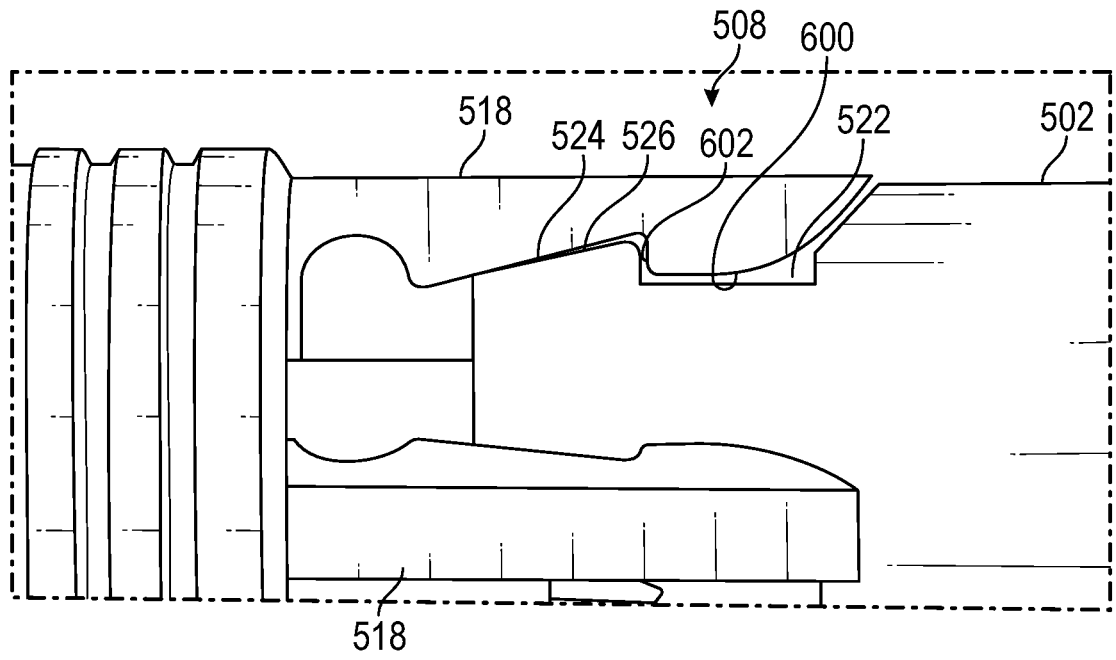

The guide body portion 550 includes a bore 540 including a threaded portion 542 and an expansion chamber 551. In an example, the bore 540 further includes a shoulder 544. FIG. 70 illustrates the guide body portion 550 coupled to the engagement portion 512. In an example, the threads 519 on the engagement portion 512 can couple with the threaded section 542 of the guide body portion 550.

FIGS. 71-74 illustrate the drill body component 500 coupled to the guide body component 510. The drill body component 500 can be inserted into the bore 540 of the guide body portion 550. For example, the engagement end 508 can be inserted into the bore 540 of the guide body portion 550 and between the flexible fingers 518 and the projection.

In an example, as the head 524 engages the flexible fingers 518, the flexible fingers 518 flex outward to an expanded state. The flexible fingers 518 can flex into the expansion chamber 551 to allow enough space for the head 524 to pass. Once the head 524 passes the tip 601, the flexible fingers 518 can transition from the expanded state to a less expanded state or a non-expanded state. In an example, as the flexible fingers 519 transition to the less expanded or non-expanded state, by moving back toward the drill body component 500, a portion of the tip 601 can be positioned within the groove 522. The shoulder 528 of the head 524 can engage the shoulder 602 defined by the tip 601. In one example, the tapered surface 600 of the tip 601 can have a surface that, when the tapered surface 526 of the head 524 engages the tip 601, the flexible fingers 518 are encouraged to flex outward. That is, the surface 600 that can be tapered, curved, among others, cooperate with the head 524 to allow the flexible fingers 518 to flex outward. The two surfaces can cooperate to encourage the flexible fingers 518 to flex outward when the tapered surface 526 of the head 524 engages the tapered surface 600 of the tip 601. Once coupled, the seating surface 603 of the flexible fingers 518 can mate with the surface 526 of the head 524. As seen in the figures, the seating surface 603 and the surface 526 of the head have substantially matching tapers. By have the seating surface 603 correspond to the surface 526 of the head can increase the stability of the connection between the drill body component 500 and the guide body component 510.

The projection 520 is configured to engage the flat 530 and the stop surface 531 of the drill body component 500. For example, the flat 523 of the projection 520 can engage the flat 530 along the projection 527 and the stop surface 521 of the projection 520 can engage the stop surface 531 of the drill body component 500.

Once coupled, the tool end 514 of the guide body component 510 can be coupled to a tool (e.g., a drill) and the user can begin to drill through a master tube. As discussed herein, the drill can be inserted into the patient until a stop surface 538 of the flange 534 engages a portion of the surgical guide and/or a portion of the master tube. During the procedure, if a different drill and/or a different prolongation or drill bushing is needed, the use can pull the drill body component from the guide body component 510. The force applied along a longitudinal axis needs to be enough such that the shoulder 528 applies enough force to the flexible fingers 518 to encourage the flexible fingers 518 to flex outwardly into the expansion chamber 551 so that the drill body component 500 can be removed from the guide body component 510.

FIGS. 60-73 provide for a drill or drill system including the drill body component coupled with the guide body components. As discussed herein, the system allows for various guide body components (having various prolongations and diameters) to be coupled with various drill body components (having various types of drills). Thus, the drill system can include a plurality of guide body components and a plurality of drill body components. The plurality of guide body components can have different combinations of prolongations and diameters (that will mate with master tubers in a surgical guide). The plurality of drill body components can include a variety of different drills that are used in a dental plan protocol.

The various components discussed herein can be provided as a kit. For example, there are components used incorporate into the surgical guide including, but not limited to, the fixation pin, the fixation tube, and the master tubes. The additional components can be used to execute the dental plant. For example, the various drills and components to be used with drills such as components to provide stops, drilling bushings, and prolongations can be used interchangeable.

It should be noted that while the surgical guide has been described as being developed through a dental scan (e.g., CT scan) of the patient's mouth, the surgical guide can be developed by other common techniques involving the use of impression material within the patient's mouth and/or stone models created by the impression material, which is often referred to as model-based surgery.

Further, while the present invention has been described relative to the use of a dental plan to create a denture-type prosthetic device, the present invention is also useful for developing and installing one or more single tooth prosthetic devices, or one or more multi-tooth prosthetic devices in a patient. In other words, the surgical guide may be smaller such that it only covers a limited portion of the dental arch.

Also, it should be noted that the surgical guide can be used directly in the surgical stage without being used to create a prosthesis via the stone model. In other words, the surgical guide can be developed via the scan of the patient's mouth in accordance to a dental plan. Once the surgical guide is placed in the patient's mouth, the implants can be installed in the bone at the locations corresponding to the dental plan with the drills and the components described herein.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

Various Notes

The above detailed description includes references to the accompanying drawings, which form a part of the detailed description. The drawings show, by way of illustration, specific embodiments in which the invention can be practiced. These embodiments are also referred to herein as "examples," Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A surgical drill bit, comprising:
   a drill body component including a shaft, a drill portion, and an engagement end, wherein the shaft is positioned between the drill portion and the engagement end, wherein the engagement end comprises a head configured as a latch that extends from the shaft at a stop surface, and wherein the head of the engagement end comprises a projection having a first flat and a first shoulder that form the latch; and
   a guide body component configured to reversibly couple to the drill body component, the guide body component including:
      a guide body portion including a guide body having a cylindrical chamber, wherein the cylindrical chamber comprises an inner diameter and an outer diameter;
      a tool end; and
      a connection end, wherein the connection end includes a drill connection that enables the guide body component to reversibly couple with the drill body component, the drill connection including:
         at least one flexible finger comprising a tapered surface that defines a second shoulder to mate with the first shoulder of the latch and apply a retention force along a longitudinal axis, which defines an axial direction, to the drill body component, wherein the at least one flexible finger is contained within the inner diameter of the cylindrical chamber, the at least one flexible finger having a first end and a deflectable second end, the first end fixedly connected to the shaft and the second deflectable end extending from the first end in the axial direction; and
         a second flat to mate with the first flat of the latch, wherein the second flat is contained within the inner diameter of the cylindrical chamber.

2. The surgical drill bit of claim 1, wherein the connection end includes a guide body connection that couples with the guide body portion.

3. The surgical drill bit of claim 1, wherein the guide body portion is threadably coupled with the drill connection at a first end of the guide body and wherein the drill body component is received at a second end of the guide body that opposes the first end of the guide body.

4. The surgical drill bit of claim 3, wherein the cylindrical chamber provides a space for outward expansion of the at least one flexible finger.

5. The surgical drill bit of claim 1, wherein the at least one flexible finger comprises a pair of flexible fingers that flex outward to accommodate the head until the drill body component is fully inserted into the guide body component, at which point the pair of flexible fingers move inward until the second shoulder mates with the first shoulder of the latch.

6. The surgical drill bit of claim 1, wherein the at least one flexible finger includes a tip defining the second shoulder.

7. The surgical drill bit of claim 1, wherein the stop surface is substantially orthogonal relative to the first flat and wherein the first flat extends away from the shaft at the stop surface.

8. The surgical drill bit of claim 1, wherein the outer diameter of the cylindrical chamber is configured to interface with a master tube of a predetermined size, wherein the guide body portion is sized to fit through the master tube, and wherein the guide body portion comprises a flange defining a stop surface that upon being inserted a predetermined distance into the master tube causes the flange to contact the master tube.

9. A method of forming a surgical drill bit, the method including:

selecting a first guide body component from a plurality of guide body components, wherein the first guide body component has a guide body with at least one of a length and a width that is different from at least one other guide body of other guide body components of the plurality of guide body components and wherein the first guide body component further includes a guide body portion including a guide body and an engagement portion coupled to the guide body portion;

selecting a first drill body component from a plurality of drill body components, wherein the first drill body component has a drill portion that is different from at least one other drill portion of other drill body components of the plurality of drill body components, and wherein the first drill body component comprises a latch that extends from a stop surface that is provided in an orthogonal orientation relative to a shaft of the first drill body component; and reversibly coupling the first drill body component to the first guide body component, wherein the first guide body component reversibly couples to the first drill body component with:

a cylindrical chamber having an outer diameter and an inner diameter;

at least one flexible finger having a first end fixedly connected to the shaft and a second end that flexes outwardly from a central axis of the first guide body component within the cylindrical chamber to receive the first drill body component and then flexes inwardly toward the central axis of the first guide body component to longitudinally retain the first drill body component within the cylindrical chamber by mating with the latch, wherein the first end is fixedly connected to the shaft and extends substantially parallel with the central axis to the second end; and a flat that mates with a corresponding flat of the first drill body component, wherein the flat is contained within the inner diameter of the cylindrical chamber, and wherein the flat of the first drill body component is provided as part of the latch.

10. The method of claim 9, wherein the first drill body component includes the drill portion, wherein the shaft is positioned between the drill portion and an engagement end that include the latch, and wherein the engagement portion includes a tool end and a connection end, wherein the connection end is configured to couple with the guide body portion and reversibly couple with the engagement end of the first drill body component.

11. The method of claim 10, wherein reversibly coupling the first drill body component to the first guide body component, includes:

inserting the engagement end of the first drill body component into the cylindrical chamber until the engagement end couples with the latch of the engagement portion of the first guide body component.

12. The method of claim 9, wherein, when the first drill body component is coupled to the first guide body component, a portion of the at least one flexible finger is positioned within a groove provided along the latch.

13. The method of claim 12, wherein the at least one flexible finger comprises a pair of flexible fingers, both of which flex outwardly from the central axis of the first guide body component to receive the first drill body component and then flex inwardly toward the central axis of the first guide body component to retain the first drill body component via engagement with the latch.

14. The method of claim 13, wherein the at least one flexible finger comprises a tapered surface that defines a shoulder to mate with the latch.

15. The method of claim 9, further including:

decoupling the first drill body component from the first guide body component by applying a longitudinal force substantially parallel with the central axis of the first guide body component to disengage an engagement end of the first drill body component from the first guide body component.

16. The method of claim 9, further including:

selecting one of a second guide body component to couple with the first drill body component and a second drill body component to couple with the first guide body component, wherein the second guide body component has at least one of a length and a width that is different from at least one of the length and the width of the first guide body component, and wherein the second drill body component has drill portion that is different from the drill portion of the first drill body component.

17. A dental surgical system, comprising:

a plurality of guide body components, wherein a first guide body component of the plurality of guide body components has a guide body with at least one of a length and a width that is different from at least one other guide body of other guide body components of the plurality of guide body components and wherein the first guide body component further includes a guide body portion including a guide body and an engagement portion; and a plurality of drill body components, wherein a first drill body component of the plurality of drill body components has a drill portion that is different from at least one other drill portion of other drill body components of the plurality of drill body components, wherein the engagement portion includes a drill connection that couples with the first drill body component, and wherein the first drill body component comprises a latch that extends from a stop surface that is provided in an orthogonal orientation relative to a shaft of the first drill body component, the drill connection including:

a cylindrical chamber having an outer diameter and an inner diameter;

at least one flexible finger comprising a tapered surface that defines a shoulder to mate with a corresponding shoulder of the latch thereby longitudinally securing the first drill body component, wherein the at least one flexible finger is provided within the inner diameter of the cylindrical chamber and the at least one flexible finger having a first end and a deflectable second end, the first end fixedly connected to the shaft and the second deflectable end extending from the first end along a longitudinal axis; and a flat to mate with a corresponding flat of the latch, wherein the flat is provided within the inner diameter of the cylindrical chamber.

18. The dental surgical system of claim 17, wherein the first drill body component has a drill pattern and a drill width that is different from the width of the at least one other guide body of the other guide body components of the plurality of guide body components.

19. The dental surgical system of claim 17, wherein at least two of the plurality of guide body components are configured to mate with at least two different master tubes and wherein the at least two different master tubes are insertable into in a surgical guide.

20. The dental surgical system of claim 17, wherein the flat is longer than the at least one flexible finger.

\* \* \* \* \*